(12) United States Patent
Patil et al.

(10) Patent No.: US 12,402,188 B2
(45) Date of Patent: Aug. 26, 2025

(54) TECHNIQUES FOR CHANNEL ACCESS IN WIRELESS COMMUNICATIONS SYSTEMS

(71) Applicant: QUALCOMM Incorporated, San Diego, CA (US)

(72) Inventors: Abhishek Pramod Patil, San Diego, CA (US); George Cherian, San Diego, CA (US); Alfred Asterjadhi, San Diego, CA (US); Gaurang Naik, San Diego, CA (US); Sai Yiu Duncan Ho, San Diego, CA (US); Yanjun Sun, San Diego, CA (US); Abdel Karim Ajami, Lakeside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 500 days.

(21) Appl. No.: 17/855,740

(22) Filed: Jun. 30, 2022

(65) Prior Publication Data

US 2024/0008114 A1    Jan. 4, 2024

(51) Int. Cl.
*H04W 76/15* (2018.01)
*H04W 8/00* (2009.01)
*H04W 76/14* (2018.01)
*H04W 84/12* (2009.01)

(52) U.S. Cl.
CPC .......... *H04W 76/15* (2018.02); *H04W 8/005* (2013.01); *H04W 76/14* (2018.02); *H04W 84/12* (2013.01)

(58) Field of Classification Search
CPC ..... H04W 8/005; H04W 76/14; H04W 76/15; H04W 84/12
See application file for complete search history.

(56) References Cited

U.S. PATENT DOCUMENTS

| | | | |
|---|---|---|---|
| 2021/0007168 A1* | 1/2021 | Asterjadhi | H04W 52/0235 |
| 2021/0051513 A1 | 2/2021 | Min et al. | |
| 2021/0392571 A1* | 12/2021 | Kneckt | H04W 48/10 |
| 2022/0110123 A1* | 4/2022 | Adachi | H04W 76/14 |
| 2022/0116870 A1 | 4/2022 | Cariou et al. | |
| 2022/0159555 A1* | 5/2022 | Cariou | H04W 48/12 |

(Continued)

OTHER PUBLICATIONS

International Search Report and Written Opinion—PCT/US2023/068431—ISA/EPO—Oct. 20, 2023 (2205511WO).

(Continued)

*Primary Examiner* — Melanie Jagannathan
(74) *Attorney, Agent, or Firm* — Holland & Hart LLP

(57) ABSTRACT

Methods, systems, and devices for wireless communication at a multi-link device are described. A first multi-link device (MLD) may communicate with a second MLD in accordance with the techniques depicted herein. For instance, the second MLD may transmit an indication of at least a portion of a beacon interval timeline for communications between the second MLD and one or more first MLDs on a first radio frequency link. In some examples, the beacon interval timeline may include at least one of a beacon transmit interval, and one or more service periods, channel access over a second radio frequency link being via the one or more service periods. A service period may be scheduled for communications on the second radio frequency link. The second MLD may then communicate in accordance with at least one of the beacon transmit interval and the one or more service periods.

33 Claims, 22 Drawing Sheets

(56) References Cited

U.S. PATENT DOCUMENTS

| | | | |
|---|---|---|---|
| 2023/0036941 A1* | 2/2023 | Kim | H04W 52/0216 |
| 2023/0262807 A1* | 8/2023 | Jiang | H04W 76/15 |
| | | | 370/329 |
| 2024/0008119 A1* | 1/2024 | Kim | H04W 52/0216 |
| 2024/0251282 A1* | 7/2024 | Kim | H04W 74/08 |
| 2024/0422613 A1* | 12/2024 | Kim | H04W 28/0263 |
| 2025/0039915 A1* | 1/2025 | Lou | H04W 72/542 |

OTHER PUBLICATIONS

Jang I (LG Electronics)., et al., "Induction of Multi-link Information", 11-20-0028-06-00BE, IEEE-SA Mentor, Piscataway, NJ, USA, vol. 802.11 EHT, 802.11be, No. 6, Jun. 5, 2020, pp. 1-14, XP068169420, The Whole Document.

\* cited by examiner

TECHNIQUES FOR CHANNEL ACCESS IN WIRELESS COMMUNICATIONS SYSTEMS

BACKGROUND

The following relates to wireless communication at a multi-link device, including techniques for channel access in wireless communications systems.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include AP that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via DL and UL. The DL (or forward link) may refer to the communication link from the AP to the station, and the UL (or reverse link) may refer to the communication link from the station to the AP.

SUMMARY

The described techniques relate to improved methods, systems, devices, or apparatuses that support techniques for channel access in wireless communications systems. Generally, the described techniques provide for using a first radio frequency link to negotiate and establish communication parameters for communicating via a second frequency link. In some examples, a first multi-link device (MLD) may establish communications with a second MLD according to a multi-link operation for a wireless local area network (WLAN). In particular, the first MLD may establish the multi-link operation including a second radio frequency link for data communications and a first radio frequency link for control communications, The first MLD may then receive the control communications over the first radio frequency link in accordance with the multi-link operation, and may receive the data communications over the second radio frequency link in accordance with the multi-link operation.

A method for wireless communication at a second MLD is described. The method may include transmitting an indication of at least a portion of a beacon interval timeline for communications between the second MLD and one or more first MLDs on a first radio frequency link in accordance with a multi-link operation for a wireless local area network, where the beacon interval timeline includes at least one of a beacon transmit interval, and one or more service periods, channel access between the one or more first MLDs and the second MLD over a second radio frequency link being via the one or more service periods, where a service period is scheduled for communications on the second radio frequency link with at least one first MLD of the one or more first MLDs and communicating with the one or more first MLDs in accordance with at least one of the beacon transmit interval and the one or more service periods.

An apparatus for wireless communication at a second MLD is described. The apparatus may include a processor, memory coupled with the processor, and instructions stored in the memory. The instructions may be executable by the processor to cause the apparatus to transmit an indication of at least a portion of a beacon interval timeline for communications between the second MLD and one or more first MLDs on a first radio frequency link in accordance with a multi-link operation for a wireless local area network, where the beacon interval timeline includes at least one of a beacon transmit interval, and one or more service periods, channel access between the one or more first MLDs and the second MLD over a second radio frequency link being via the one or more service periods, where a service period is scheduled for communications on the second radio frequency link with at least one first MLD of the one or more first MLDs and communicate with the one or more first MLDs in accordance with at least one of the beacon transmit interval and the one or more service periods.

Another apparatus for wireless communication at a second MLD is described. The apparatus may include means for transmitting an indication of at least a portion of a beacon interval timeline for communications between the second MLD and one or more first MLDs on a first radio frequency link in accordance with a multi-link operation for a wireless local area network, where the beacon interval timeline includes at least one of a beacon transmit interval, and one or more service periods, channel access between the one or more first MLDs and the second MLD over a second radio frequency link being via the one or more service periods, where a service period is scheduled for communications on the second radio frequency link with at least one first MLD of the one or more first MLDs and means for communicating with the one or more first MLDs in accordance with at least one of the beacon transmit interval and the one or more service periods.

A non-transitory computer-readable medium storing code for wireless communication at a second MLD is described. The code may include instructions executable by a processor to transmit an indication of at least a portion of a beacon interval timeline for communications between the second MLD and one or more first MLDs on a first radio frequency link in accordance with a multi-link operation for a wireless local area network, where the beacon interval timeline includes at least one of a beacon transmit interval, and one or more service periods, channel access between the one or more first MLDs and the second MLD over a second radio frequency link being via the one or more service periods, where a service period is scheduled for communications on the second radio frequency link with at least one first MLD of the one or more first MLDs and communicate with the one or more first MLDs in accordance with at least one of the beacon transmit interval and the one or more service periods.

Some examples of the method, apparatuses, and non-transitory computer-readable medium described herein may further include operations, features, means, or instructions for performing, during the beacon transmit interval, a sector sweep of a set of beacon frames, where the second MLD communicates with the one or more first MLDs based on performing the sector sweep.

In some examples of the method, apparatuses, and non-transitory computer-readable medium described herein, the set of beacon frames includes at least one of a basic service set identifier identifying the second MLD, a sector identifier associated with beam training, a timing synchronization function, a duration of a beacon interval, a traffic indication map, or a combination thereof.

Some examples of the method, apparatuses, and non-transitory computer-readable medium described herein may further include operations, features, means, or instructions for transmitting, via the first radio frequency link, at least one of a number of sectors, dwell time per sector of the number of sectors, a number of beacon intervals during which the beacon transmit interval may be skipped, or a combination thereof, where communication during the one or more service periods may be via the second radio frequency link.

Some examples of the method, apparatuses, and non-transitory computer-readable medium described herein may further include operations, features, means, or instructions for performing a service period setup operation to schedule the one or more service periods on the first radio frequency link for communications with the at least one of the one or more first MLDs. In some examples of the method, apparatuses, and non-transitory computer-readable medium described herein, the service period setup operation may be via the first radio frequency link or the second radio frequency link.

Some examples of the method, apparatuses, and non-transitory computer-readable medium described herein may further include operations, features, means, or instructions for allocating, to at least one of the one or more first MLDs and during the service period setup operation, two or more dedicated service periods, where the two or more dedicated service periods may be included in the one or more service periods in the beacon interval.

In some examples of the method, apparatuses, and non-transitory computer-readable medium described herein, the allocating may be based on a traffic profile associated with the at least one of the one or more first MLDs.

Some examples of the method, apparatuses, and non-transitory computer-readable medium described herein may further include operations, features, means, or instructions for receiving, from at least one of the one or more first MLDs and during the service period setup operation, a request for a dedicated service period for a peer-to-peer communication.

Some examples of the method, apparatuses, and non-transitory computer-readable medium described herein may further include operations, features, means, or instructions for determining that at least two of the one or more first MLDs may have an overlapping dedicated service period and transmitting a query to enable the overlapping dedicated service period based on determining that the at least two of the one or more first MLDs may have the overlapping dedicated service period.

In some examples of the method, apparatuses, and non-transitory computer-readable medium described herein, the query may be included in a trigger frame or a power save poll or a quality of service null frame. Some examples of the method, apparatuses, and non-transitory computer-readable medium described herein may further include operations, features, means, or instructions for receiving, from one of the at least two of the first MLDs, a response to the query and communicating during the overlapping dedicated service period based on receiving the response.

In some examples of the method, apparatuses, and non-transitory computer-readable medium described herein, the response to the query includes a trigger-based physical layer protocol data unit or an acknowledgement. Some examples of the method, apparatuses, and non-transitory computer-readable medium described herein may further include operations, features, means, or instructions for receiving, from one of the at least two of the first MLDs, a response to the query, the response including information associated with beam training.

In some examples of the method, apparatuses, and non-transitory computer-readable medium described herein, a third MLD and a fourth MLD communicate over a common overlapping dedicated service period and a first beamformed link associated with the third MLD may be orthogonal to a second beamformed link associated with the fourth MLD.

Some examples of the method, apparatuses, and non-transitory computer-readable medium described herein may further include operations, features, means, or instructions for communicating with at least one of the one or more first MLDs during a dedicated service period, determining that additional downlink buffer units may be remaining after conclusion of the dedicated service period, and transmitting, based on determining the additional downlink buffer units and after conclusion of the dedicated service period, the indication of at least the portion of the timeline, where the indication may be of at least one opportunistic service period for communications with the at least one of the one or more first MLDs.

Some examples of the method, apparatuses, and non-transitory computer-readable medium described herein may further include operations, features, means, or instructions for receiving, from at least one of the one or more first MLDs, a response confirming availability for using the at least one opportunistic service period.

Some examples of the method, apparatuses, and non-transitory computer-readable medium described herein may further include operations, features, means, or instructions for communicating with the at least one of the one or more first MLDs during the at least one opportunistic service period based on receiving the response.

Some examples of the method, apparatuses, and non-transitory computer-readable medium described herein may further include operations, features, means, or instructions for communicating with at least one of the one or more first MLDs during a dedicated service period, receiving information indicative of pending uplink buffer units remaining at the at least one of the one or more first MLDs after conclusion of the dedicated service period, and transmitting, based on receiving the information indicative of the pending uplink buffer units and after conclusion of the dedicated service period, the indication of at least the portion of the timeline, where the indication may be of at least one opportunistic service period available for communications with the at least one of the one or more first MLDs.

Some examples of the method, apparatuses, and non-transitory computer-readable medium described herein may further include operations, features, means, or instructions for receiving, from at least one of the one or more first MLDs, a response confirming availability for using the at least one opportunistic service period.

Some examples of the method, apparatuses, and non-transitory computer-readable medium described herein may further include operations, features, means, or instructions for communicating with the at least one of the one or more first MLDs during the at least one opportunistic service period based on receiving the response.

Some examples of the method, apparatuses, and non-transitory computer-readable medium described herein may further include operations, features, means, or instructions for transmitting, via the first radio frequency link, the indication of at least the portion of the timeline, where the indication may be of one or more opportunistic service periods available for communications with the one or more first MLDs, where communications during the one or more service periods may be via the second radio frequency link.

In some examples of the method, apparatuses, and non-transitory computer-readable medium described herein, transmitting the indication may include operations, features, means, or instructions for broadcasting, to the one or more first MLDs, the indication of one or more opportunistic service periods available for communications with the one or more first MLDs.

In some examples of the method, apparatuses, and non-transitory computer-readable medium described herein, transmitting the indication may include operations, features, means, or instructions for transmitting, to at least one of the one or more first MLDs, the indication of the one or more opportunistic service periods available for communications with the at least one of the one or more first MLDs.

Some examples of the method, apparatuses, and non-transitory computer-readable medium described herein may further include operations, features, means, or instructions for receiving, during a dedicated service period of the one or more service periods, a status report from at least one of the one or more first MLDs and transmitting, to the at least one of the one or more first MLDs and based on receiving the status report, the indication of at least the portion of the timeline, where the indication may be of at least one opportunistic service period.

In some examples of the method, apparatuses, and non-transitory computer-readable medium described herein, the status report includes at least one of a buffer status report, a data frame, an acknowledgement frame, or a combination thereof.

Some examples of the method, apparatuses, and non-transitory computer-readable medium described herein may further include operations, features, means, or instructions for transmitting, to the one or more first MLDs, the indication of at least the portion of the timeline, where the indication may be of at least one opportunistic service period, receiving, from at least one of the one or more first MLDs, a response to the indication of the at least one opportunistic service period, and communicating with the at least one of the one or more first MLDs during the at least one opportunistic service period based on receiving the response.

In some examples of the method, apparatuses, and non-transitory computer-readable medium described herein, the one or more service periods includes a set of target wake time service periods and the one or more service periods may be allocated to the one or more first MLDs using frame exchanges via the first radio frequency link for communicating via the second radio frequency link.

In some examples of the method, apparatuses, and non-transitory computer-readable medium described herein, the beacon interval includes at least one of the beacon transmit interval, one or more dedicated service periods and one or more opportunistic service periods.

In some examples of the method, apparatuses, and non-transitory computer-readable medium described herein, the beacon interval may be divided into a set of multiple equal sized time blocks and a bit in a bitmap may be associated with a corresponding time block of the set of multiple equal sized time blocks.

Some examples of the method, apparatuses, and non-transitory computer-readable medium described herein may further include operations, features, means, or instructions for transmitting, to the one or more first MLDs and via the first radio frequency link, a management frame including an indicating of the bitmap, where the communicating includes communicating with the one or more first MLDs via the second radio frequency link.

In some examples of the method, apparatuses, and non-transitory computer-readable medium described herein, the management frame includes a beacon frame or a probe response frame.

Some examples of the method, apparatuses, and non-transitory computer-readable medium described herein may further include operations, features, means, or instructions for receiving, from at least one of the one or more first MLDs, a request for additional time blocks based on a position of the bit in the bitmap and transmitting a response based on receiving the request for the additional time blocks.

In some examples of the method, apparatuses, and non-transitory computer-readable medium described herein, the response includes an acceptance of the request for the additional time blocks or a denial of the request for the additional time blocks or information indicative of an alternative number of additional time blocks.

In some examples of the method, apparatuses, and non-transitory computer-readable medium described herein, the one or more service periods includes one or more opportunistic service periods and one or more dedicated service periods and an opportunistic service period may be located in a time gap between the one or more dedicated service periods.

In some examples of the method, apparatuses, and non-transitory computer-readable medium described herein, the one or more service periods includes one or more opportunistic service periods and one or more dedicated service periods and the one or more dedicated service periods may be associated with a first periodicity and of the one or more opportunistic service periods may be associated with a second periodicity.

In some examples of the method, apparatuses, and non-transitory computer-readable medium described herein, the second MLD includes an access point (AP) MLD and the one or more first MLDs includes one or more non-AP MLD.

In some examples of the method, apparatuses, and non-transitory computer-readable medium described herein, the first radio frequency link may be lower than the second radio frequency link.

A method for wireless communication at a second MLD is described. The method may include establishing communications according to a multi-link operation for a wireless local area network including the second MLD and one or more first MLDs, where the multi-link operation includes a second radio frequency link for data communications and a first radio frequency link for control communications, communicating the control communications with the one or more first MLDs over the first radio frequency link in accordance with the multi-link operation for the wireless local area network, and communicating the data communications with the one or more first MLDs over the second radio frequency link in accordance with the multi-link operation for the wireless local area network.

An apparatus for wireless communication at a second MLD is described. The apparatus may include a processor, memory coupled with the processor, and instructions stored in the memory. The instructions may be executable by the processor to cause the apparatus to establish communications according to a multi-link operation for a wireless local area network including the second MLD and one or more first MLDs, where the multi-link operation includes a second radio frequency link for data communications and a first radio frequency link for control communications, communicate the control communications with the one or more first MLDs over the first radio frequency link in accordance with the multi-link operation for the wireless local area network, and communicate the data communications with the one or more first MLDs over the second radio frequency link in accordance with the multi-link operation for the wireless local area network.

Another apparatus for wireless communication at a second MLD is described. The apparatus may include means for establishing communications according to a multi-link operation for a wireless local area network including the second MLD and one or more first MLDs, where the multi-link operation includes a second radio frequency link for data communications and a first radio frequency link for control communications, means for communicating the control communications with the one or more first MLDs over the first radio frequency link in accordance with the multi-link operation for the wireless local area network, and means for communicating the data communications with the one or more first MLDs over the second radio frequency link in accordance with the multi-link operation for the wireless local area network.

A non-transitory computer-readable medium storing code for wireless communication at a second MLD is described. The code may include instructions executable by a processor to establish communications according to a multi-link operation for a wireless local area network including the second MLD and one or more first MLDs, where the multi-link operation includes a second radio frequency link for data communications and a first radio frequency link for control communications, communicate the control communications with the one or more first MLDs over the first radio frequency link in accordance with the multi-link operation for the wireless local area network, and communicate the data communications with the one or more first MLDs over the second radio frequency link in accordance with the multi-link operation for the wireless local area network.

Some examples of the method, apparatuses, and non-transitory computer-readable medium described herein may further include operations, features, means, or instructions for transmitting, to the one or more first MLDs via the first radio frequency link, one or more communication parameters for establishing the communications according to the multi-link operation for the wireless local area network, the one or more communication parameters including a traffic indication, or communication updates, or both.

Some examples of the method, apparatuses, and non-transitory computer-readable medium described herein may further include operations, features, means, or instructions for transmitting, to the one or more first MLDs via the first radio frequency link, timing information for communicating via the second radio frequency link, where the timing information includes a timing offset with respect to a timing value in the first radio frequency link.

Some examples of the method, apparatuses, and non-transitory computer-readable medium described herein may further include operations, features, means, or instructions for performing, via the first radio frequency link, a management frame exchange operation to determine communication parameters for the data communications via the second radio frequency link.

In some examples of the method, apparatuses, and non-transitory computer-readable medium described herein, the management frame exchange operation includes transmitting a set of multiple management frames and each management frame of the set of multiple management frames may be addressed to at least one of the one or more first MLDs.

Some examples of the method, apparatuses, and non-transitory computer-readable medium described herein may further include operations, features, means, or instructions for transmitting, via the first radio frequency link, at least one of a number of sectors, dwell time per sector of the number of sectors, a number of beacon intervals, or a combination thereof, where communicating with the one or more first MLDs may be based on the transmitting.

Some examples of the method, apparatuses, and non-transitory computer-readable medium described herein may further include operations, features, means, or instructions for performing, via the first radio frequency link, a service period setup operation to schedule one or more dedicated service periods for communications with the one or more first MLDs.

Some examples of the method, apparatuses, and non-transitory computer-readable medium described herein may further include operations, features, means, or instructions for receiving, from at least one of the one or more first MLDs and via the first radio frequency link, a request to schedule a set of multiple service periods for data communications via the second radio frequency link.

Some examples of the method, apparatuses, and non-transitory computer-readable medium described herein may further include operations, features, means, or instructions for transmitting, via the first radio frequency link, an indication of one or more opportunistic service periods available for communications with the one or more first MLDs in addition to one or more dedicated service periods allocated to the one or more first MLDs.

In some examples of the method, apparatuses, and non-transitory computer-readable medium described herein, the second MLD and the one or more first MLDs include at least one of a single link single radio device, a multi-link single radio device, a multi-link multi-radio device, or a combination thereof. In some examples of the method, apparatuses, and non-transitory computer-readable medium described herein, the first radio frequency link may be lower than the second radio frequency link.

In some examples of the method, apparatuses, and non-transitory computer-readable medium described herein, the second MLD includes an AP MLD and the one or more first MLDs includes one or more non-AP MLD.

A method for wireless communication at a first MLD is described. The method may include receiving an indication of at least a portion of a beacon interval timeline for communications between a second MLD and the first MLD on a first radio frequency link in accordance with a multi-link operation for a wireless local area network, where the beacon interval timeline includes at least one of a beacon transmit interval, and one or more service periods, channel access between the first MLD and the second MLD over a second radio frequency link being via the one or more service periods, where a service period is scheduled for communications on the second radio frequency link with at least one first MLD of the first MLD and communicating with the second MLDs in accordance with at least one of the beacon transmit interval and the one or more service periods.

An apparatus for wireless communication at a first MLD is described. The apparatus may include a processor, memory coupled with the processor, and instructions stored in the memory. The instructions may be executable by the processor to cause the apparatus to receive an indication of at least a portion of a beacon interval timeline for communications between a second MLD and the first MLD on a first radio frequency link in accordance with a multi-link operation for a wireless local area network, where the beacon interval timeline includes at least one of a beacon transmit interval, and one or more service periods, channel access between the first MLD and the second MLD over a second radio frequency link being via the one or more service periods, where a service period is scheduled for communications on the second radio frequency link with at least one first MLD of the first MLD and communicate with the second MLDs in accordance with at least one of the beacon transmit interval and the one or more service periods.

Another apparatus for wireless communication at a first MLD is described. The apparatus may include means for receiving an indication of at least a portion of a beacon interval timeline for communications between a second MLD and the first MLD on a first radio frequency link in accordance with a multi-link operation for a wireless local area network, where the beacon interval timeline includes at least one of a beacon transmit interval, and one or more service periods, channel access between the first MLD and the second MLD over a second radio frequency link being via the one or more service periods, where a service period is scheduled for communications on the second radio frequency link with at least one first MLD of the first MLD and means for communicating with the second MLDs in accordance with at least one of the beacon transmit interval and the one or more service periods.

A non-transitory computer-readable medium storing code for wireless communication at a first MLD is described. The code may include instructions executable by a processor to receive an indication of at least a portion of a beacon interval timeline for communications between a second MLD and the first MLD on a first radio frequency link in accordance with a multi-link operation for a wireless local area network, where the beacon interval timeline includes at least one of a beacon transmit interval, and one or more service periods, channel access between the first MLD and the second MLD over a second radio frequency link being via the one or more service periods, where a service period is scheduled for communications on the second radio frequency link with at least one first MLD of the first MLD and communicate with the second MLDs in accordance with at least one of the beacon transmit interval and the one or more service periods.

Some examples of the method, apparatuses, and non-transitory computer-readable medium described herein may further include operations, features, means, or instructions for performing, during the beacon transmit interval, a sector sweep of a set of beacon frames, where the second MLD communicates with the first MLD based on performing the sector sweep.

In some examples of the method, apparatuses, and non-transitory computer-readable medium described herein, the set of beacon frames includes at least one of a basic service set identifier identifying the second MLD, a sector identifier associated with beam training, a timing synchronization function, a duration of a beacon interval, a traffic indication map, or a combination thereof.

Some examples of the method, apparatuses, and non-transitory computer-readable medium described herein may further include operations, features, means, or instructions for receiving, via the first radio frequency link, at least one of a number of sectors, dwell time per sector of the number of sectors, a number of beacon intervals during which the beacon transmit interval may be skipped, or a combination thereof, where communication during the one or more service periods may be via the second radio frequency link.

Some examples of the method, apparatuses, and non-transitory computer-readable medium described herein may further include operations, features, means, or instructions for performing a service period setup operation to schedule the one or more service periods on the first radio frequency link for communications with the second MLD. In some examples of the method, apparatuses, and non-transitory computer-readable medium described herein, the service period setup operation may be via the first radio frequency link or the second radio frequency link.

Some examples of the method, apparatuses, and non-transitory computer-readable medium described herein may further include operations, features, means, or instructions for receiving, during the service period setup operation, an indication of allocation of two or more dedicated service periods, where the two or more dedicated service periods may be included in the one or more service periods in the beacon interval.

In some examples of the method, apparatuses, and non-transitory computer-readable medium described herein, the allocation may be based on a traffic profile associated with the first MLD. Some examples of the method, apparatuses, and non-transitory computer-readable medium described herein may further include operations, features, means, or instructions for transmitting, to the second MLD and during the service period setup operation, a request for a dedicated service period for a peer-to-peer communication.

Some examples of the method, apparatuses, and non-transitory computer-readable medium described herein may further include operations, features, means, or instructions for receiving a query to enable an overlapping dedicated service period, where the first MLD and at least an additional MLD may have the overlapping dedicated service period.

In some examples of the method, apparatuses, and non-transitory computer-readable medium described herein, the query may be included in a trigger frame or a power save poll or a quality of service null frame.

Some examples of the method, apparatuses, and non-transitory computer-readable medium described herein may further include operations, features, means, or instructions for transmitting, to the second MLD, a response to the query and communicating during the overlapping dedicated service period based on transmitting the response.

In some examples of the method, apparatuses, and non-transitory computer-readable medium described herein, the response to the query includes a trigger-based physical layer protocol data unit or an acknowledgement.

Some examples of the method, apparatuses, and non-transitory computer-readable medium described herein may further include operations, features, means, or instructions for transmitting, to the second MLD, a response to the query, the response including information requesting beam training for the first MLD.

In some examples of the method, apparatuses, and non-transitory computer-readable medium described herein, a third MLD and a fourth MLD communicate over a common overlapping dedicated service period and a first beamformed link associated with the third MLD may be orthogonal to a second beamformed link associated with the fourth MLD.

Some examples of the method, apparatuses, and non-transitory computer-readable medium described herein may further include operations, features, means, or instructions for communicating with the second MLD during a dedicated service period and receiving, after conclusion of the dedicated service period and based on additional downlink buffer units remaining after conclusion of the dedicated service period, the indication of at least the portion of the timeline, where the indication may be of at least one opportunistic service period for communications with the second MLD.

Some examples of the method, apparatuses, and non-transitory computer-readable medium described herein may further include operations, features, means, or instructions for transmitting, to the second MLD, a response confirming availability of the first MLD for using the at least one opportunistic service period.

Some examples of the method, apparatuses, and non-transitory computer-readable medium described herein may further include operations, features, means, or instructions for communicating with the second MLD during the at least one opportunistic service period based on transmitting the response.

Some examples of the method, apparatuses, and non-transitory computer-readable medium described herein may further include operations, features, means, or instructions for communicating with the second MLD during a dedicated service period, transmitting information indicative of pending uplink buffer units remaining at the first MLD after conclusion of the dedicated service period, and receiving, based on transmitting the information indicative of the pending uplink buffer units and after conclusion of the dedicated service period, the indication of at least the portion of the timeline, where the indication may be of at least one opportunistic service period available for communications with the second MLD.

Some examples of the method, apparatuses, and non-transitory computer-readable medium described herein may further include operations, features, means, or instructions for transmitting, to the second MLD, a response confirming availability of the first MLD for using the at least one opportunistic service period.

Some examples of the method, apparatuses, and non-transitory computer-readable medium described herein may further include operations, features, means, or instructions for communicating with the second MLD during the at least one opportunistic service period based on transmitting the response.

Some examples of the method, apparatuses, and non-transitory computer-readable medium described herein may further include operations, features, means, or instructions for receiving, via the first radio frequency link, the indication of at least the portion of the timeline, where the indication may be of one or more opportunistic service periods available for communications with the first MLD, where communications during the one or more service periods may be via the second radio frequency link.

In some examples of the method, apparatuses, and non-transitory computer-readable medium described herein, receiving the indication may include operations, features, means, or instructions for receiving, from the second MLD, a broadcast of the indication of one or more opportunistic service periods available for communications with the first MLD.

In some examples of the method, apparatuses, and non-transitory computer-readable medium described herein, receiving the indication may include operations, features, means, or instructions for receiving, from the second MLD, the indication of the one or more opportunistic service periods available for communications with the second MLD.

Some examples of the method, apparatuses, and non-transitory computer-readable medium described herein may further include operations, features, means, or instructions for transmitting, during a dedicated service period of the one or more service periods, a status report and receiving, from the second MLD and based on transmitting the status report, the indication of at least the portion of the timeline, where the indication may be of at least one opportunistic service period.

In some examples of the method, apparatuses, and non-transitory computer-readable medium described herein, the status report includes at least one of a buffer status report, a data frame, an acknowledgement frame, or a combination thereof.

Some examples of the method, apparatuses, and non-transitory computer-readable medium described herein may further include operations, features, means, or instructions for receiving, from the second MLD, the indication of at least the portion of the timeline, where the indication may be of at least one opportunistic service period, transmitting, to the second MLD, a response to the indication of the at least one opportunistic service period, and communicating with the second MLD during the at least one opportunistic service period based on transmitting the response.

In some examples of the method, apparatuses, and non-transitory computer-readable medium described herein, the one or more service periods includes a set of target wake time service periods and the one or more service periods may be allocated to the first MLD using frame exchanges via the first radio frequency link for communicating via the second radio frequency link.

In some examples of the method, apparatuses, and non-transitory computer-readable medium described herein, beacon interval includes at least one of the beacon transmit interval, one or more dedicated service periods and one or more opportunistic service periods.

In some examples of the method, apparatuses, and non-transitory computer-readable medium described herein, the beacon interval may be divided into a set of multiple equal sized time blocks and a bit in a bitmap may be associated with a corresponding time block of the set of multiple equal sized time blocks.

Some examples of the method, apparatuses, and non-transitory computer-readable medium described herein may further include operations, features, means, or instructions for receiving, from the second MLD and via the first radio frequency link, a management frame including an indicating of the bitmap, where the communicating includes communicating with the second MLD via the second radio frequency link.

In some examples of the method, apparatuses, and non-transitory computer-readable medium described herein, the management frame includes a beacon frame or a probe response frame. Some examples of the method, apparatuses, and non-transitory computer-readable medium described herein may further include operations, features, means, or instructions for transmitting, to the second MLD, a request for additional time blocks based on a position of the bit in the bitmap and receiving a response based on transmitting the request for the additional time blocks.

In some examples of the method, apparatuses, and non-transitory computer-readable medium described herein, the response includes an acceptance of the request for the additional time blocks or a denial of the request for the additional time blocks or information indicative of an alternative number of additional time blocks.

In some examples of the method, apparatuses, and non-transitory computer-readable medium described herein, the one or more service periods includes one or more opportunistic service periods and one or more dedicated service periods and an opportunistic service period may be located in a time gap between the one or more dedicated service periods.

In some examples of the method, apparatuses, and non-transitory computer-readable medium described herein, the one or more service periods includes one or more opportunistic service periods and one or more dedicated service periods and the one or more dedicated service periods may be associated with a first periodicity and of the one or more opportunistic service periods may be associated with a second periodicity. In some examples of the method, apparatuses, and non-transitory computer-readable medium described herein, the second MLD includes an AP MLD and the first MLD includes a non-AP MLD.

In some examples of the method, apparatuses, and non-transitory computer-readable medium described herein, the first radio frequency link may be lower than the second radio frequency link.

A method for wireless communication at a first MLD is described. The method may include establishing communications according to a multi-link operation for a wireless local area network including a second MLD and the first MLD, where the multi-link operation includes a second radio frequency link for data communications and a first radio frequency link for control communications, communicating the control communications with the second MLD over the first radio frequency link in accordance with the multi-link operation for the wireless local area network, and communicating the data communications with the second MLD over the second radio frequency link in accordance with the multi-link operation for the wireless local area network.

An apparatus for wireless communication at a first MLD is described. The apparatus may include a processor, memory coupled with the processor, and instructions stored in the memory. The instructions may be executable by the processor to cause the apparatus to establish communications according to a multi-link operation for a wireless local area network including a second MLD and the first MLD, where the multi-link operation includes a second radio frequency link for data communications and a first radio frequency link for control communications, communicate the control communications with the second MLD over the first radio frequency link in accordance with the multi-link operation for the wireless local area network, and communicate the data communications with the second MLD over the second radio frequency link in accordance with the multi-link operation for the wireless local area network.

Another apparatus for wireless communication at a first MLD is described. The apparatus may include means for establishing communications according to a multi-link operation for a wireless local area network including a second MLD and the first MLD, where the multi-link operation includes a second radio frequency link for data communications and a first radio frequency link for control communications, means for communicating the control communications with the second MLD over the first radio frequency link in accordance with the multi-link operation for the wireless local area network, and means for communicating the data communications with the second MLD over the second radio frequency link in accordance with the multi-link operation for the wireless local area network.

A non-transitory computer-readable medium storing code for wireless communication at a first MLD is described. The code may include instructions executable by a processor to establish communications according to a multi-link operation for a wireless local area network including a second MLD and the first MLD, where the multi-link operation includes a second radio frequency link for data communications and a first radio frequency link for control communications, communicate the control communications with the second MLD over the first radio frequency link in accordance with the multi-link operation for the wireless local area network, and communicate the data communications with the second MLD over the second radio frequency link in accordance with the multi-link operation for the wireless local area network.

Some examples of the method, apparatuses, and non-transitory computer-readable medium described herein may further include operations, features, means, or instructions for receiving, from the second MLD via the first radio frequency link, one or more communication parameters for establishing the communications according to the multi-link operation for the wireless local area network, the one or more communication parameters including a traffic indication, or communication updates, or both.

Some examples of the method, apparatuses, and non-transitory computer-readable medium described herein may further include operations, features, means, or instructions for receiving, from the second MLD via the first radio frequency link, timing information for communicating via the second radio frequency link, where the timing information includes a timing offset with respect to a timing value in the first radio frequency link.

Some examples of the method, apparatuses, and non-transitory computer-readable medium described herein may further include operations, features, means, or instructions for performing, via the first radio frequency link, a management frame exchange operation to determine communication parameters for the data communications via the second radio frequency link.

In some examples of the method, apparatuses, and non-transitory computer-readable medium described herein, the management frame exchange operation includes transmitting a set of multiple management frames and each management frame of the set of multiple management frames may be addressed to the first MLD.

Some examples of the method, apparatuses, and non-transitory computer-readable medium described herein may further include operations, features, means, or instructions for receiving, via the first radio frequency link, at least one of a number of sectors, dwell time per sector of the number of sectors, a number of beacon intervals, or a combination thereof, where communicating with the second MLD may be based on the receiving.

Some examples of the method, apparatuses, and non-transitory computer-readable medium described herein may further include operations, features, means, or instructions for performing, via the first radio frequency link, a service period setup operation to schedule one or more dedicated service periods for communications with the second MLD.

Some examples of the method, apparatuses, and non-transitory computer-readable medium described herein may further include operations, features, means, or instructions for transmitting, to the second MLD and via the first radio frequency link, a request to schedule a set of multiple service periods for data communications via the second radio frequency link.

Some examples of the method, apparatuses, and non-transitory computer-readable medium described herein may further include operations, features, means, or instructions for receiving, via the first radio frequency link, an indication of one or more opportunistic service periods available for communications with the second MLD in addition to one or more dedicated service periods allocated to the first MLD.

In some examples of the method, apparatuses, and non-transitory computer-readable medium described herein, the second MLD and the first MLD include at least one of a single link single radio device, a multi-link single radio device, a multi-link multi-radio device, or a combination thereof.

In some examples of the method, apparatuses, and non-transitory computer-readable medium described herein, the first radio frequency link may be lower than the second radio frequency link. In some examples of the method, apparatuses, and non-transitory computer-readable medium described herein, the second MLD includes an AP MLD and the first MLD includes a non-AP MLD.

DETAILED DESCRIPTION

Figure 1:
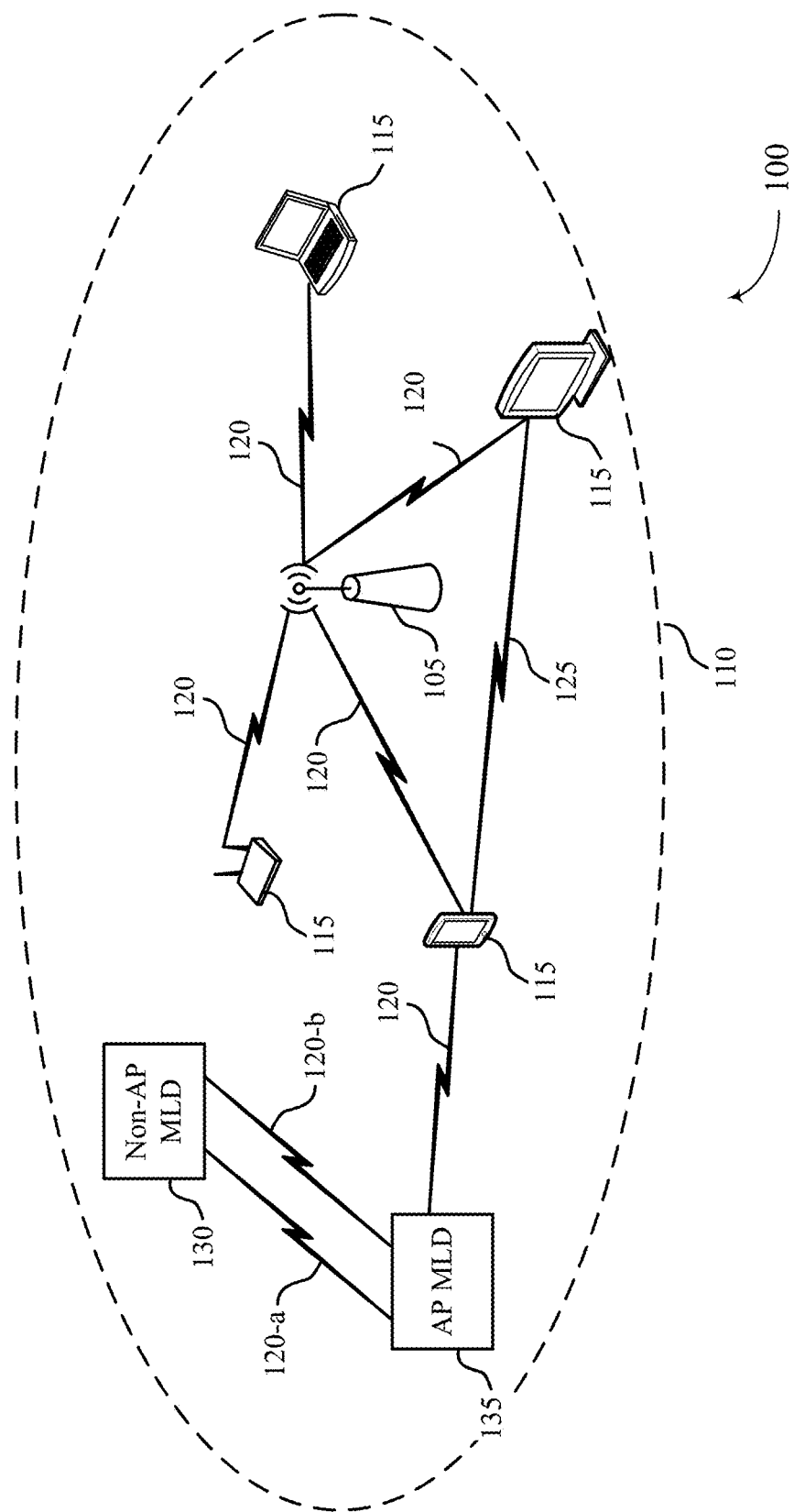
FIG. 1 illustrates an example of a wireless communication at a multi-link device system that supports techniques for channel access in wireless communications systems in accordance with aspects of the present disclosure.

In some deployments, devices (such as wireless fidelity (Wi-Fi) devices) may support multi-link operation according to which the devices may communicate via multiple different links. For example, an access point (AP) multi-link device (MLD) may communicate with a non-AP MLD via a 2.4 gigahertz (GHz) link, a 5 GHz link, a 6 GHz link, or any combination thereof. In some systems, an AP MLD and a non-AP MLD may be capable of communication via other radio frequency links, such as 3.5 GHz, 45 GHz, or 60 GHz links, which may provide relatively higher data rates, a cleaner (such as less crowded) operating channel, or greater link diversity. Communication devices (e.g., multi-link devices (MLDs)) may use multiple radio frequency links to communicate with each other. MLDs may communicate using a first radio frequency link (e.g., sub7 frequency band) and a second radio frequency link (e.g., 3.5 GHz, 45 GHz, or 60 GHz frequency band). The second radio frequency link (e.g., a 3.5 GHz link, a 45 GHz link, or a 60 GHz frequency band may provide a large available spectrum for communications in wireless local area networks (WLAN) (e.g., Wi-Fi). Some WLANs may support multi-link operation in which the MLDs may communicate over multiple frequency ranges. For example, wireless devices in a WLAN may communicate over one or more sub7 radio frequency links (e.g., 6 GHz, 5 GHz, 2.4 GHz) in addition to over a high radio frequency link (e.g., a 3.5 GHz link, a 45 GHz link, or a 60 GHz radio frequency link). However, operating in a second radio frequency link (e.g., a 3.5 GHz link, a 45 GHz link, or a 60 GHz frequency link) may result in high propagation loss. Due to propagation loss, communication between peer devices over a second radio frequency link (e.g., a 3.5 GHz link, a 45 GHz link, or a 60 GHz frequency band) may demand beamforming on both ends (e.g., the transmitter and receiver side). MLDs may communicate over other radio frequency links (e.g., sub7 frequency band including a 2.4 GHz link, a 5 GHz link, or a 6 GHz link) without the use of beamforming, and therefore MLDs may transmit and receive communications over sub7 frequency band links without consideration of the location of the devices. Additionally or alternatively, the second radio frequency link (e.g., a 3.5 GHz link, a 45 GHz link, or a 60 GHz frequency band) may be unsuitable for contention based access. In addition, communicating on the 3.5 GHz link, the 45 GHz link, or the 60 GHz link may lead to a high resource consumption.

One or more aspects of the present disclosure may provide for techniques of communications in accordance with a multi-link operation using one or more radio frequency links. In particular, according to one or more aspects depicted herein, MLDs may communicate using a first radio frequency link (e.g., sub7 frequency band) and a second radio frequency link (e.g., a 3.5 GHz link, a 45 GHz link, or a 60 GHz frequency band). In particular, an access point (AP) in a multi-link operation may communicate control signals via a first radio frequency link (e.g., sub7 radio frequency link), and the AP may communicate data with stations via a second radio frequency link (e.g., a 3.5 GHz link, a 45 GHz link, or a 60 GHz radio frequency link). Additionally or alternatively, stations may communicate data with each other (e.g., peer to peer communications) via the second radio frequency link. In some examples, the AP (e.g., AP-MLD) and the stations (e.g., non-AP MLDs) may perform a service period setup using a first radio frequency link (e.g., sub7 radio frequency link) and may communicate during the service periods using a second radio frequency link (e.g., a 3.5 GHz link, a 45 GHz link, or a 60 GHz radio frequency link). The communications between multiple MLDs may be in accordance with a timeline that is specific for the multi-link operation. A non-AP MLD (e.g., MLD communicating using a station) may communicate with an AP MLD (e.g., MLD communicating using an AP) in accordance with a beacon interval timeline. An AP MLD may transmit an indication of at least a portion of a beacon interval timeline for communications between the second MLD and one or more non-AP MLDs on a first radio frequency link (e.g., sub7 radio frequency link) in accordance with a multi-link operation for a WLAN. The beacon interval timeline may include at least one of a beacon transmit interval, and one or more service periods, channel access between the one or more first MLDs and the second MLD over a second radio frequency link being (e.g., a 3.5 GHz link, a 45 GHz link, or a 60 GHz radio frequency link) via the one or more service periods. In some examples, a service period may include a dedicated service period or an opportunistic service period. Applicant submits that the terms dedicated service period, the opportunistic service period, the beacon transmit interval are for explanatory purposes and may be referred to using different terms.

The service period may be scheduled for communications on the second radio frequency link with at least one non-AP MLD. In some examples, a beacon transmit interval may be followed by a set of dedicated service periods and a set of opportunistic service periods. An AP MLD and a non-AP MLD may negotiate the use of the dedicated service periods using a first radio frequency link (e.g., sub7 radio frequency link). For example, a WLAN operating in accordance with a multi-link operation may include the first frequency range for control communications and a second, higher frequency range for data communications. In some examples, an AP MLD and a non-AP MLD may negotiate the usage of the dedicated service period using the sub7 radio frequency link. The AP MLD may then opportunistically use the set of opportunistic service periods after completion of data transmission on the set of dedicated service periods.

In some examples, an AP MLD may transmit a message advertising the availability of the opportunistic service periods for data communications. For example, the message may be a broadcast message or a direct message in the first radio frequency link (e.g., sub7 radio frequency link). Additionally or alternatively, the AP MLD in the WLAN operating in accordance with a multi-link operation may schedule service periods for peer to peer communications between non-AP MLDs (e.g., stations). For example, the AP MLD may transmit control information via the sub7 radio frequency link scheduling the service periods for the non-AP MLDs to communicate over the 60 GHz radio frequency link.

Aspects of the disclosure are initially described in the context of a wireless communications system. Aspects of the disclosure are further described in the context of communication timelines and process flow. Aspects of the disclosure are further illustrated by and described with reference to apparatus diagrams, system diagrams, and flowcharts that relate to techniques for channel access in wireless communications systems FIG. 1 illustrates a WLAN 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a BSS or an ESS. The various STAs 115 in the network are able to communicate with one another through the AP 105. Also shown is a coverage area 110 of the AP 105, which may represent a BSA of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem.

In some implementations, the WLAN 100 may support multi-link operation according to which two or more devices may communicate via two or more wireless links, such as two or more radio frequency links. In such implementations, the WLAN 100 may include one or more MLDs that are capable of communicating (such as transmitting or receiving) via multiple links. In some aspects, two or more STAs 115 may be associated or affiliated with a first MLD, such as a non-AP MLD 130, and two or more APs 105 may be associated or affiliated with a second MLD, such as an AP MLD 135. The two or more STAs 115 or APs 105 associated or affiliated with an MLD may be associated with the multiple functionalities of the MLD.

For example, an MLD may be a device that is capable of communicating via multiple radio frequency links and operation or functionality of the MLD at each of the multiple radio frequency links may be described as being performed by a respective STA 115 (in examples in which the MLD is a non-AP MLD 130) or a respective AP 105 (in examples in which the MLD is an AP MLD 135). As such, a non-AP MLD 130 may communicate (such as transmit or receive) via a first radio frequency link using a first STA 115 and may communicate (such as transmit or receive) via a second radio frequency link using a second STA 115. Similarly, an AP MLD 135 may communicate (such as transmit or receive) via a first radio frequency link using a first AP 105 and may communicate (such as transmit or receive) via a second radio frequency link using a second AP 105. For example, a non-AP MLD 130 may effectively communicate with an AP MLD 135 via a wireless link 120-*a* using a first STA-AP pair and via a wireless link 120-*b* using a second STA-AP pair.

A non-AP MLD 130 and an AP MLD 135 may communicate via various radio frequency links, including a 2.4 GHz link, a 5 GHz link, and a 6 GHz link. In some systems, the 2.4 GHz link, the 5 GHz link, and the 6 GHz link may be relatively easy to access. For example, a non-AP MLD 130 and an AP MLD 135 may access or communicate using (such as transmit or receive via) any one or more of the 2.4 GHz link, the 5 GHz link, and the 6 GHz link without negotiating access on a different link, without an access constraint (such as an access constraint associated with a service type), or without applying techniques associated with mitigating propagation path loss (such as focusing transmission and reception in a specific direction via beamforming). Some other radio frequency links, however, may be associated with an access constraint or difficulty and, in some implementations, a non-AP MLD 130 and an AP MLD 135 may use any one or more of the 2.4 GHz link, the 5 GHz link, and the 6 GHz link to support and facilitate communications via such other radio frequency links.

Such other radio frequency links may include a 3.5 GHz link, a 45 GHz link, or a 60 GHz link. An access constraint of the 3.5 GHz link, for example, may be associated with other devices (such as incumbent devices) already having access and priority to the 3.5 GHz link. For example, some military and commercial equipment may operate via the 3.5 GHz link and such equipment may have a priority to the 3.5 GHz link. As such, while some Wi-Fi devices or other wireless devices may be permitted to use the 3.5 GHz link, such devices may be configured or indicated to turn off or back off when an incumbent device is transmitting. Accordingly, discovery, setup, and coordination exchanges for a potentially deprioritized device using the 3.5 GHz link may be impractical (as they may be interrupted or precluded from transmission relatively often). An access constraint of the 45 GHz link or the 60 GHz link may be associated with characteristics and challenges associated with communication at relatively higher radio frequencies. In addition, the 45 GHz link and the 60 GHz link may be associated with reachability issues (due to relatively high propagation path loss) and a use of beamforming (such as highly focused transmissions) to achieve a suitable signal quality. Such reachability issues and use of beamforming may make discovery, setup, and coordination exchanges using the 45 GHz link or the 60 GHz link impractical as well, as the reachability issues and the use of beamforming may cause communicating devices to transmit or receive a relatively large amount of overhead signaling or experience link failure relatively often, or both.

Communications devices may operate on multiple radio frequency links to enhance resource utilization and increase However, operating on 60 GHz radio frequency link may present several challenges. Due to high propagation loss, devices communicating using the 60 GHz radio frequency link may perform beamforming for communication. In addition, AP-MLDs and non-AP MLDs may not be able to effectively perform contention-based access in 60 GHz radio frequency link. One or more techniques depicted herein provide for enhancing communications using the 60 GHz radio frequency link, making the 60 GHz radio frequency link more accessible and reliable.

In some aspects, a non-AP MLD and an AP MLD may communicate using a first radio frequency link (e.g., sub7 radio frequency link) as an anchor link. In some examples, operation on a second radio frequency link (e.g., 60 GHz radio frequency link) may include repeating beacon intervals. Each beacon interval may include a beacon header interval and a data transmission interval. Additionally or alternatively, the beacon header interval may include three sub-intervals: a beacon transmit interval, during which an AP transmits multiple directional beacons, an association beamforming training during which stations perform beam-training for communication with the AP, and an announcement transmission interval during which the AP exchanges management frames with associated and beam trained stations. The data transmission interval may include one or more contention-based access periods and schedule service periods (SPs) for exchanging data frames. The service periods may be dynamic or pseudo-static in nature. In some examples, the AP and the station may communicate data during the data transmission interval. Communication during the data transmission interval can be contention-based or according to scheduled service periods. In some aspects, service period-based channel access may have several benefits. For instance, service period-based channel access may be more efficient than contention-based access periods (as service period duration may be adapted to meet the traffic needs), may have deterministic times for communication (using beam directionality), and may enhance reliable communications. However, setting up service periods may involve an AP polling (to gather resource requirement) and performing an announcement of service periods. In some examples, such service period announcement may be performed during early portion the data transmission interval, thereby reducing the available time during data transmission interval for exchanging data.

Aspects of the present disclosure provide for using a sub7 radio frequency link for setting up a service period and using a 60 GHz radio frequency link for performing data communications during the service periods. AP MLDs 135 and non-AP MLDs 130 may use the 60 GHz radio frequency link as part of a multi-link operation setup involving sub7 radio frequency link(s). In other words, an AP 105 operating on 60 GHz radio frequency link may be affiliated with an AP MLD 135 that has at least one other AP 105 operating on sub7 radio frequency link. An AP MLD 135 may use the techniques depicted herein to use sub7 radio frequency link(s) as an anchor link to facilitate operations on 60 GHz radio frequency link. In some examples, an AP MLD 135 and a non-AP MLD 130 may establish communications according to a multi-link operation for a WLAN (e.g., WLAN 100). In some examples, the multi-link operation may include a second radio frequency link (e.g., 60 GHz radio frequency link) for data communications and a first radio frequency link (e.g., sub7 radio frequency link) for control communications. The AP MLD 135 may communicate the control communications with the non-AP MLD 130 over the first radio frequency link in accordance with the multi-link operation for the WLAN. The AP MLD 135 may further communicate the data communications with the non-AP MLD 130 over the second radio frequency link in accordance with the multi-link operation for the WLAN 100. Thus, using the 60 GHz radio frequency link for operation may reduce management overhead. The AP MLD 135 and the non-AP MLD 130 may use the techniques depicted herein to perform management frame exchanges using sub7 radio frequency links and perform the data exchange using 60 GHz radio frequency link. Thus, communication devices may perform setups for operations on 60 GHz radio frequency link via signaling on sub7 radio frequency link. That is, communication devices may use sub7 radio frequency links to coordinate transmission amongst 60 GHz participants.

Figure 2:
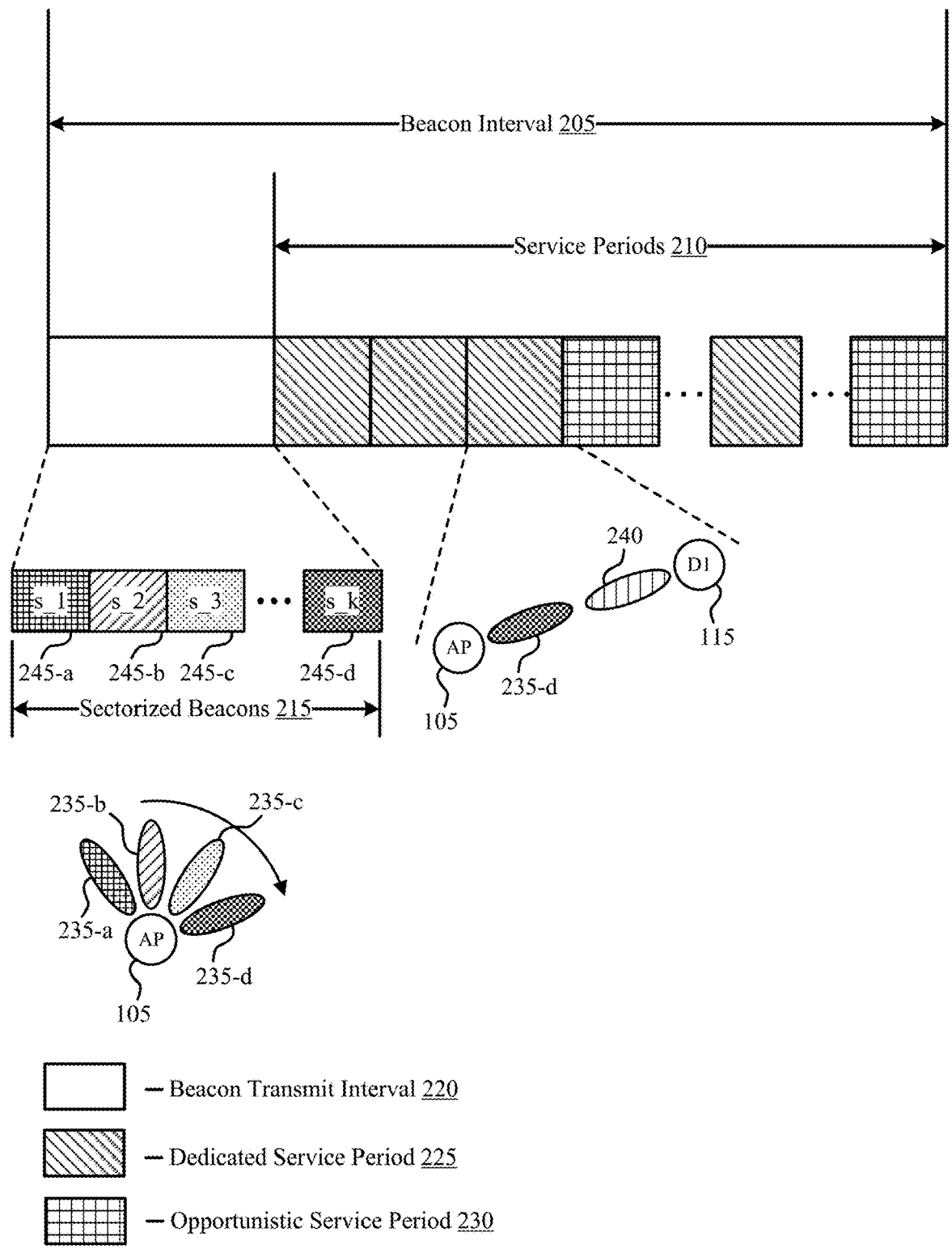
FIG. 2 illustrates an example of a communication timeline that supports techniques for channel access in wireless communications systems in accordance with one or more aspects of the present disclosure.

FIG. 2 illustrates an example of a communication timeline 200 that supports techniques for channel access in wireless communications systems in accordance with one or more aspects of the present disclosure. In particular, FIG. 2 shows an example communication timeline 200 that supports using a first radio frequency link to set up operations for a second radio frequency link. In some implementations, the communication timeline 200 may implement aspects of the system for wireless communications 100. Aspects of the communication timeline 200 may be implemented in a wireless network such as a Wi-Fi network implementing the one or more 802.11 family of standards, such as, 802.11ax, 802.11ac, or some other Wi-Fi standard. Generally, wireless communication systems (such as, the system for wireless communications 100) may be configured to support multi-link operation. In an example of a multi-link operation, an AP MLD and one or more non-AP MLDs may communicate using one or more links.

The multi-link operation framework may enable a non-AP MLD to perform one or more operations by monitoring a single link. That is, the AP MLD and the non-AP MLDs may determine a timing synchronization function (or any other timing) for 60 GHz radio frequency link from sub7 radio frequency link. In multi-link operation framework, there may be a fixed timing synchronization function offset between links. Therefore, the AP MLD and the non-AP MLD may use timing synchronization function of sub7 radio frequency link as a reference. According to one or more aspects, an AP MLD may provide traffic indication and indication for one or more updates indication via beacons on sub7 radio frequency link. In some cases, a non-AP MLD may not monitor beacons on 60 GHz radio frequency link for performing one or more operations. However, an AP MLD may use sectorized beacon for a non-AP MLD to decide if beam training is requested. For example, the AP MLD may perform beam training if a beacon a received signal strength indicator, drops below a certain threshold. For instance, the AP MLD may determine that a received signal strength indicator is less than a threshold value. In such cases, the AP MLD may infer that there is a need for sectorized beacons and may hence perform a beacon interval timeline. Thus, techniques depicted herein provide for a multilink operation frame including a mechanism to tunnel individually addressed management frames. Therefore, an AP MLD may transmit individually addressed management frames for 60 GHz radio frequency link on a sub7 radio frequency link. This eliminates the need for a dedicated interval for exchanging individually addressed management frames.

An AP MLD may perform a beam training procedure to measure a signal strength associated with one or more beam pairs and to select a beam pair associated with a suitable or greatest signal strength. In some implementations, the beam training procedure in accordance with communication timeline 200 may be a beacon frame-based beam training procedure according to which communicating devices may perform beam training via one or more sectorized beacons. For example, a beacon interval 205 may include a beacon transmit interval 220 during which an AP 105 may transmit sectorized beacons in different beamformed directions during different beam training resources (which may generally refer to any one or more of a beam training resource 245-*a*, a beam training resource 245-*b*, a beam training resource 245-*c*, and a beam training resource 245-*d*).

The beam training resource $s_1$ may be associated with a directional beam 235-*a* (which may be denoted as $s_1$) and the AP 105 may accordingly transmit a sectorized beacon frame during the beam training resource 245-*a* using the directional beam 235-*a*. Similarly, the beam training resource 245-*b* may be associated with a directional beam 235-*b* (which may be denoted as $s_2$), the beam training resource 245-*c* may be associated with a directional beam 235-*c* (which may be denoted as $s_3$), and the beam training resource 245-*d* may be associated with a directional beam 235-*d* (which may be denoted as $s_k$). As such, the AP 105 may sweep across a set of directional beams 235 (which may generally refer to any one or more of the directional beam 235-*a*, the directional beam 235-*b*, the directional beam 235-*c*, or the directional beam 235-*d*) during the beacon transmit interval 220. A STA 115 may measure the various directional beams 235 used by the AP 105 and identify a suitable beam pair that the AP 105 and the STA 115 may use for exchanging data. Accordingly, the AP 105 and the STA 115 may communicate data during a service period for data frame exchange using the suitable beam pair.

As depicted in FIG. 2, the AP MLD may transmit a beacon interval 205 for communications between the AP MLD and one or more non-AP MLDs on a first radio frequency link (e.g., sub-7 radio frequency link) in accordance with a multi-link operation for a WLAN. The beacon interval 205 may include a beacon transmit interval 220 and a set of service periods 210. The set of service periods 210 may include one or more opportunistic service periods 230 and one or more dedicated service periods 225. The dedicated service periods 225 may be associated with a first periodicity and of the opportunistic service periods 230 may be associated with a second periodicity. In some examples, access between the one or more non-AP MLDs and the AP MLD over a second radio frequency link may be via the one or more service periods 210. A service period 210 may be scheduled for communications on the second radio frequency link with at least one non-AP MLD of the one or more non-AP MLDs.

For example, the STA 115 and the AP 105 may communicate during one or more of the dedicated service periods 225 using the suitable beam pair. Additionally, or alternatively, the STA 115 and the AP 105 may perform beam training during any one or more of the dedicated service periods 225. As illustrated by the FIG. 2, the AP 105 may use the directional beam 235-*d* and the STA 115 may use a directional beam 240 during a dedicated service period 225.

In some examples, an AP MLD may perform a sector sweep of (short) beacon frames (sectorized beacons 215 including S1, S2, S3, . . . Sk) during the beacon transmit interval 210. The set of beacon frames comprises at least one of a basic service set identifier identifying the second MLD, a sector identifier for beam training, a timing synchronization function, a duration of a beacon interval, a traffic indication map, or a combination thereof. The AP MLD may transmit the beacon transmit interval 210 (using an information element) via the first radio frequency link (e.g., sub7 radio frequency link). In some examples, the AP MLD may transmit at least one of a number of sectors, dwell time per sector of the number of sectors, a number of beacon intervals during which the beacon transmit interval is skipped, or a combination thereof. The AP MLD and one or more non-AP MLD may communicate during the one or more service periods 210 via the second radio frequency link (e.g., 60 GHz radio frequency link). In some examples, the AP MLD may transmit a beacon in an on-demand manner (based on a request from a non-AP MLD).

For dedicated service periods 225, an AP MLD and one or more non-AP MLD may perform a service period setup operation for data frame exchange. The AP MLD and the non-AP MLD may negotiate such schedule of service periods 210 in the sub7 radio frequency link. A non-AP MLD may negotiate more than one service period 210 in the same beacon interval 205 (based on traffic profile). The AP MLD and the non-AP MLD may negotiate one or more service periods 210 for a peer-to-peer link. For example, an AP MLD may receive, from a non-PA MLD and during a service period setup operation, a request for a dedicated service period 225 for a peer-to-peer communication. In some cases, multiple STAs may have overlapping service periods (e.g., based on a target wake time or overlapping individual target wake time). An AP MLD may determine that at least two of the one or more non-AP MLDs have an overlapping dedicated service period 225. The AP MLD may transmit a query to enable the overlapping dedicated service period 225 based on determining that the at least two of the one or more non-AP MLDs have the overlapping dedicated service period 225. In some examples, the query may be included in a trigger frame or a power save poll or a quality of service null frame or a new frame defined for this purpose. In such cases, the dedicated service periods 225 may be trigger enabled (e.g., based poll-response) such that both AP MLDs and non-AP MLDs confirm availability on 60 GHz radio frequency link. A poll-response mechanism may include a response from a non-AP MLD such that a response acts as a confirmation if the non-AP MLD is ready for communications on the 60 GHz radio frequency link. The response to the query may include a trigger-based physical layer protocol data unit or an acknowledgement or a new frame defined for this purpose.

In some examples, a non-AP MLD may transmit a response to a query from an AP MLD. In such cases, the response may include information associated with beam training. Additionally or alternatively, the response may include an indication if beam training is requested by the non-AP MLD or a peer non-AP MLD. Different pairs of non-AP MLDs whose beamformed links are orthogonal to each other may reuse the same service period 210 (i.e., sectorized reuse). Due to device mobility, such orthogonality may remain for a threshold duration. Therefore, an AP MLD may grant an overlapping schedule for a threshold time period. An AP MLD may also set up opportunistic service periods 230 during gaps between dedicated service periods 225. In some examples, an AP MLD may communicate an indication of opportunistic service periods 230 in sub7 radio frequency link. Such opportunistic service periods 230 may be supplementary to dedicated service periods 225 previously negotiated between the AP MLD and the non-AP MLD.

In some examples, the one or more service periods 210 may include a set of target wake time service periods. In some examples, the one or more service periods 210 may be allocated to a non-AP MLD using frame exchanges via the sub7 radio frequency link for communicating via the 60 GHz radio frequency link. Thus, a multi-link operation frame (supporting communication timeline 200) allows for target wake time setup for another link (tunneling). A non-AP MLD may beamform and may be ready at the beginning of a service period. The non-AP MLD may transition into a power save mode after a time out period if it is not triggered. The service period 210 may be is trigger enabled if shared (i.e., overlapping individual target wait time or broadcast target wake time). In some examples, an AP MLD may transmit a trigger at start of a service period 210 to indicate which non-AP MLD is an intended recipient during the service period. If a service period 210 is dedicated for a single non-AP MLD, then that service period 210 may not be enable using a trigger.

Figure 3:
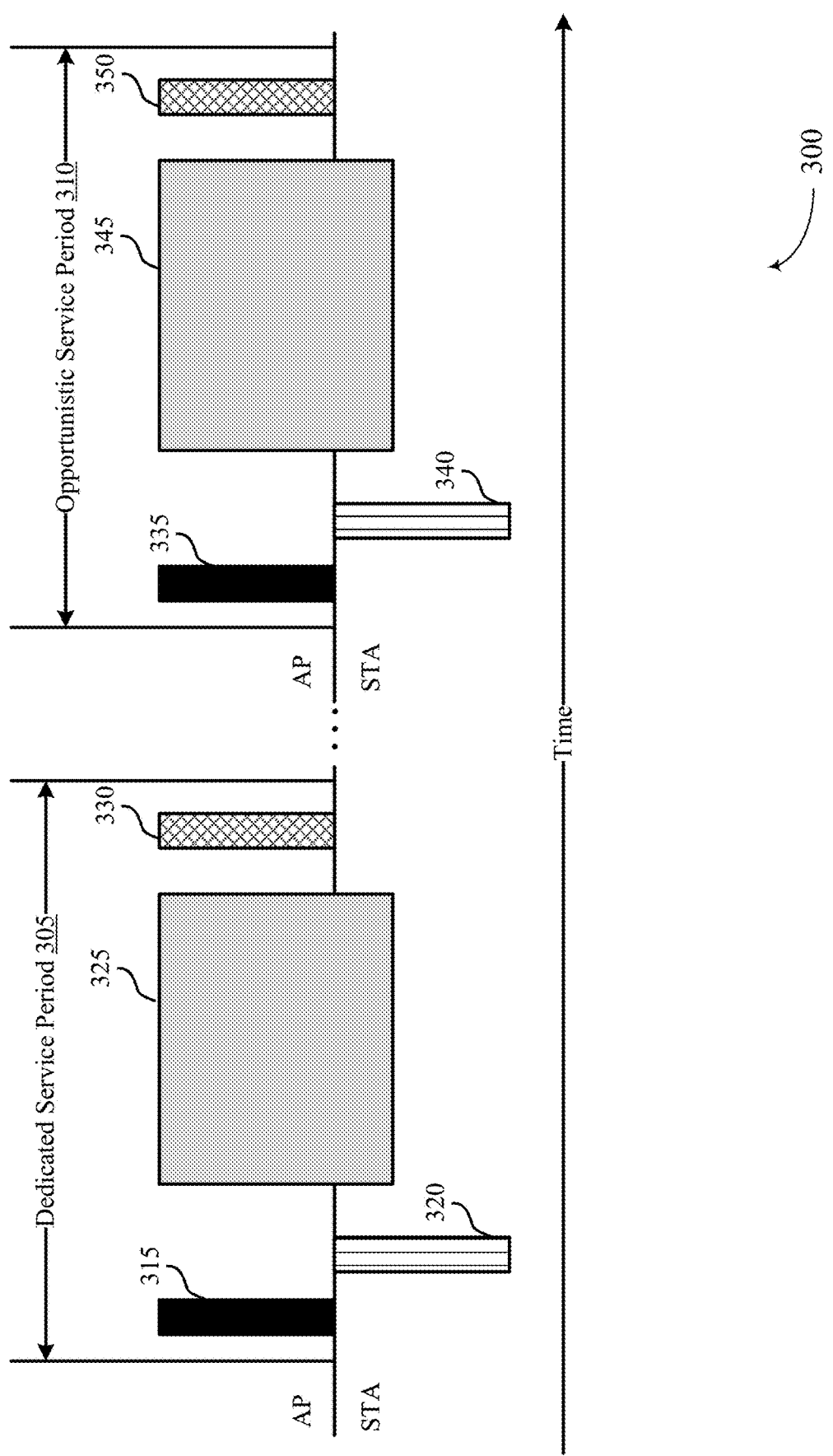
FIG. 3 illustrates an example of a communication timeline that supports techniques for channel access in wireless communications systems in accordance with one or more aspects of the present disclosure.

FIG. 3 illustrates an example of a communication timeline 300 that supports techniques for channel access in wireless communications systems in accordance with one or more aspects of the present disclosure. FIG. 3 shows an example communication timeline 300 that supports using an opportunistic service period for communicating during gaps between multiple dedicated service periods. In some implementations, the communication timeline 300 may implement aspects of the system for wireless communications 100. Aspects of the communication timeline 300 may be implemented in a wireless network such as a Wi-Fi network implementing the one or more 802.11 family of standards, such as, 802.11ax, 802.11ac, or some other Wi-Fi standard. Generally, wireless communication systems (such as, the system for wireless communications 100) may be configured to support multi-link operation. An AP MLD and one or more non-AP MLDs may communicate using one or more links in accordance with the communication timeline 300.

An AP MLD may communicate with at least one non-AP MLD during a dedicated service period. The AP MLD and one or more non-AP MLD may determine the use of the opportunistic service period based on a polling technique. An opportunistic service period may provide additional time to flush pending frames that were not serviced during a dedicated service period. As depicted in the example of FIG. 3, during a dedicated service period 305, at 315, the AP MLD may poll non-AP MLDs for the use of the dedicated service period 305. At 320, the non-AP MLD may transmit a response to the poll from the AP MLD. At 325, the AP MLD and the non-AP MLD may perform frame exchange. At 330, after completion of the frame exchange, the AP MLD may initiate an opportunistic service period 310. At the end of a dedicated service period 305, if the AP has pending downlink buffer units for the non-AP MLD, or has received an indicate of pending uplink buffer units at the non-AP MLD (e.g., via buffer status report, MORE=1 or EOPS=0 or other means), then the AP MLD may identify identifies the an opportunistic service period 310 within a current beacon interval that the pair can use to resume the frame exchange. In some examples, the AP MLD may determine that additional downlink buffer units are remaining after conclusion of the dedicated service period 305. The AP MLD may then transmit, after conclusion of the dedicated service period 305, an indication of at least the portion of a beacon interval timeline, where the indication is of at least one opportunistic service period 310 for communications with the at least one non-AP MLD. The AP MLD may receive, from the non-AP MLD, a response confirming availability for using the opportunistic service period 310. The AP MLD and the non-AP MLD may communicate during the opportunistic service period 310 based on receiving the response.

Additionally or alternatively, the AP MLD may receive information indicative of pending uplink buffer units remaining at the non-AP MLD after conclusion of the dedicated service period 305. The AP MLD may transmit, after conclusion of the dedicated service period 305, an indication of at least the portion of the beacon interval timeline, where the indication is of at least one opportunistic service period available for communications with the non-AP MLD. The AP MLD may receive a response confirming availability for using the at least one opportunistic service period 310. In some examples, the AP MLD may communicate with the non-AP MLD during the at least one opportunistic service period 310 based on receiving the response. At 335, the AP MLD may poll non-AP MLDs for the use of the opportunistic service period 310. At 340, the non-AP MLD may transmit a response to the poll from the AP MLD. At 345, the AP MLD and the non-AP MLD may perform frame exchange. At 350, after completion of the frame exchange, the AP MLD may initiate a second opportunistic service period.

According to one or more aspects depicted herein, the AP MLD may transmit, via the first radio frequency link (e.g., sub7 radio frequency link), an indication of one or more opportunistic service periods 310 available for communications with the one or more first MLDs. In some examples, communications during the one or more service periods is via the second radio frequency link (e.g., 60 GHz radio frequency link). For instance, the AP MLD may poll, in sub7 radio frequency link, to identify non-AP MLDs requesting more resources than what is already negotiated for 60 GHz radio frequency link (polling in sub7 radio frequency link may be via null data packet feedback report poll or buffer status report poll). In some examples, an AP MLD may transmit an indication for an opportunistic service period 310 via sub7 radio frequency link. For instance, the AP MLD may broadcast to the non-AP MLDs, the indication of one or more opportunistic service periods available for communications with the non-AP MLDs. Alternatively, the AP MLD may transmit the indication of the availability of opportunistic service period 310 in an individually addressed frame (1:1). The AP MLD may indicate an exact opportunistic service period 310. Alternatively, the AP MLD may not identify the exact opportunistic service periods for each non-AP MLD (includes trigger-enabled opportunistic service periods so that the non-AP MLD is aware of whether it is getting serviced during a particular service period). In some examples, the non-AP MLD may go to an inactive period if no timing function is received after a certain time out (implying that the AP MLD has not sent the timing function on a sector of an AP MLD).

Figure 4:
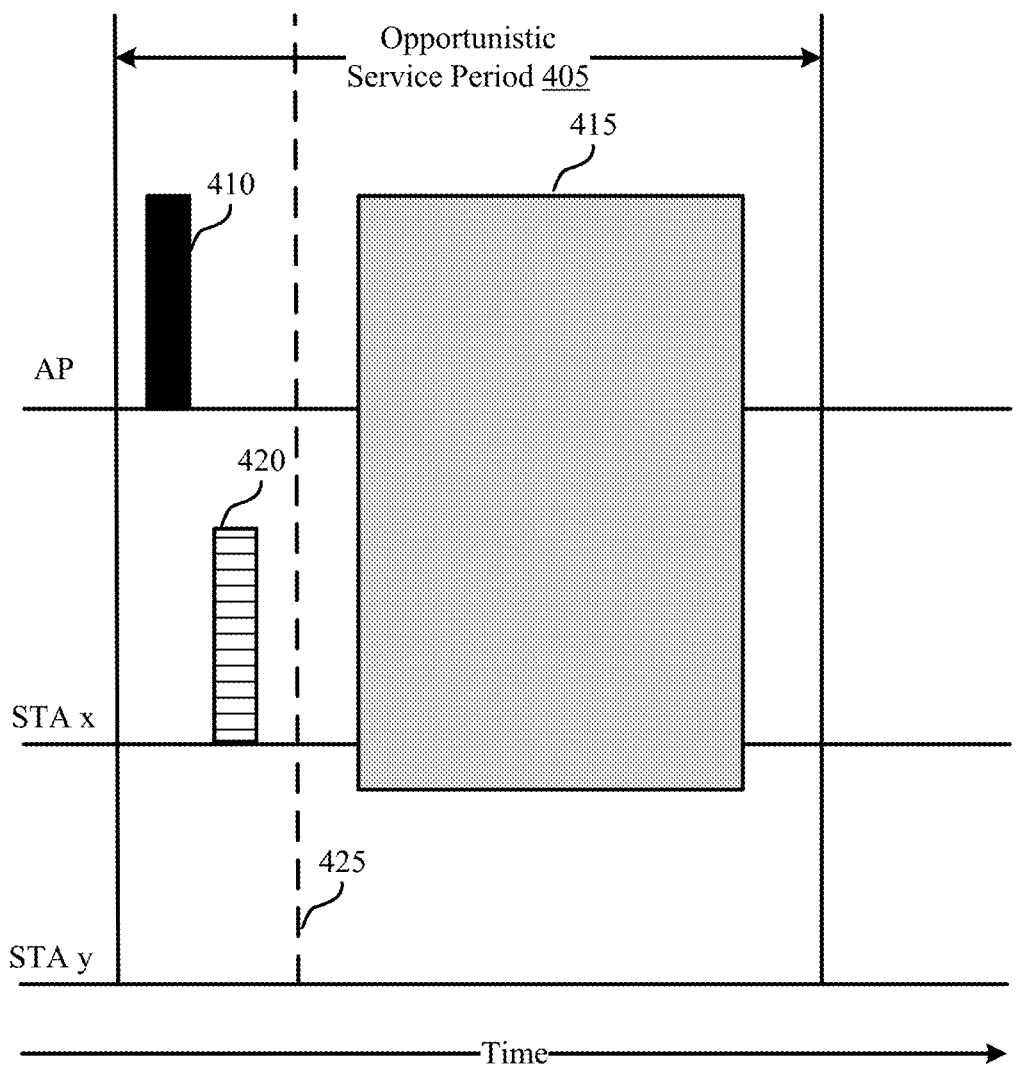
FIG. 4 illustrates an example of a communication timeline that supports techniques for channel access in wireless communications systems in accordance with one or more aspects of the present disclosure.

FIG. 4 illustrates an example of a communication timeline 400 that supports techniques for channel access in wireless communications systems in accordance with one or more aspects of the present disclosure. FIG. 4 shows an example communication timeline 400 that supports using an opportunistic service period for communicating during gaps between multiple dedicated service periods. In some implementations, the communication timeline 400 may implement aspects of the system for wireless communications 100. Aspects of the communication timeline 400 may be implemented in a wireless network such as a Wi-Fi network implementing the one or more 802.11 family of standards, such as, 802.11ax, 802.11ac, or some other Wi-Fi standard. Generally, wireless communication systems (such as, the system for wireless communications 100) may be configured to support multi-link operation. An AP MLD and one or more non-AP MLDs may communicate using one or more links in accordance with the communication timeline 300.

An AP MLD may communicate with at least one non-AP MLD during a dedicated service period. The AP MLD and one or more non-AP MLD may determine the use of the opportunistic service period in accordance with one or more aspects depicted with reference to FIG. 4. As depicted in the example of FIG. 4, after completion of the frame exchange associated with the dedicated service period, the AP MLD may initiate an opportunistic service period 405. At the end of a dedicated service period, at 410, the AP MLD may poll non-AP MLDs (e.g., STA x and STA y) for the use of the opportunistic service period 405. At 420, a first non-AP MLD (e.g., STA x) may transmit a response to the poll from the AP MLD. At 425, the other non-AP MLDs (e.g., STA y) may go to sleep after a timeout period. At 415, the AP MLD and the first non-AP MLD (e.g., STA x) may perform frame exchange.

According to one or more aspects depicted herein, an AP MLD or a non-AP MLD or both may determine need for additional service period (i.e., for participation in opportunistic service period 405) based on a status during a dedicated service period. The AP MLD mat receive, during a dedicated service period, a status report from a non-AP MLD. The AP MLD may transmit, to the non-AP MLD and based on receiving the status report, the indication of at least the portion of the timeline, where the indication is of at least one opportunistic service period 405. The status report may include at least one of a buffer status report, a data frame, an acknowledgement frame, or a combination thereof. Based on the techniques depicted herein, the AP MLD may identify one or more non-AP MLDs requesting (or in need of) additional service periods. In some cases, the AP MLD may send a poll at the beginning of the opportunistic service period 405. A non-AP MLD may wake up at the beginning of an opportunistic service period 405 to determine whether the AP is triggering in its sector. In some examples, the buffer status may be indicated using a buffer status report poll on sub7 radio frequency link and may provide status on uplink buffer units. Thus, the AP MLD may not perform no special polling on 60 GHz radio frequency link. In some examples, a non-AP MLD may provide a buffer status for peer-to-peer communication. In some examples, the buffer status may be associated with bandwidth-time product and link identifier of a 60 GHz radio frequency link. The AP MLD may also assist with off-channel target wake time.

In some examples, the opportunistic service period 405 may be contention based. The AP MLD may transmit an indication of at least a portion of beacon interval timeline, where the indication is of at least one opportunistic service period 405. The AP MLD may receive a response to the indication of the at least one opportunistic service period 405 and may communicate with the non-AP MLD during the at least one opportunistic service period 405 based on receiving the response. For instance, the AP MLD may switch its radio to omni-direction mode during an opportunistic service period 405 to hear a non-AP MLD. The non-AP MLD may contend for the medium and may send a directed poll (e.g., power save poll or quality of service poll) to the AP MLD. In such cases, the AP MLD may send a direction response to one non-AP MLD if it receives polls from more than one non-AP MLDs. In some examples, a non-AP MLD may go to an inactive mode if it doesn't receive a response within a timeout period.

Figure 5:
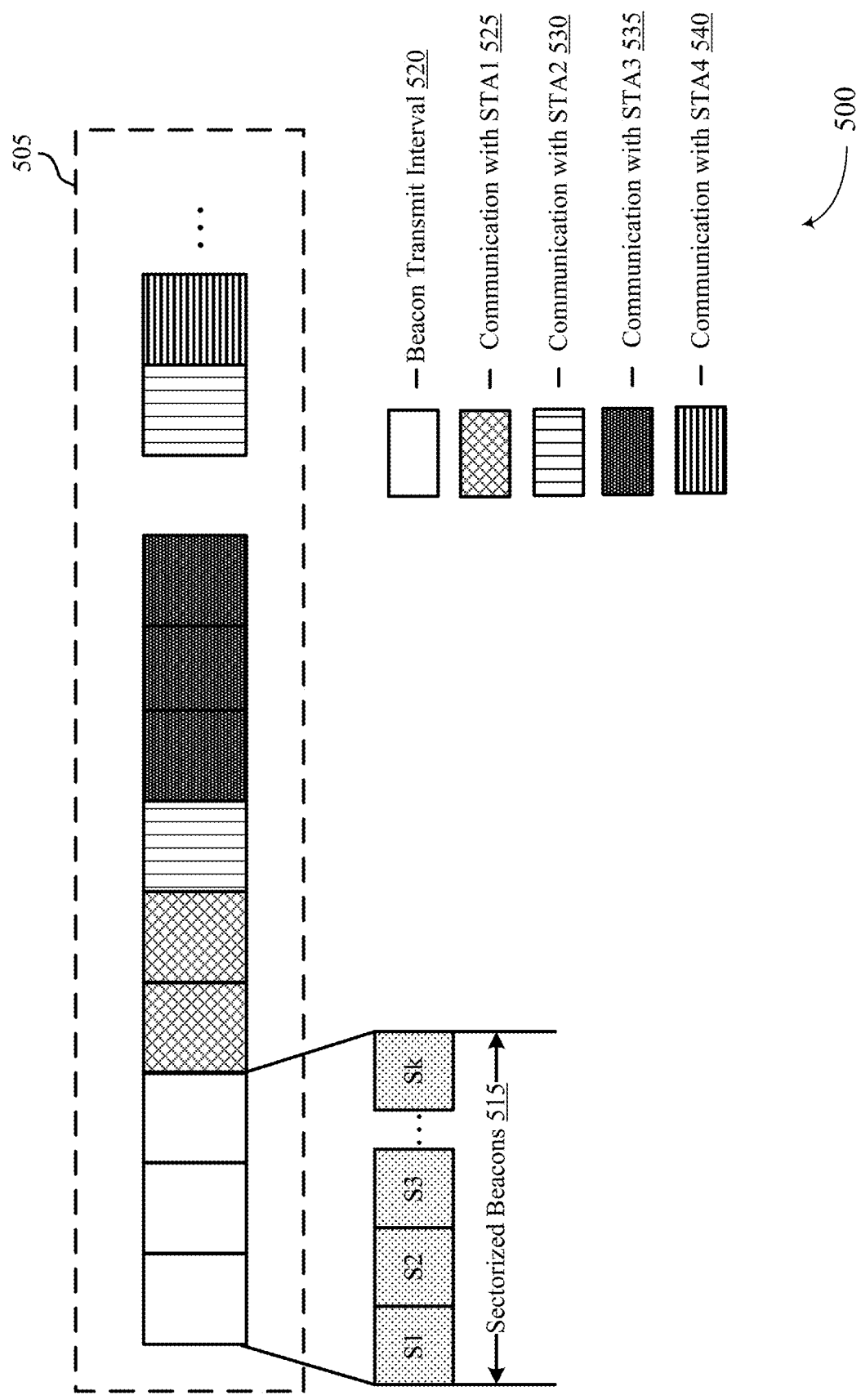
FIG. 5 illustrates an example of a beacon interval that supports techniques for channel access in wireless communications systems in accordance with one or more aspects of the present disclosure.

FIG. 5 illustrates an example of a beacon interval 500 that supports techniques for channel access in wireless communications systems in accordance with one or more aspects of the present disclosure. In particular, FIG. 5 shows an example beacon interval 500 that supports using a first radio frequency link (e.g., sub7 radio frequency link) to set up operations for a second radio frequency link (e.g., 60 GHz radio frequency link). In some implementations, the beacon interval 500 may implement aspects of the system for wireless communications 100. In an example of a multi-link operation, an AP MLD and one or more non-AP MLDs may communicate in accordance with the beacon interval 500.

The channel for the first radio frequency link (e.g., sub7 radio frequency link) may be different from the channel for the second radio frequency link (e.g., 60 GHz radio frequency link). For example, in 60 GHz radio frequency link, there may be little or no interference from overlap basic service set due to high pathloss. In basic service set, the transmissions may be highly directional and may be fully scheduled such that both the PA MLD and the non-AP MLD are beam aligned during the time. Therefore, the beacon interval 500 may be communicated in accordance with an updated target wake time schedule.

As depicted in the example of FIG. 5, the beacon interval 505 may be divided into X equal size time-blocks, each of size X divided by a size of the beacon interval 505. In some examples, the beacon interval 505 may be divided into a set of equal sized time blocks, where a bit in a bitmap is associated with a corresponding time block of the set of equal sized time blocks. For instance, 100 ms long beacon interval may be divided into 80 time blocks and a bit in a (10-octet) bitmap may represent a time block of size 1.25 ms. In some examples, functionality within a beacon interval 505 may be represented in terms of time blocks. As depicted in the example of FIG. 5, the beacon interval 505 may be divided in sectorized beacons 515. 3 time blocks, in the example of FIG. 5, may be used for beacon transmit interval 520. The rest of the time in the beacon interval 505 may be allocated to multiple non-AP MLDs based on their traffic needs. In some examples, a first set of service periods 525 may be designated for use in communication with a first non-AP MLD (e.g., STA 1), a second set of service periods 530 may be designated for use in communication with a second non-AP MLD (e.g., STA 2), a third set of service periods 535 may be designated for use in communication with a third non-AP MLD (e.g., STA 3), and a fourth set of service periods 540 may be designated for use in communication with a fourth non-AP MLD (e.g., STA 4).

In some examples, an AP MLD may transmit a beacon in sub7 radio frequency link carrying a bitmap indicating which time blocks are available to use or in use (using 0 or 1). In some examples, a non-AP MLD may negotiate (1:1) on sub7 radio frequency link to add or remove time blocks. For example, the AP MLD may transmit a management frame including an indicating of the bitmap. The AP MLD and the non-AP MLD may communicate via the 60 GHz radio frequency link. The management frame may include a beacon frame or a probe response frame. In some examples, an AP MLD may receive, from at least one non-AP MLD, a request for additional time blocks based on a position of the bit in the bitmap. For example, a non-AP MLD may request to add time blocks if the bit position is indicated as 0. The AP MLD may accept or deny the request or may propose an alternative time block for the non-AP MLD. In some examples, the AP MLD may transmit a response based on receiving the request for the additional time blocks. The response may include an acceptance of the request for the additional time blocks or a denial of the request for the additional time blocks or information indicative of an alternative number of additional time blocks.

According to one or more aspects, the AP MLD may transmit an indication of communication schedule via the sub7 radio frequency link, with each bit set to 1 for a slot that is allocated. In some examples, the schedule may be included in a beacon transmit interval and may be associated with an AP MLD, a pair of AP MLD and non-AP MLD and a peer-to-peer communication. In some aspects, an AP MLD and one or more non-AP MLDs may include at least one of a single link single radio device, a multi-link single radio device, a multi-link multi-radio device, or a combination thereof. A single link single radio device may operate only on 60 GHz radio frequency link, a multi-link single radio device may operate on one band at a time, and a multi-link multi-radio device may operate on more than one band simultaneously. In some examples, a multi-link multi-radio device may have at least one radio operating on sub7 radio frequency link.

Figure 6:
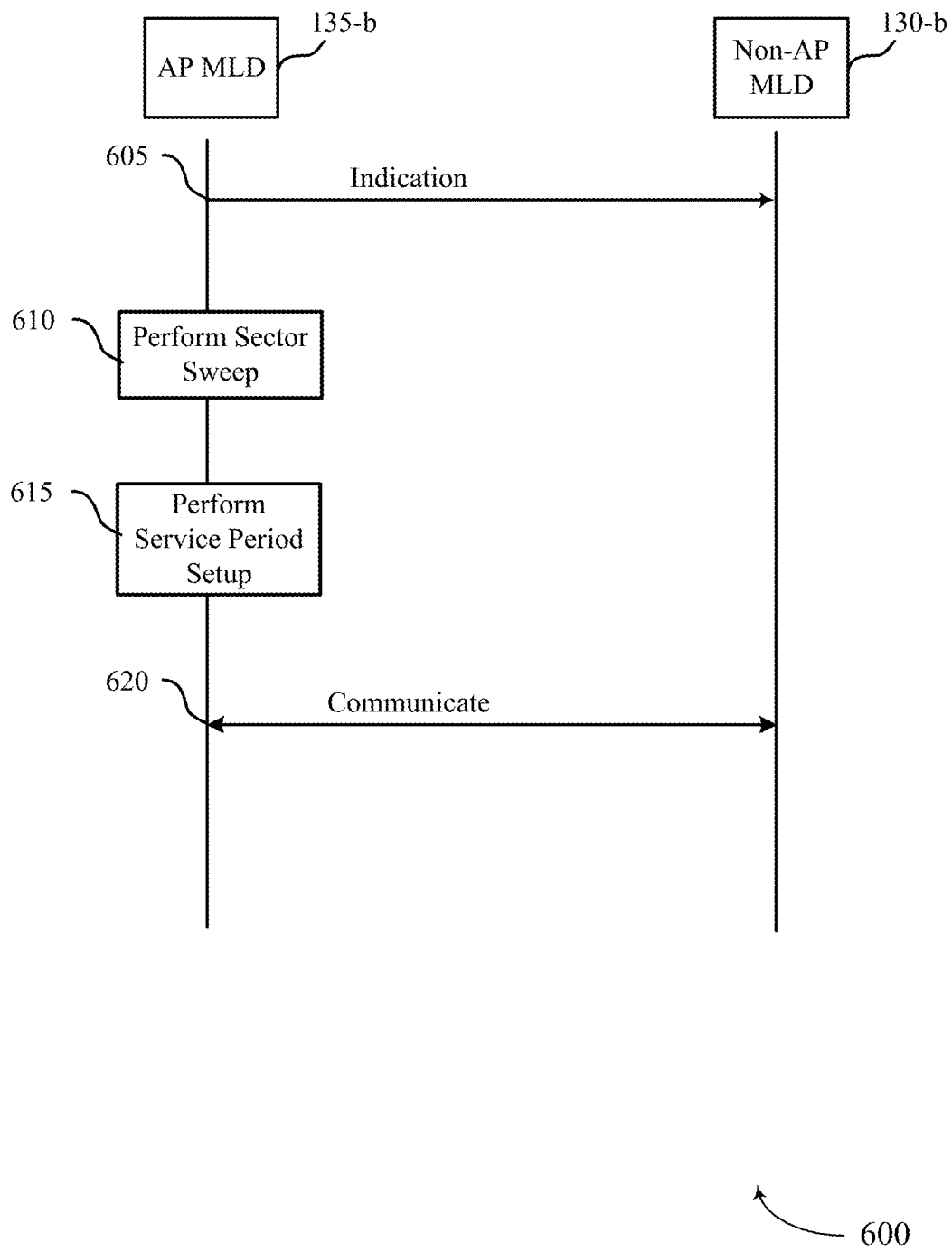
FIG. 6 illustrates an example of a process flow that supports techniques for channel access in wireless communications systems in accordance with one or more aspects of the present disclosure.

FIG. 6 illustrates an example of a process flow 600 that supports techniques for channel access in wireless communications systems in accordance with one or more aspects of the present disclosure. In some examples, the process flow 600 may implement aspects of the wireless communications system 100, the communication timelines 200, 300, and 400, and the beacon interval 500. The process flow 600 may illustrate an example of an AP MLD 135-*b* and a non-AP MLD 130-*b*. The AP MLD 135-*b* and the non-AP MLD 130-*b* may be examples of an AP MLD 135 and a non-AP MLD 130. as described with reference to FIG. 1. Alternative examples of the following may be implemented, where some processes are performed in a different order than described or are not performed. In some cases, processes may include additional features not mentioned below, or further processes may be added.

At 605, the AP MLD 135-*b* may transmit an indication of at least a portion of a beacon interval timeline for communications between the AP MLD 135-*b* and one or more non-AP MLDs (including non-AP MLD 130-*b*) on a first radio frequency link in accordance with a multi-link operation for a WLAN. In some examples, the beacon interval timeline includes at least one of a beacon transmit interval, and one or more service periods, channel access between the one or more non-AP MLDs and the AP MLD over a second radio frequency link being via the one or more service periods, wherein a service period is scheduled for communications on the second radio frequency link with the non-AP MLD 130-*b* of the one or more non-AP MLDs. The one or more service periods may include one or more opportunistic service periods and one or more dedicated service periods, where an opportunistic service period is located in a time gap between the one or more dedicated service periods.

At 610, the AP MLD 135-*b* may perform, during the beacon transmit interval, a sector sweep of a set of beacon frames, In some examples, the AP MLD 135-*b* may communicate with the one or more non-AP MLDs based on performing the sector sweep. In some examples, the set of beacon frames may include at least one of a basic service set identifier identifying the second MLD, a sector identifier associated with beam training, a timing synchronization function, a duration of a beacon interval, a traffic indication map, or a combination thereof.

At 615, the AP MLD 135-*b* may perform a service period setup operation to schedule the one or more service periods on the first radio frequency link for communications with the non-AP MLD 130-*b*. For instance, the AP MLD may allocate, to the non-AP MLD 130-*b* and during the service period setup operation, two or more dedicated service periods. In some examples, the two or more dedicated service periods may be included in the one or more service periods in the beacon interval. In some examples, the service period setup operation may be via the first radio frequency link (e.g., sub7 radio frequency link) or the second radio frequency link (e.g., 60 GHz radio frequency link). At 620, the AP MLD 135-*b* and the non-AP MLD 130-*b* may communicate in accordance with at least one of the beacon transmit interval and the one or more service periods.

Figure 7:
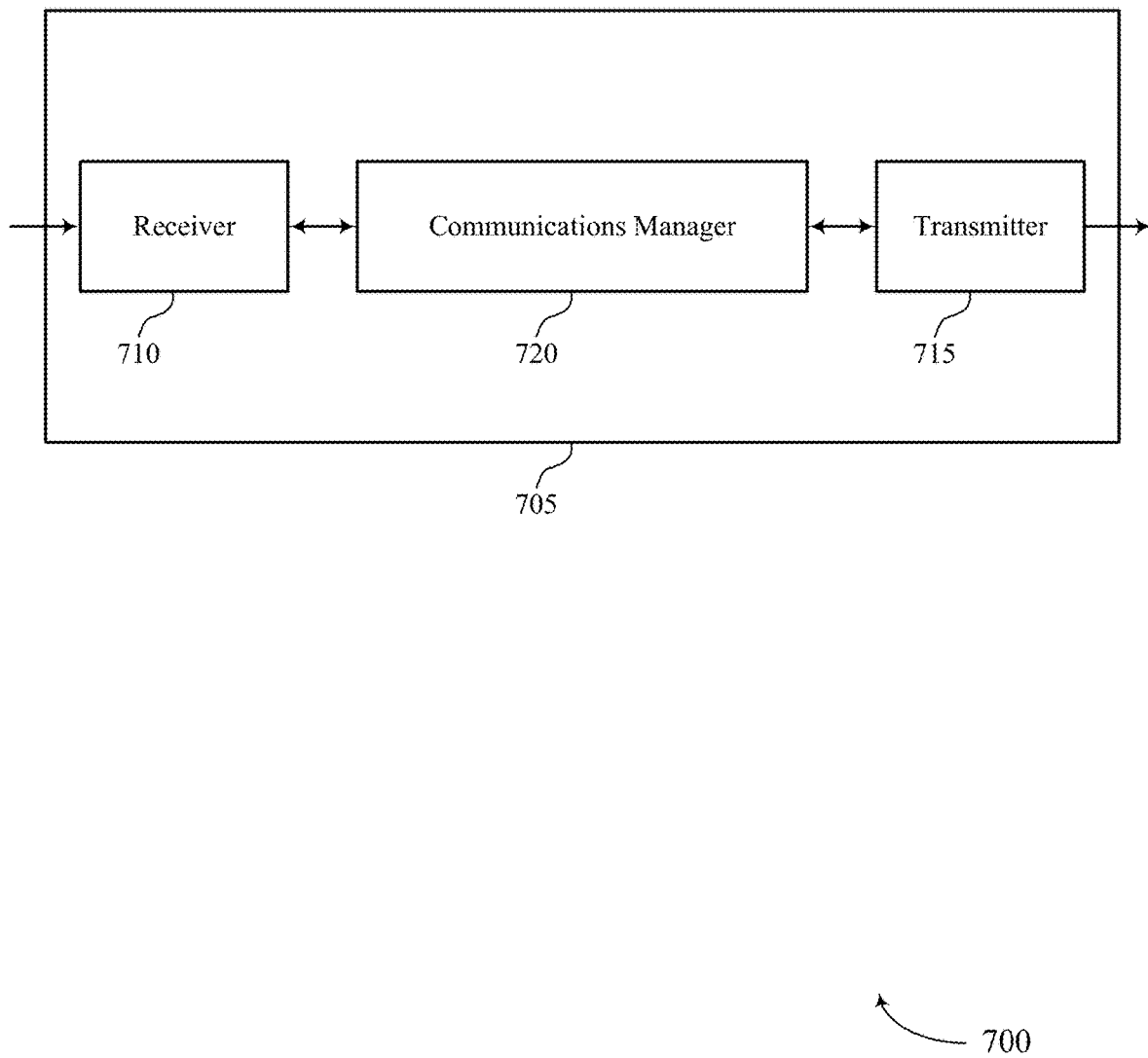
FIGS. 7 and 8 show block diagrams of devices that support techniques for channel access in wireless communications systems in accordance with one or more aspects of the present disclosure.

FIG. 7 shows a block diagram 700 of a device 705 that supports techniques for channel access in wireless communications systems in accordance with one or more aspects of the present disclosure. The device 705 may be an example of aspects of an AP as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for channel access in wireless communications systems). Information may be passed on to other components of the device 705. The receiver 710 may utilize a single antenna or a set of multiple antennas.

The transmitter 715 may provide a means for transmitting signals generated by other components of the device 705. The transmitter 715 may utilize a single antenna or a set of multiple antennas.

The communications manager 720, the receiver 710, the transmitter 715, or various combinations thereof or various components thereof may be examples of means for performing various aspects of techniques for channel access in wireless communications systems as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a second MLD in accordance with examples as disclosed herein. For example, the communications manager 720 may be configured as or otherwise support a means for transmitting an indication of at least a portion of a beacon interval timeline for communications between the second MLD and one or more first MLDs on a first radio frequency link in accordance with a multi-link operation for a WLAN, where the beacon interval timeline includes at least one of a beacon transmit interval, and one or more service periods, channel access between the one or more first MLDs and the second MLD over a second radio frequency link being via the one or more service periods, where a service period is scheduled for communications on the second radio frequency link with at least one first MLD of the one or more first MLDs. The communications manager 720 may be configured as or otherwise support a means for communicating with the one or more first MLDs in accordance with at least one of the beacon transmit interval and the one or more service periods.

Additionally, or alternatively, the communications manager 720 may support wireless communication at a second MLD in accordance with examples as disclosed herein. For example, the communications manager 720 may be configured as or otherwise support a means for establishing communications according to a multi-link operation for a WLAN including the second MLD and one or more first MLDs, where the multi-link operation includes a second radio frequency link for data communications and a first radio frequency link for control communications. The communications manager 720 may be configured as or otherwise support a means for communicating the control communications with the one or more first MLDs over the first radio frequency link in accordance with the multi-link operation for the WLAN. The communications manager 720 may be configured as or otherwise support a means for communicating the data communications with the one or more first MLDs over the second radio frequency link in accordance with the multi-link operation for the WLAN.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, and more efficient utilization of communication resources.

Figure 8:
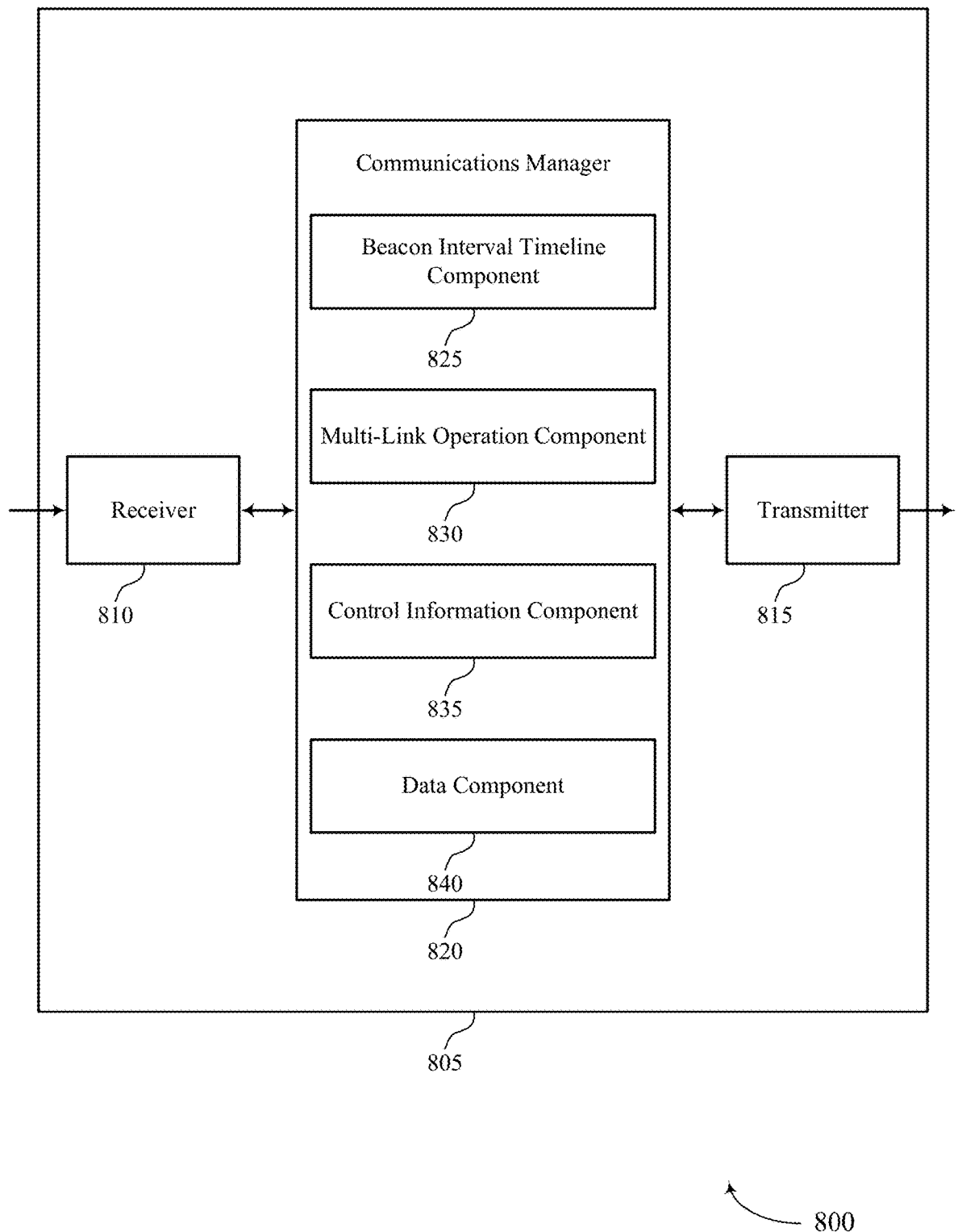

FIG. 8 shows a block diagram 800 of a device 805 that supports techniques for channel access in wireless communications systems in accordance with one or more aspects of the present disclosure. The device 805 may be an example of aspects of a device 705 or an AP 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for channel access in wireless communications systems). Information may be passed on to other components of the device 805. The receiver 810 may utilize a single antenna or a set of multiple antennas.

The transmitter 815 may provide a means for transmitting signals generated by other components of the device 805. The transmitter 815 may utilize a single antenna or a set of multiple antennas.

The device 805, or various components thereof, may be an example of means for performing various aspects of techniques for channel access in wireless communications systems as described herein. For example, the communications manager 820 may include a beacon interval timeline component 825, a multi-link operation component 830, a control information component 835, a data component 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a second MLD in accordance with examples as disclosed herein. The beacon interval timeline component 825 may be configured as or otherwise support a means for transmitting an indication of at least a portion of a beacon interval timeline for communications between the second MLD and one or more first MLDs on a first radio frequency link in accordance with a multi-link operation for a WLAN, where the beacon interval timeline includes at least one of a beacon transmit interval, and one or more service periods, channel access between the one or more first MLDs and the second MLD over a second radio frequency link being via the one or more service periods, where a service period is scheduled for communications on the second radio frequency link with at least one first MLD of the one or more first MLDs. The multi-link operation component 830 may be configured as or otherwise support a means for communicating with the one or more first MLDs in accordance with at least one of the beacon transmit interval and the one or more service periods.

Additionally, or alternatively, the communications manager 820 may support wireless communication at a second MLD in accordance with examples as disclosed herein. The multi-link operation component 830 may be configured as or otherwise support a means for establishing communications according to a multi-link operation for a WLAN including the second MLD and one or more first MLDs, where the multi-link operation includes a second radio frequency link for data communications and a first radio frequency link for control communications. The control information component 835 may be configured as or otherwise support a means for communicating the control communications with the one or more first MLDs over the first radio frequency link in accordance with the multi-link operation for the WLAN. The data component 840 may be configured as or otherwise support a means for communicating the data communications with the one or more first MLDs over the second radio frequency link in accordance with the multi-link operation for the WLAN.

Figure 9:
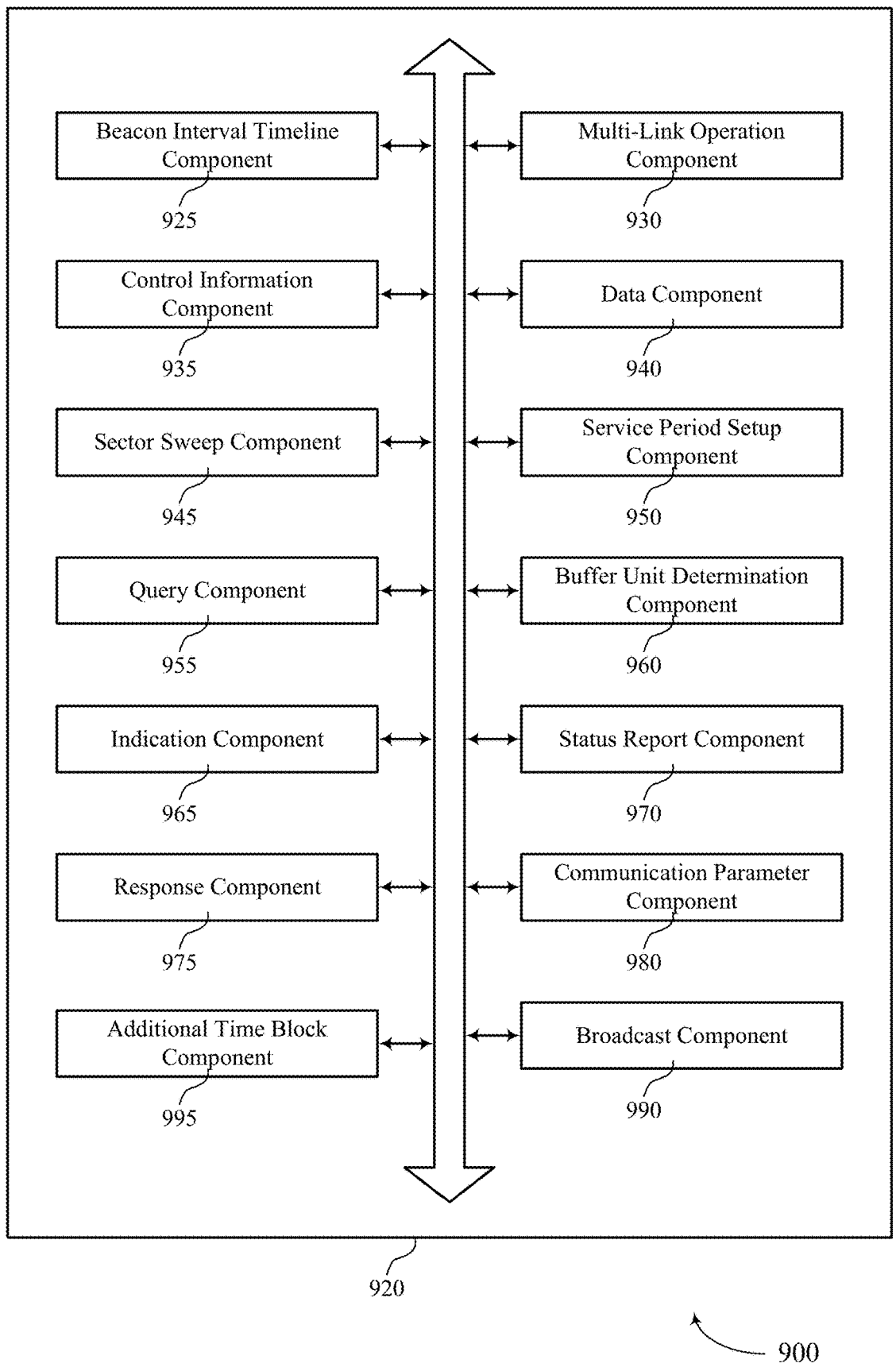
FIG. 9 shows a block diagram of a communications manager that supports techniques for channel access in wireless communications systems in accordance with one or more aspects of the present disclosure.

FIG. 9 shows a block diagram 900 of a communications manager 920 that supports techniques for channel access in wireless communications systems in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for channel access in wireless communications systems as described herein. For example, the communications manager 920 may include a beacon interval timeline component 925, a multi-link operation component 930, a control information component 935, a data component 940, a sector sweep component 945, a service period setup component 950, a query component 955, a buffer unit determination component 960, an indication component 965, a status report component 970, a response component 975, a communication parameter component 980, a broadcast component 990, an additional time block component 995, or any combination thereof. Each of these components may communicate, directly or indirectly, with one another (e.g., via one or more buses).

The communications manager 920 may support wireless communication at a second MLD in accordance with examples as disclosed herein. The beacon interval timeline component 925 may be configured as or otherwise support a means for transmitting an indication of at least a portion of a beacon interval timeline for communications between the second MLD and one or more first MLDs on a first radio frequency link in accordance with a multi-link operation for a WLAN, where the beacon interval timeline includes at least one of a beacon transmit interval, and one or more service periods, channel access between the one or more first MLDs and the second MLD over a second radio frequency link being via the one or more service periods, where a service period is scheduled for communications on the second radio frequency link with at least one first MLD of the one or more first MLDs. The multi-link operation component 930 may be configured as or otherwise support a means for communicating with the one or more first MLDs in accordance with at least one of the beacon transmit interval and the one or more service periods.

In some examples, the sector sweep component 945 may be configured as or otherwise support a means for performing, during the beacon transmit interval, a sector sweep of a set of beacon frames, where the second MLD communicates with the one or more first MLDs based on performing the sector sweep. In some examples, the set of beacon frames includes at least one of a basic service set identifier identifying the second MLD, a sector identifier associated with beam training, a timing synchronization function, a duration of a beacon interval, a traffic indication map, or a combination thereof.

In some examples, the sector sweep component 945 may be configured as or otherwise support a means for transmitting, via the first radio frequency link, at least one of a number of sectors, dwell time per sector of the number of sectors, a number of beacon intervals during which the beacon transmit interval is skipped, or a combination thereof, where communication during the one or more service periods is via the second radio frequency link.

In some examples, the service period setup component 950 may be configured as or otherwise support a means for performing a service period setup operation to schedule the one or more service periods on the first radio frequency link for communications with the at least one of the one or more first MLDs.

In some examples, the service period setup operation is via the first radio frequency link or the second radio frequency link. In some examples, the service period setup component 950 may be configured as or otherwise support a means for allocating, to at least one of the one or more first MLDs and during the service period setup operation, two or more dedicated service periods, where the two or more dedicated service periods are included in the one or more service periods in the beacon interval.

In some examples, the allocating is based on a traffic profile associated with the at least one of the one or more first MLDs. In some examples, the service period setup component 950 may be configured as or otherwise support a means for receiving, from at least one of the one or more first MLDs and during the service period setup operation, a request for a dedicated service period for a peer-to-peer communication.

In some examples, the service period setup component 950 may be configured as or otherwise support a means for determining that at least two of the one or more first MLDs have an overlapping dedicated service period. In some examples, the query component 955 may be configured as or otherwise support a means for transmitting a query to enable the overlapping dedicated service period based on determining that the at least two of the one or more first MLDs have the overlapping dedicated service period. In some examples, the query is included in a trigger frame or a power save poll or a quality of service null frame.

In some examples, the response component 975 may be configured as or otherwise support a means for receiving, from one of the at least two of the first MLDs, a response to the query. In some examples, the response component 975 may be configured as or otherwise support a means for communicating during the overlapping dedicated service period based on receiving the response. In some examples, the response to the query includes a trigger-based physical layer protocol data unit or an acknowledgement.

In some examples, the response component 975 may be configured as or otherwise support a means for receiving, from one of the at least two of the first MLDs, a response to the query, the response including information associated with beam training. In some examples, a third MLD and a fourth MLD communicate over a common overlapping dedicated service period. In some examples, a first beamformed link associated with the third MLD is orthogonal to a second beamformed link associated with the fourth MLD.

In some examples, the multi-link operation component 930 may be configured as or otherwise support a means for communicating with at least one of the one or more first MLDs during a dedicated service period. In some examples, the buffer unit determination component 960 may be configured as or otherwise support a means for determining that additional downlink buffer units are remaining after conclusion of the dedicated service period. In some examples, the indication component 965 may be configured as or otherwise support a means for transmitting, based on determining the additional downlink buffer units and after conclusion of the dedicated service period, the indication of at least the portion of the timeline, where the indication is of at least one opportunistic service period for communications with the at least one of the one or more first MLDs.

In some examples, the response component 975 may be configured as or otherwise support a means for receiving, from at least one of the one or more first MLDs, a response confirming availability for using the at least one opportunistic service period. In some examples, the multi-link operation component 930 may be configured as or otherwise support a means for communicating with the at least one of the one or more first MLDs during the at least one opportunistic service period based on receiving the response.

In some examples, the multi-link operation component 930 may be configured as or otherwise support a means for communicating with at least one of the one or more first MLDs during a dedicated service period. In some examples, the buffer unit determination component 960 may be configured as or otherwise support a means for receiving information indicative of pending uplink buffer units remaining at the at least one of the one or more first MLDs after conclusion of the dedicated service period. In some examples, the indication component 965 may be configured as or otherwise support a means for transmitting, based on receiving the information indicative of the pending uplink buffer units and after conclusion of the dedicated service period, the indication of at least the portion of the timeline, where the indication is of at least one opportunistic service period available for communications with the at least one of the one or more first MLDs.

In some examples, the response component 975 may be configured as or otherwise support a means for receiving, from at least one of the one or more first MLDs, a response confirming availability for using the at least one opportunistic service period. In some examples, the response component 975 may be configured as or otherwise support a means for communicating with the at least one of the one or more first MLDs during the at least one opportunistic service period based on receiving the response.

In some examples, the indication component 965 may be configured as or otherwise support a means for transmitting, via the first radio frequency link, the indication of at least the portion of the timeline, where the indication is of one or more opportunistic service periods available for communications with the one or more first MLDs, where communications during the one or more service periods is via the second radio frequency link.

In some examples, to support transmitting the indication, the broadcast component 990 may be configured as or otherwise support a means for broadcasting, to the one or more first MLDs, the indication of one or more opportunistic service periods available for communications with the one or more first MLDs.

In some examples, to support transmitting the indication, the indication component 965 may be configured as or otherwise support a means for transmitting, to at least one of the one or more first MLDs, the indication of the one or more opportunistic service periods available for communications with the at least one of the one or more first MLDs.

In some examples, the status report component 970 may be configured as or otherwise support a means for receiving, during a dedicated service period of the one or more service periods, a status report from at least one of the one or more first MLDs. In some examples, the indication component 965 may be configured as or otherwise support a means for transmitting, to the at least one of the one or more first MLDs and based on receiving the status report, the indication of at least the portion of the timeline, where the indication is of at least one opportunistic service period. In some examples, the status report includes at least one of a buffer status report, a data frame, an acknowledgement frame, or a combination thereof.

In some examples, the indication component 965 may be configured as or otherwise support a means for transmitting, to the one or more first MLDs, the indication of at least the portion of the timeline, where the indication is of at least one opportunistic service period. In some examples, the response component 975 may be configured as or otherwise support a means for receiving, from at least one of the one or more first MLDs, a response to the indication of the at least one opportunistic service period. In some examples, the multi-link operation component 930 may be configured as or otherwise support a means for communicating with the at least one of the one or more first MLDs during the at least one opportunistic service period based on receiving the response.

In some examples, the one or more service periods includes a set of target wake time service periods. In some examples, the one or more service periods are allocated to the one or more first MLDs using frame exchanges via the first radio frequency link for communicating via the second radio frequency link.

In some examples, the beacon interval includes at least one of the beacon transmit interval, one or more dedicated service periods and one or more opportunistic service periods. In some examples, the beacon interval is divided into a set of multiple equal sized time blocks. In some examples, a bit in a bitmap is associated with a corresponding time block of the set of multiple equal sized time blocks.

In some examples, the indication component 965 may be configured as or otherwise support a means for transmitting, to the one or more first MLDs and via the first radio frequency link, a management frame including an indicating of the bitmap, where the communicating includes communicating with the one or more first MLDs via the second radio frequency link. In some examples, the management frame includes a beacon frame or a probe response frame.

In some examples, the additional time block component 995 may be configured as or otherwise support a means for receiving, from at least one of the one or more first MLDs, a request for additional time blocks based on a position of the bit in the bitmap. In some examples, the additional time block component 995 may be configured as or otherwise support a means for transmitting a response based on receiving the request for the additional time blocks.

In some examples, the response includes an acceptance of the request for the additional time blocks or a denial of the request for the additional time blocks or information indicative of an alternative number of additional time blocks. In some examples, the one or more service periods includes one or more opportunistic service periods and one or more dedicated service periods. In some examples, an opportunistic service period is located in a time gap between the one or more dedicated service periods.

In some examples, the one or more service periods includes one or more opportunistic service periods and one or more dedicated service periods. In some examples, the one or more dedicated service periods are associated with a first periodicity and of the one or more opportunistic service periods are associated with a second periodicity. In some examples, the second MLD includes an AP MLD and the one or more first MLDs includes one or more non-AP MLD. In some examples, the first radio frequency link is lower than the second radio frequency link.

Additionally, or alternatively, the communications manager 920 may support wireless communication at a second MLD in accordance with examples as disclosed herein. In some examples, the multi-link operation component 930 may be configured as or otherwise support a means for establishing communications according to a multi-link operation for a WLAN including the second MLD and one or more first MLDs, where the multi-link operation includes a second radio frequency link for data communications and a first radio frequency link for control communications. The control information component 935 may be configured as or otherwise support a means for communicating the control communications with the one or more first MLDs over the first radio frequency link in accordance with the multi-link operation for the WLAN. The data component 940 may be configured as or otherwise support a means for communicating the data communications with the one or more first MLDs over the second radio frequency link in accordance with the multi-link operation for the WLAN.

In some examples, the communication parameter component 980 may be configured as or otherwise support a means for transmitting, to the one or more first MLDs via the first radio frequency link, one or more communication parameters for establishing the communications according to the multi-link operation for the WLAN, the one or more communication parameters including a traffic indication, or communication updates, or both.

In some examples, the communication parameter component 980 may be configured as or otherwise support a means for transmitting, to the one or more first MLDs via the first radio frequency link, timing information for communicating via the second radio frequency link, where the timing information includes a timing offset with respect to a timing value in the first radio frequency link.

In some examples, the communication parameter component 980 may be configured as or otherwise support a means for performing, via the first radio frequency link, a management frame exchange operation to determine communication parameters for the data communications via the second radio frequency link. In some examples, the management frame exchange operation includes transmitting a set of multiple management frames. In some examples, each management frame of the set of multiple management frames is addressed to at least one of the one or more first MLDs.

In some examples, the sector sweep component 945 may be configured as or otherwise support a means for transmitting, via the first radio frequency link, at least one of a number of sectors, dwell time per sector of the number of sectors, a number of beacon intervals, or a combination thereof, where communicating with the one or more first MLDs is based on the transmitting. In some examples, the service period setup component 950 may be configured as or otherwise support a means for performing, via the first radio frequency link, a service period setup operation to schedule one or more dedicated service periods for communications with the one or more first MLDs.

In some examples, the service period setup component 950 may be configured as or otherwise support a means for receiving, from at least one of the one or more first MLDs and via the first radio frequency link, a request to schedule a set of multiple service periods for data communications via the second radio frequency link.

In some examples, the service period setup component 950 may be configured as or otherwise support a means for transmitting, via the first radio frequency link, an indication of one or more opportunistic service periods available for communications with the one or more first MLDs in addition to one or more dedicated service periods allocated to the one or more first MLDs.

In some examples, the second MLD and the one or more first MLDs include at least one of a single link single radio device, a multi-link single radio device, a multi-link multi-radio device, or a combination thereof. In some examples, the first radio frequency link is lower than the second radio frequency link. In some examples, the second MLD includes an AP MLD and the one or more first MLDs includes one or more non-AP MLD.

Figure 10:
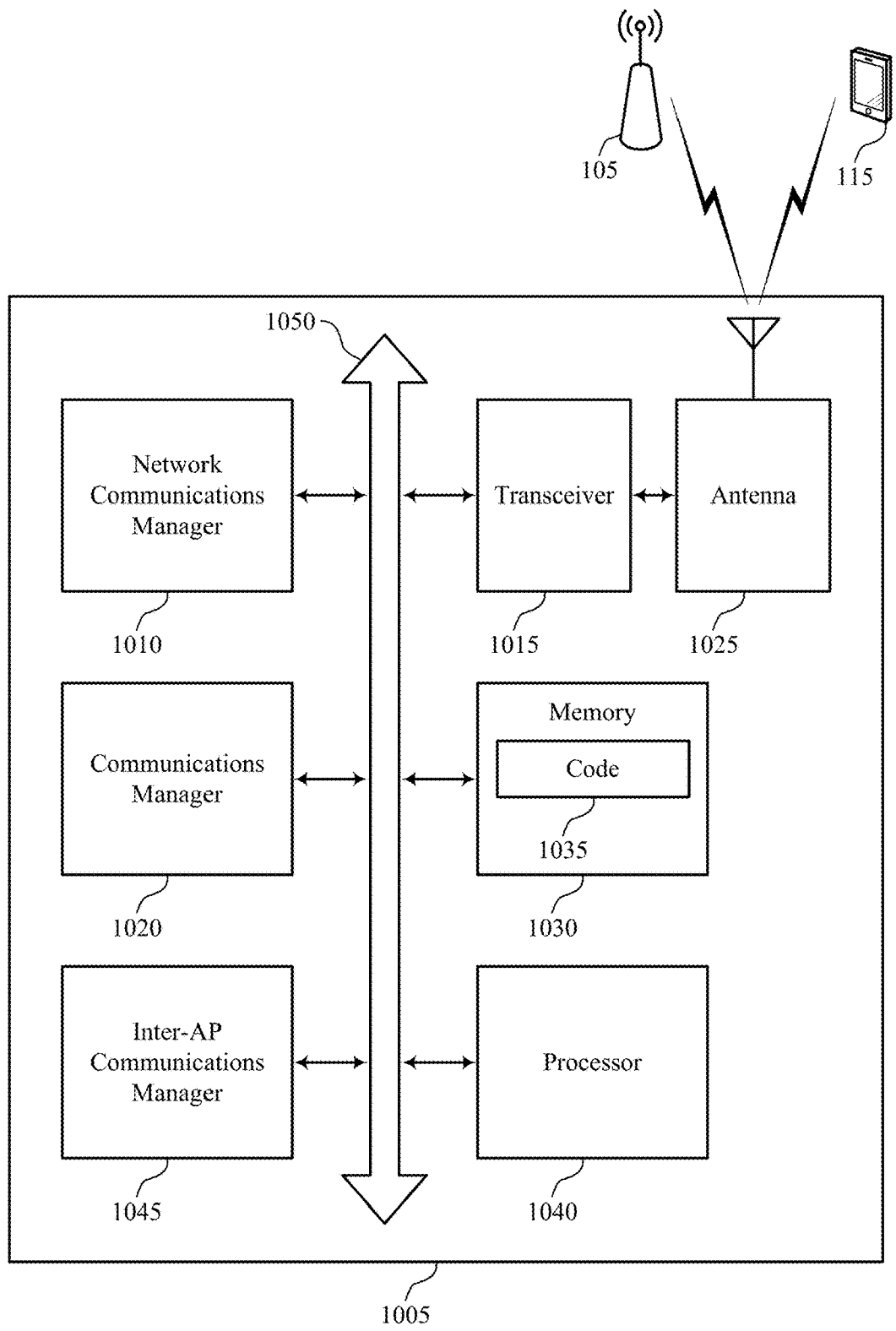
FIG. 10 shows a diagram of a system including a device that supports techniques for channel access in wireless communications systems in accordance with one or more aspects of the present disclosure.

FIG. 10 shows a diagram of a system 1000 including a device 1005 that supports techniques for channel access in wireless communications systems in accordance with one or more aspects of the present disclosure. The device 1005 may be an example of or include the components of a device 705, a device 805, or an AP as described herein. The device 1005 may include components for bi-directional voice and data communications including components for transmitting and receiving communications, such as a communications manager 1020, a network communications manager 1010, a transceiver 1015, an antenna 1025, a memory 1030, code 1035, a processor 1040, and an inter-AP communications manager 1045. These components may be in electronic communication or otherwise coupled (e.g., operatively, communicatively, functionally, electronically, electrically) via one or more buses (e.g., a bus 1050).

The network communications manager 1010 may manage communications with a core network (e.g., via one or more wired backhaul links). For example, the network communications manager 1010 may manage the transfer of data communications for client devices, such as one or more STAs 115.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets and provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include RAM and ROM. The memory 1030 may store computer-readable, computer-executable code 1035 including instructions that, when executed by the processor 1040, cause the device 1005 to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for channel access in wireless communications systems). For example, the device 1005 or a component of the device 1005 may include a processor 1040 and memory 1030 coupled with or to the processor 1040, the processor 1040 and memory 1030 configured to perform various functions described herein.

The inter-station communications manager 1045 may manage communications with other APs 105, and may include a controller or scheduler for controlling communications with STAs 115 in cooperation with other APs 105. For example, the inter-station communications manager 1045 may coordinate scheduling for transmissions to APs 105 for various interference mitigation techniques such as beamforming or joint transmission. In some examples, the inter-station communications manager 1045 may provide an X2 interface within an LTE/LTE-A wireless communication network technology to provide communication between APs 105.

The communications manager 1020 may support wireless communication at a second MLD in accordance with examples as disclosed herein. For example, the communications manager 1020 may be configured as or otherwise support a means for transmitting an indication of at least a portion of a beacon interval timeline for communications between the second MLD and one or more first MLDs on a first radio frequency link in accordance with a multi-link operation for a WLAN, where the beacon interval timeline includes at least one of a beacon transmit interval, and one or more service periods, channel access between the one or more first MLDs and the second MLD over a second radio frequency link being via the one or more service periods, where a service period is scheduled for communications on the second radio frequency link with at least one first MLD of the one or more first MLDs. The communications manager 1020 may be configured as or otherwise support a means for communicating with the one or more first MLDs in accordance with at least one of the beacon transmit interval and the one or more service periods.

Additionally, or alternatively, the communications manager 1020 may support wireless communication at a second MLD in accordance with examples as disclosed herein. For example, the communications manager 1020 may be configured as or otherwise support a means for establishing communications according to a multi-link operation for a WLAN including the second MLD and one or more first MLDs, where the multi-link operation includes a second radio frequency link for data communications and a first radio frequency link for control communications. The communications manager 1020 may be configured as or otherwise support a means for communicating the control communications with the one or more first MLDs over the first radio frequency link in accordance with the multi-link operation for the WLAN. The communications manager 1020 may be configured as or otherwise support a means for communicating the data communications with the one or more first MLDs over the second radio frequency link in accordance with the multi-link operation for the WLAN.

By including or configuring the communications manager 1020 in accordance with examples as described herein, the device 1005 may support techniques for improved communication reliability, reduced latency, improved user experience related to reduced processing, reduced power consumption, more efficient utilization of communication resources, and improved coordination between devices.

Figure 11:
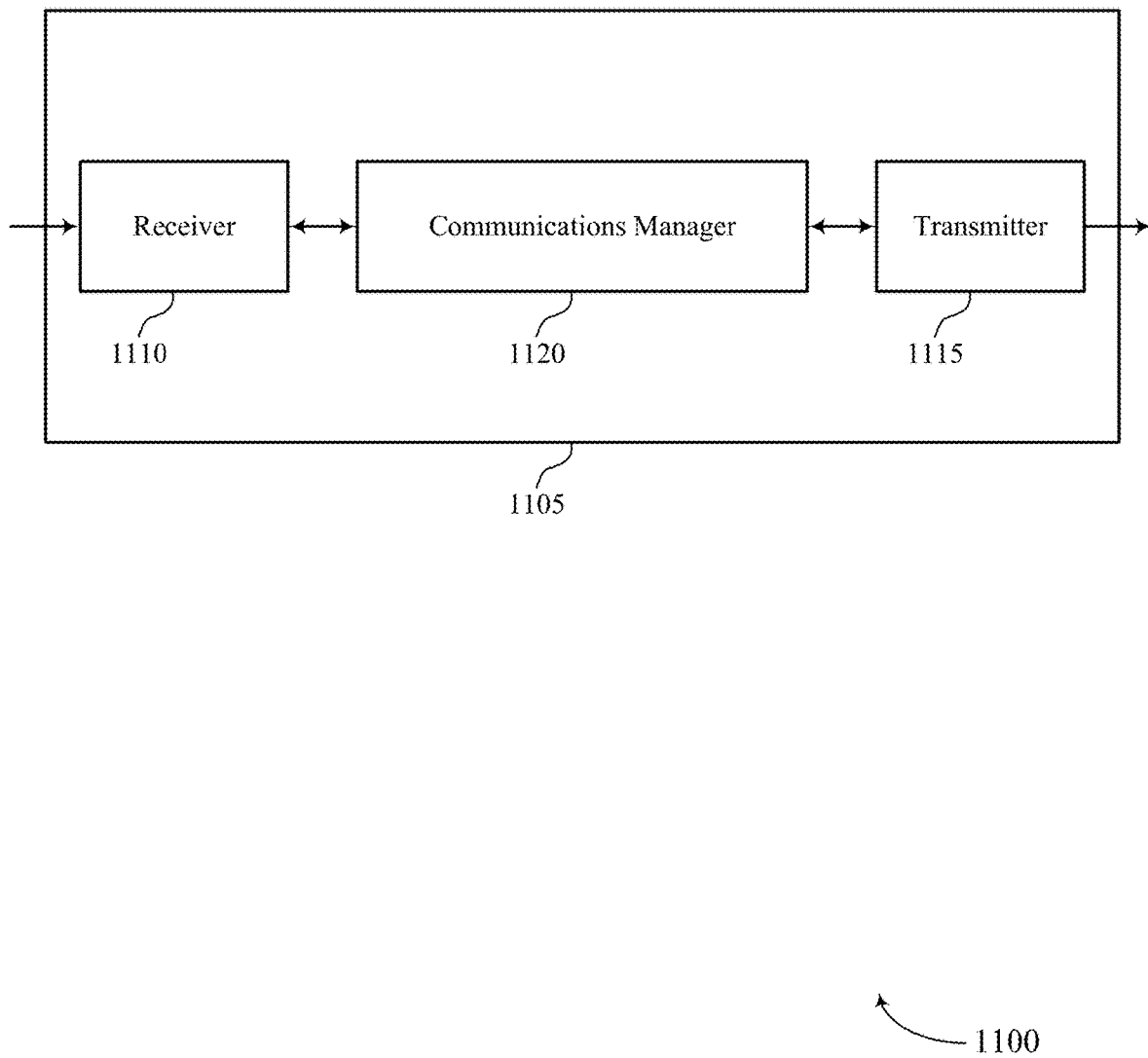
FIGS. 11 and 12 show block diagrams of devices that support techniques for channel access in wireless communications systems in accordance with one or more aspects of the present disclosure.

FIG. 11 shows a block diagram 1100 of a device 1105 that supports techniques for channel access in wireless communications systems in accordance with one or more aspects of the present disclosure. The device 1105 may be an example of aspects of an STA as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for channel access in wireless communications systems). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for channel access in wireless communications systems). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for channel access in wireless communications systems as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a first MLD in accordance with examples as disclosed herein. For example, the communications manager 1120 may be configured as or otherwise support a means for receiving an indication of at least a portion of a beacon interval timeline for communications between a second MLD and the first MLD on a first radio frequency link in accordance with a multi-link operation for a WLAN, where the beacon interval timeline includes at least one of a beacon transmit interval, and one or more service periods, channel access between the first MLD and the second MLD over a second radio frequency link being via the one or more service periods, where a service period is scheduled for communications on the second radio frequency link with at least one first MLD of the first MLD. The communications manager 1120 may be configured as or otherwise support a means for communicating with the second MLDs in accordance with at least one of the beacon transmit interval and the one or more service periods.

Additionally, or alternatively, the communications manager 1120 may support wireless communication at a first MLD in accordance with examples as disclosed herein. For example, the communications manager 1120 may be configured as or otherwise support a means for establishing communications according to a multi-link operation for a WLAN including a second MLD and the first MLD, where the multi-link operation includes a second radio frequency link for data communications and a first radio frequency link for control communications. The communications manager 1120 may be configured as or otherwise support a means for communicating the control communications with the second MLD over the first radio frequency link in accordance with the multi-link operation for the WLAN. The communications manager 1120 may be configured as or otherwise support a means for communicating the data communications with the second MLD over the second radio frequency link in accordance with the multi-link operation for the WLAN.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, and more efficient utilization of communication resources.

Figure 12:
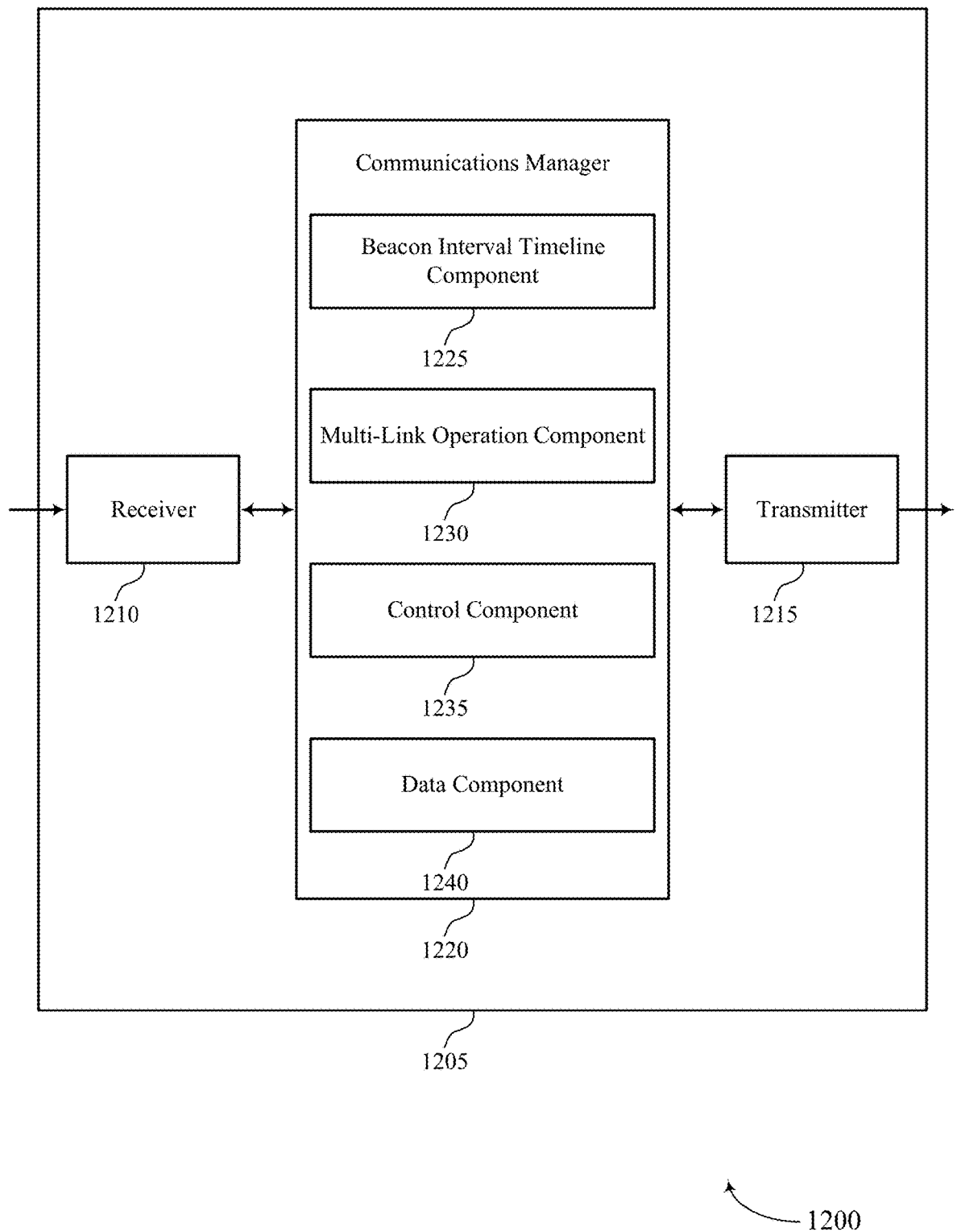

FIG. 12 shows a block diagram 1200 of a device 1205 that supports techniques for channel access in wireless communications systems in accordance with one or more aspects of the present disclosure. The device 1205 may be an example of aspects of a device 1105 or an STA 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for channel access in wireless communications systems). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for channel access in wireless communications systems). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for channel access in wireless communications systems as described herein. For example, the communications manager 1220 may include a beacon interval timeline component 1225, a multi-link operation component 1230, a control component 1235, a data component 1240, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a first MLD in accordance with examples as disclosed herein. The beacon interval timeline component 1225 may be configured as or otherwise support a means for receiving an indication of at least a portion of a beacon interval timeline for communications between a second MLD and the first MLD on a first radio frequency link in accordance with a multi-link operation for a WLAN, where the beacon interval timeline includes at least one of a beacon transmit interval, and one or more service periods, channel access between the first MLD and the second MLD over a second radio frequency link being via the one or more service periods, where a service period is scheduled for communications on the second radio frequency link with at least one first MLD of the first MLD. The multi-link operation component 1230 may be configured as or otherwise support a means for communicating with the second MLDs in accordance with at least one of the beacon transmit interval and the one or more service periods.

Additionally, or alternatively, the communications manager 1220 may support wireless communication at a first MLD in accordance with examples as disclosed herein. The multi-link operation component 1230 may be configured as or otherwise support a means for establishing communications according to a multi-link operation for a WLAN including a second MLD and the first MLD, where the multi-link operation includes a second radio frequency link for data communications and a first radio frequency link for control communications. The control component 1235 may be configured as or otherwise support a means for communicating the control communications with the second MLD over the first radio frequency link in accordance with the multi-link operation for the WLAN. The data component 1240 may be configured as or otherwise support a means for communicating the data communications with the second MLD over the second radio frequency link in accordance with the multi-link operation for the WLAN.

Figure 13:
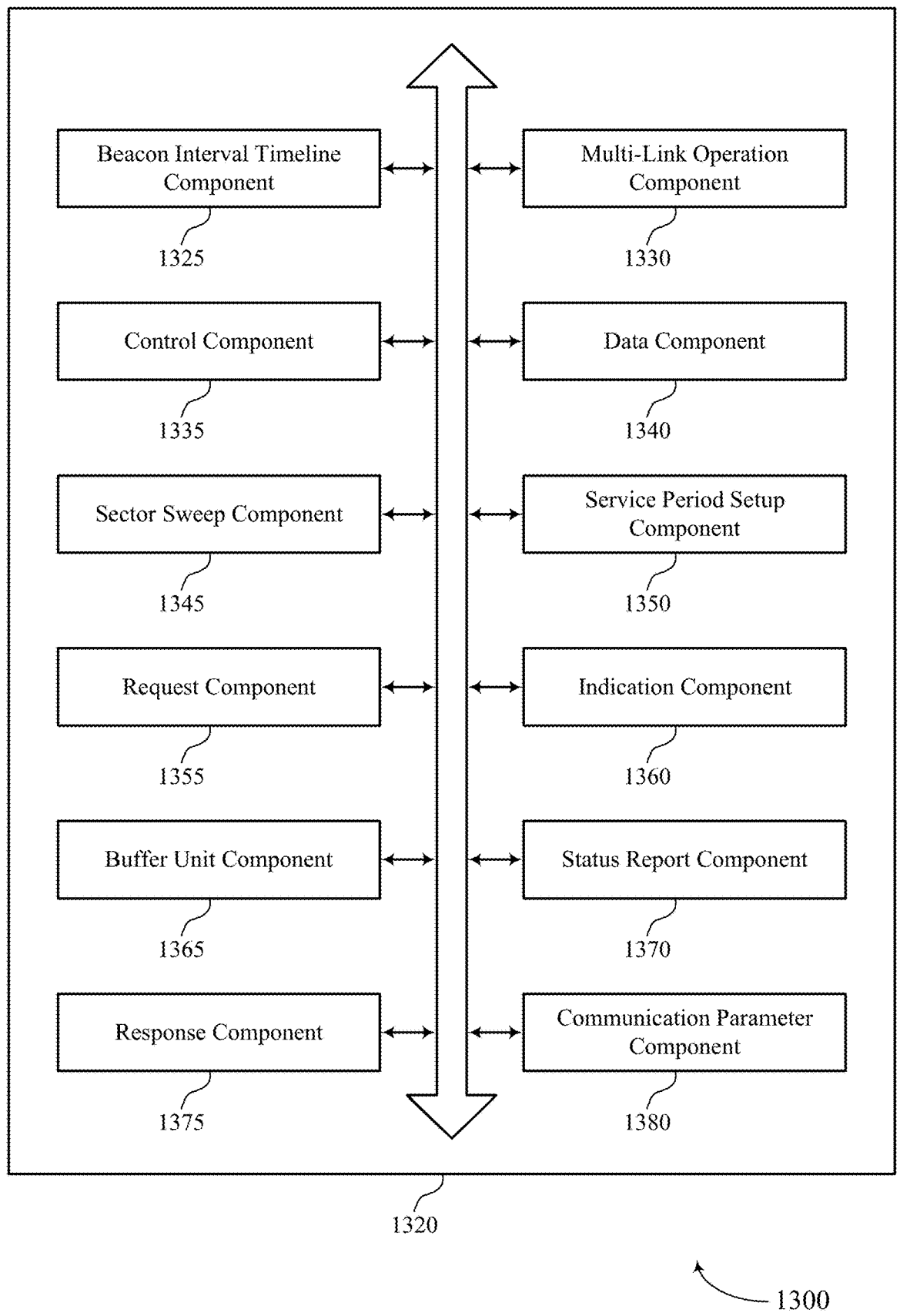
FIG. 13 shows a block diagram of a communications manager that supports techniques for channel access in wireless communications systems in accordance with one or more aspects of the present disclosure.

FIG. 13 shows a block diagram 1300 of a communications manager 1320 that supports techniques for channel access in wireless communications systems in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for channel access in wireless communications systems as described herein. For example, the communications manager 1320 may include a beacon interval timeline component 1325, a multi-link operation component 1330, a control component 1335, a data component 1340, a sector sweep component 1345, a service period setup component 1350, a request component 1355, an indication component 1360, a buffer unit component 1365, a status report component 1370, a response component 1375, a communication parameter component 1380, or any combination thereof. Each of these components may communicate, directly or indirectly, with one another (e.g., via one or more buses).

The communications manager 1320 may support wireless communication at a first MLD in accordance with examples as disclosed herein. The beacon interval timeline component 1325 may be configured as or otherwise support a means for receiving an indication of at least a portion of a beacon interval timeline for communications between a second MLD and the first MLD on a first radio frequency link in accordance with a multi-link operation for a WLAN, where the beacon interval timeline includes at least one of a beacon transmit interval, and one or more service periods, channel access between the first MLD and the second MLD over a second radio frequency link being via the one or more service periods, where a service period is scheduled for communications on the second radio frequency link with at least one first MLD of the first MLD. The multi-link operation component 1330 may be configured as or otherwise support a means for communicating with the second MLDs in accordance with at least one of the beacon transmit interval and the one or more service periods.

In some examples, the sector sweep component 1345 may be configured as or otherwise support a means for performing, during the beacon transmit interval, a sector sweep of a set of beacon frames, where the second MLD communicates with the first MLD based on performing the sector sweep. In some examples, the set of beacon frames includes at least one of a basic service set identifier identifying the second MLD, a sector identifier associated with beam training, a timing synchronization function, a duration of a beacon interval, a traffic indication map, or a combination thereof.

In some examples, the sector sweep component 1345 may be configured as or otherwise support a means for receiving, via the first radio frequency link, at least one of a number of sectors, dwell time per sector of the number of sectors, a number of beacon intervals during which the beacon transmit interval is skipped, or a combination thereof, where communication during the one or more service periods is via the second radio frequency link.

In some examples, the service period setup component 1350 may be configured as or otherwise support a means for performing a service period setup operation to schedule the one or more service periods on the first radio frequency link for communications with the second MLD. In some examples, the service period setup operation is via the first radio frequency link or the second radio frequency link.

In some examples, the service period setup component 1350 may be configured as or otherwise support a means for receiving, during the service period setup operation, an indication of allocation of two or more dedicated service periods, where the two or more dedicated service periods are included in the one or more service periods in the beacon interval.

In some examples, the allocation is based on a traffic profile associated with the first MLD. In some examples, the request component 1355 may be configured as or otherwise support a means for transmitting, to the second MLD and during the service period setup operation, a request for a dedicated service period for a peer-to-peer communication.

In some examples, the request component 1355 may be configured as or otherwise support a means for receiving a query to enable an overlapping dedicated service period, where the first MLD and at least an additional MLD have the overlapping dedicated service period.

In some examples, the query is included in a trigger frame or a power save poll or a quality of service null frame. In some examples, the response component 1375 may be configured as or otherwise support a means for transmitting, to the second MLD, a response to the query. In some examples, the multi-link operation component 1330 may be configured as or otherwise support a means for communicating during the overlapping dedicated service period based on transmitting the response.

In some examples, the response to the query includes a trigger-based physical layer protocol data unit or an acknowledgement.

In some examples, the response component 1375 may be configured as or otherwise support a means for transmitting, to the second MLD, a response to the query, the response including information requesting beam training for the first MLD. In some examples, a third MLD and a fourth MLD communicate over a common overlapping dedicated service period. In some examples, a first beamformed link associated with the third MLD is orthogonal to a second beamformed link associated with the fourth MLD.

In some examples, the multi-link operation component 1330 may be configured as or otherwise support a means for communicating with the second MLD during a dedicated service period. In some examples, the indication component 1360 may be configured as or otherwise support a means for receiving, after conclusion of the dedicated service period and based on additional downlink buffer units remaining after conclusion of the dedicated service period, the indication of at least the portion of the timeline, where the indication is of at least one opportunistic service period for communications with the second MLD.

In some examples, the response component 1375 may be configured as or otherwise support a means for transmitting, to the second MLD, a response confirming availability of the first MLD for using the at least one opportunistic service period.

In some examples, the multi-link operation component 1330 may be configured as or otherwise support a means for communicating with the second MLD during the at least one opportunistic service period based on transmitting the response.

In some examples, the multi-link operation component 1330 may be configured as or otherwise support a means for communicating with the second MLD during a dedicated service period. In some examples, the buffer unit component 1365 may be configured as or otherwise support a means for transmitting information indicative of pending uplink buffer units remaining at the first MLD after conclusion of the dedicated service period. In some examples, the indication component 1360 may be configured as or otherwise support a means for receiving, based on transmitting the information indicative of the pending uplink buffer units and after conclusion of the dedicated service period, the indication of at least the portion of the timeline, where the indication is of at least one opportunistic service period available for communications with the second MLD.

In some examples, the response component 1375 may be configured as or otherwise support a means for transmitting, to the second MLD, a response confirming availability of the first MLD for using the at least one opportunistic service period. In some examples, the multi-link operation component 1330 may be configured as or otherwise support a means for communicating with the second MLD during the at least one opportunistic service period based on transmitting the response.

In some examples, the indication component 1360 may be configured as or otherwise support a means for receiving, via the first radio frequency link, the indication of at least the portion of the timeline, where the indication is of one or more opportunistic service periods available for communications with the first MLD, where communications during the one or more service periods is via the second radio frequency link.

In some examples, to support receiving the indication, the indication component 1360 may be configured as or otherwise support a means for receiving, from the second MLD, a broadcast of the indication of one or more opportunistic service periods available for communications with the first MLD. In some examples, to support receiving the indication, the indication component 1360 may be configured as or otherwise support a means for receiving, from the second MLD, the indication of the one or more opportunistic service periods available for communications with the second MLD.

In some examples, the status report component 1370 may be configured as or otherwise support a means for transmitting, during a dedicated service period of the one or more service periods, a status report. In some examples, the indication component 1360 may be configured as or otherwise support a means for receiving, from the second MLD and based on transmitting the status report, the indication of at least the portion of the timeline, where the indication is of at least one opportunistic service period. In some examples, the status report includes at least one of a buffer status report, a data frame, an acknowledgement frame, or a combination thereof.

In some examples, the indication component 1360 may be configured as or otherwise support a means for receiving, from the second MLD, the indication of at least the portion of the timeline, where the indication is of at least one opportunistic service period. In some examples, the response component 1375 may be configured as or otherwise support a means for transmitting, to the second MLD, a response to the indication of the at least one opportunistic service period. In some examples, the multi-link operation component 1330 may be configured as or otherwise support a means for communicating with the second MLD during the at least one opportunistic service period based on transmitting the response.

In some examples, the one or more service periods includes a set of target wake time service periods. In some examples, the one or more service periods are allocated to the first MLD using frame exchanges via the first radio frequency link for communicating via the second radio frequency link. In some examples, the beacon interval includes at least one of the beacon transmit interval, one or more dedicated service periods and one or more opportunistic service periods.

In some examples, the beacon interval is divided into a set of multiple equal sized time blocks. In some examples, a bit in a bitmap is associated with a corresponding time block of the set of multiple equal sized time blocks. In some examples, the indication component 1360 may be configured as or otherwise support a means for receiving, from the second MLD and via the first radio frequency link, a management frame including an indicating of the bitmap, where the communicating includes communicating with the second MLD via the second radio frequency link. In some examples, the management frame includes a beacon frame or a probe response frame.

In some examples, the request component 1355 may be configured as or otherwise support a means for transmitting, to the second MLD, a request for additional time blocks based on a position of the bit in the bitmap. In some examples, the response component 1375 may be configured as or otherwise support a means for receiving a response based on transmitting the request for the additional time blocks.

In some examples, the response includes an acceptance of the request for the additional time blocks or a denial of the request for the additional time blocks or information indicative of an alternative number of additional time blocks. In some examples, the one or more service periods includes one or more opportunistic service periods and one or more dedicated service periods. In some examples, an opportunistic service period is located in a time gap between the one or more dedicated service periods.

In some examples, the one or more service periods includes one or more opportunistic service periods and one or more dedicated service periods. In some examples, the one or more dedicated service periods are associated with a first periodicity and of the one or more opportunistic service periods are associated with a second periodicity.

In some examples, the second MLD includes an AP MLD and the first MLD includes a non-AP MLD. In some examples, the first radio frequency link is lower than the second radio frequency link.

Additionally, or alternatively, the communications manager 1320 may support wireless communication at a first MLD in accordance with examples as disclosed herein. In some examples, the multi-link operation component 1330 may be configured as or otherwise support a means for establishing communications according to a multi-link operation for a WLAN including a second MLD and the first MLD, where the multi-link operation includes a second radio frequency link for data communications and a first radio frequency link for control communications. The control component 1335 may be configured as or otherwise support a means for communicating the control communications with the second MLD over the first radio frequency link in accordance with the multi-link operation for the WLAN. The data component 1340 may be configured as or otherwise support a means for communicating the data communications with the second MLD over the second radio frequency link in accordance with the multi-link operation for the WLAN.

In some examples, the communication parameter component 1380 may be configured as or otherwise support a means for receiving, from the second MLD via the first radio frequency link, one or more communication parameters for establishing the communications according to the multi-link operation for the WLAN, the one or more communication parameters including a traffic indication, or communication updates, or both.

In some examples, the communication parameter component 1380 may be configured as or otherwise support a means for receiving, from the second MLD via the first radio frequency link, timing information for communicating via the second radio frequency link, where the timing information includes a timing offset with respect to a timing value in the first radio frequency link.

In some examples, the communication parameter component 1380 may be configured as or otherwise support a means for performing, via the first radio frequency link, a management frame exchange operation to determine communication parameters for the data communications via the second radio frequency link. In some examples, the management frame exchange operation includes transmitting a set of multiple management frames. In some examples, each management frame of the set of multiple management frames is addressed to the first MLD.

In some examples, the communication parameter component 1380 may be configured as or otherwise support a means for receiving, via the first radio frequency link, at least one of a number of sectors, dwell time per sector of the number of sectors, a number of beacon intervals, or a combination thereof, where communicating with the second MLD is based on the receiving.

In some examples, the service period setup component 1350 may be configured as or otherwise support a means for performing, via the first radio frequency link, a service period setup operation to schedule one or more dedicated service periods for communications with the second MLD.

In some examples, the service period setup component 1350 may be configured as or otherwise support a means for transmitting, to the second MLD and via the first radio frequency link, a request to schedule a set of multiple service periods for data communications via the second radio frequency link.

In some examples, the service period setup component 1350 may be configured as or otherwise support a means for receiving, via the first radio frequency link, an indication of one or more opportunistic service periods available for communications with the second MLD in addition to one or more dedicated service periods allocated to the first MLD.

In some examples, the second MLD and the first MLD include at least one of a single link single radio device, a multi-link single radio device, a multi-link multi-radio device, or a combination thereof. In some examples, the first radio frequency link is lower than the second radio frequency link. In some examples, the second MLD includes an AP MLD and the first MLD includes a non-AP MLD.

Figure 14:
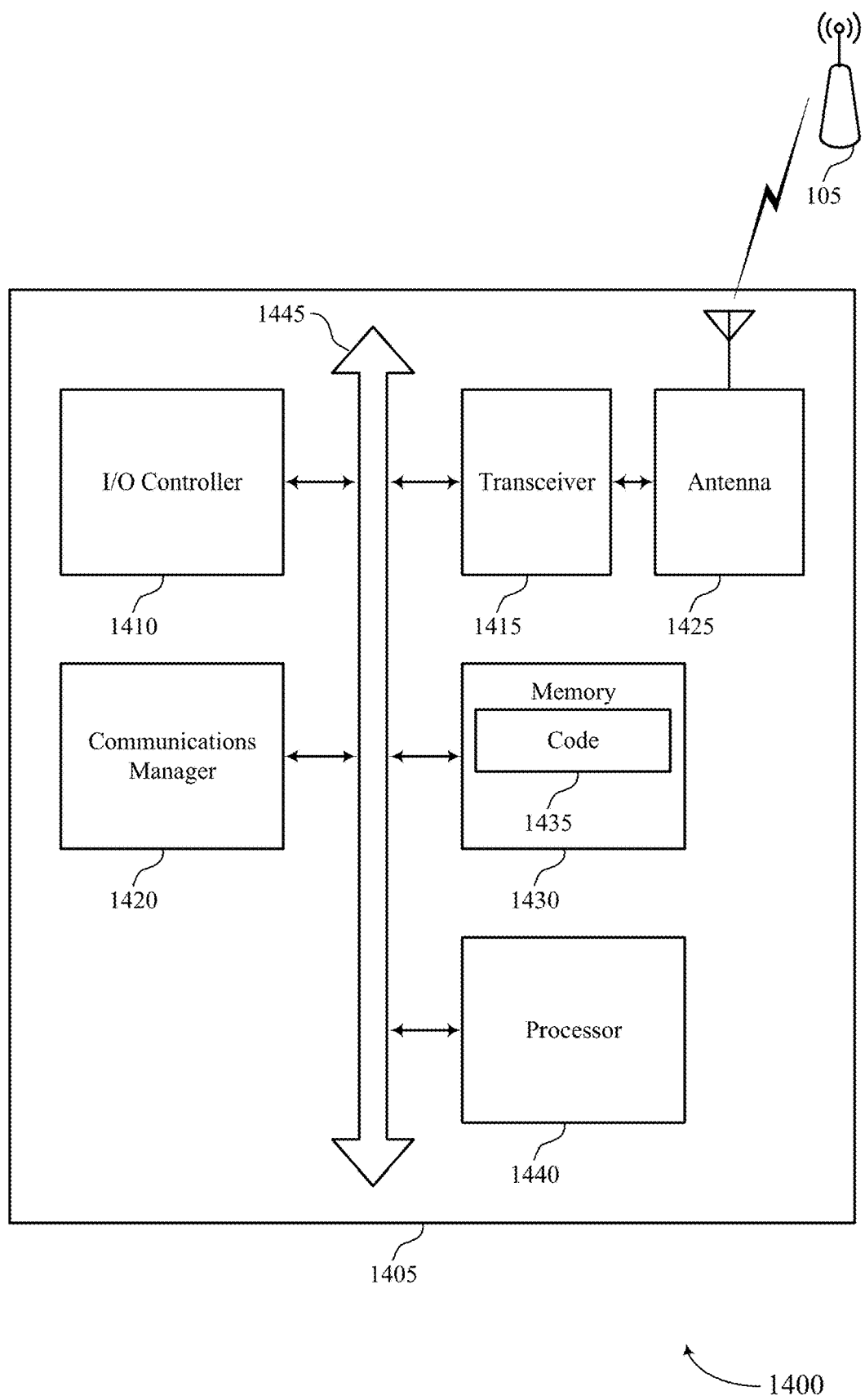
FIG. 14 shows a diagram of a system including a device that supports techniques for channel access in wireless communications systems in accordance with one or more aspects of the present disclosure.

FIG. 14 shows a diagram of a system 1400 including a device 1405 that supports techniques for channel access in wireless communications systems in accordance with one or more aspects of the present disclosure. The device 1405 may be an example of or include the components of a device 1105, a device 1205, or an STA as described herein. The device 1405 may include components for bi-directional voice and data communications including components for transmitting and receiving communications, such as a communications manager 1420, an I/O controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. In some other cases, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets and provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for channel access in wireless communications systems). For example, the device 1405 or a component of the device 1405 may include a processor 1440 and memory 1430 coupled with or to the processor 1440, the processor 1440 and memory 1430 configured to perform various functions described herein.

The communications manager 1420 may support wireless communication at a first MLD in accordance with examples as disclosed herein. For example, the communications manager 1420 may be configured as or otherwise support a means for receiving an indication of at least a portion of a beacon interval timeline for communications between a second MLD and the first MLD on a first radio frequency link in accordance with a multi-link operation for a WLAN, where the beacon interval timeline includes at least one of a beacon transmit interval, and one or more service periods, channel access between the first MLD and the second MLD over a second radio frequency link being via the one or more service periods, where a service period is scheduled for communications on the second radio frequency link with at least one first MLD of the first MLD. The communications manager 1420 may be configured as or otherwise support a means for communicating with the second MLDs in accordance with at least one of the beacon transmit interval and the one or more service periods.

Additionally, or alternatively, the communications manager 1420 may support wireless communication at a first MLD in accordance with examples as disclosed herein. For example, the communications manager 1420 may be configured as or otherwise support a means for establishing communications according to a multi-link operation for a WLAN including a second MLD and the first MLD, where the multi-link operation includes a second radio frequency link for data communications and a first radio frequency link for control communications. The communications manager 1420 may be configured as or otherwise support a means for communicating the control communications with the second MLD over the first radio frequency link in accordance with the multi-link operation for the WLAN. The communications manager 1420 may be configured as or otherwise support a means for communicating the data communications with the second MLD over the second radio frequency link in accordance with the multi-link operation for the WLAN.

By including or configuring the communications manager 1420 in accordance with examples as described herein, the device 1405 may support techniques for improved communication reliability, reduced latency, improved user experience related to reduced processing, reduced power consumption, more efficient utilization of communication resources, and improved coordination between devices.

Figure 15:
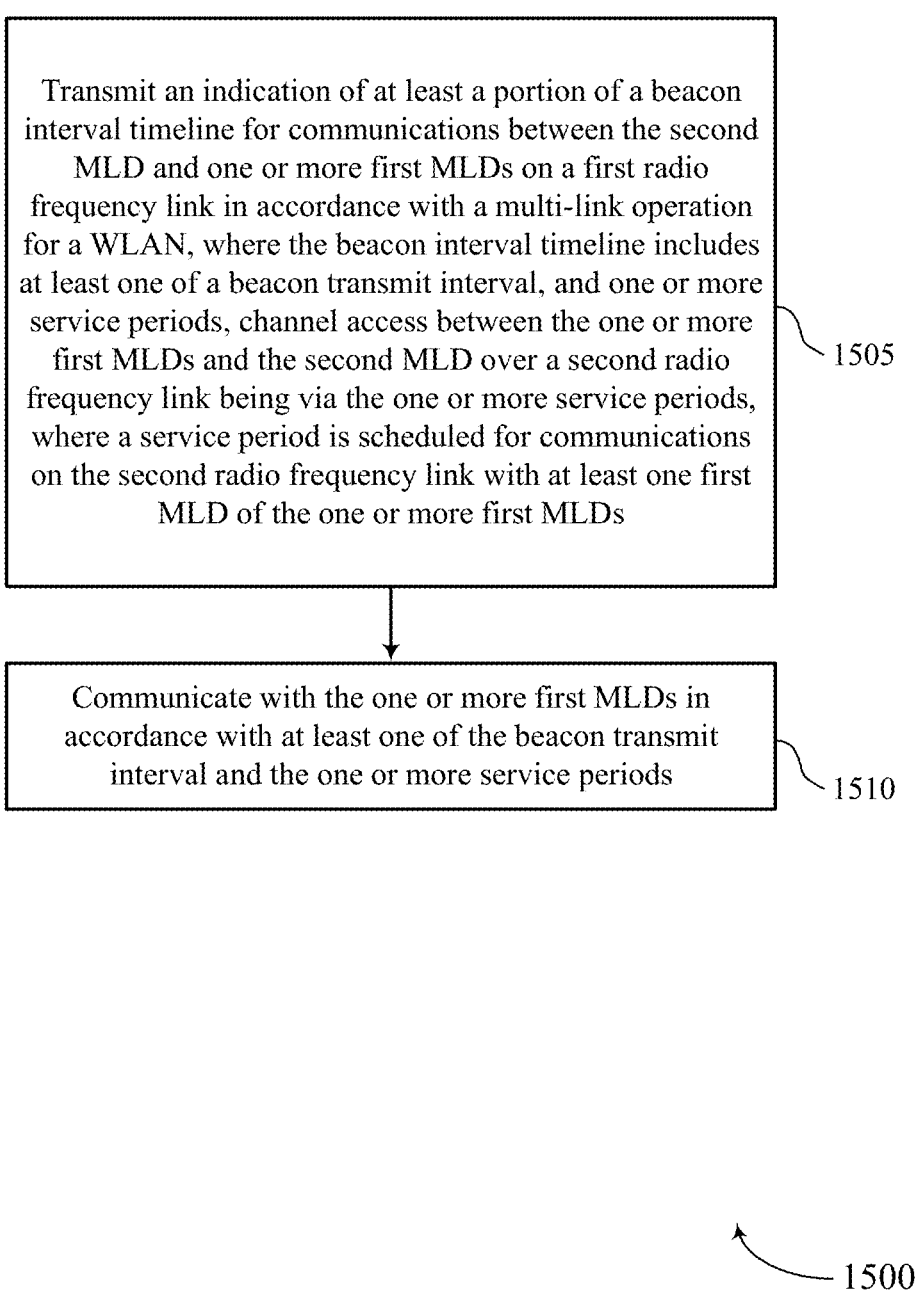
FIGS. 15 through 22 show flowcharts illustrating methods that support techniques for channel access in wireless communications systems in accordance with one or more aspects of the present disclosure.

FIG. 15 shows a flowchart illustrating a method 1500 that supports techniques for channel access in wireless communications systems in accordance with one or more aspects of the present disclosure. The operations of the method 1500 may be implemented by an AP or its components as described herein. For example, the operations of the method 1500 may be performed by an AP as described with reference to FIGS. 1 through 10. In some examples, an AP may execute a set of instructions to control the functional elements of the AP to perform the described functions. Additionally, or alternatively, the AP may perform aspects of the described functions using special-purpose hardware.

At 1505, the method may include transmitting an indication of at least a portion of a beacon interval timeline for communications between the second MLD and one or more first MLDs on a first radio frequency link in accordance with a multi-link operation for a WLAN, where the beacon interval timeline includes at least one of a beacon transmit interval, and one or more service periods, channel access between the one or more first MLDs and the second MLD over a second radio frequency link being via the one or more service periods, where a service period is scheduled for communications on the second radio frequency link with at least one first MLD of the one or more first MLDs. The operations of 1505 may be performed in accordance with examples as disclosed herein. In some examples, aspects of the operations of 1505 may be performed by a beacon interval timeline component 925 as described with reference to FIG. 9.

At 1510, the method may include communicating with the one or more first MLDs in accordance with at least one of the beacon transmit interval and the one or more service periods. The operations of 1510 may be performed in accordance with examples as disclosed herein. In some examples, aspects of the operations of 1510 may be performed by a multi-link operation component 930 as described with reference to FIG. 9.

Figure 16:
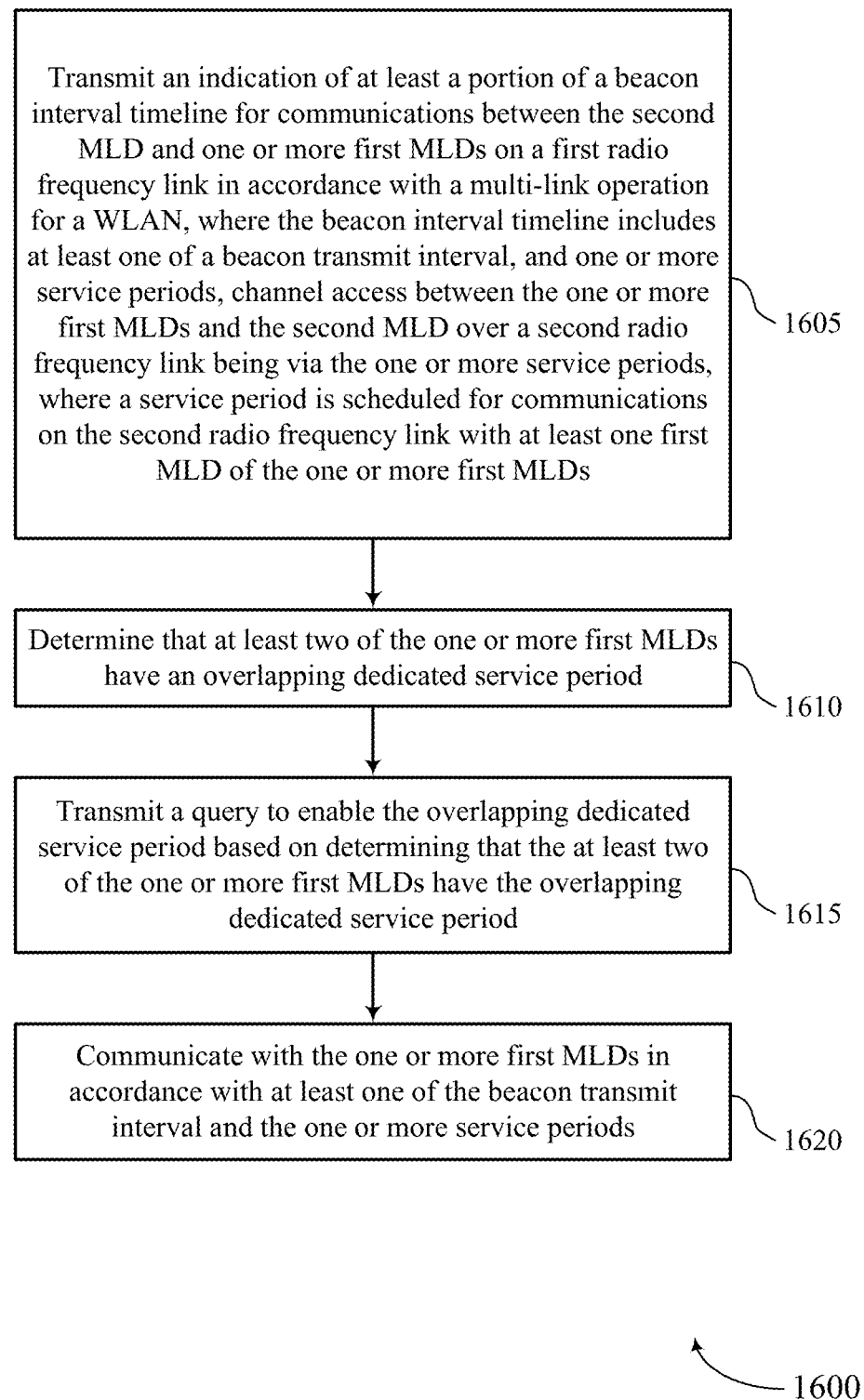

FIG. 16 shows a flowchart illustrating a method 1600 that supports techniques for channel access in wireless communications systems in accordance with one or more aspects of the present disclosure. The operations of the method 1600 may be implemented by an AP or its components as described herein. For example, the operations of the method 1600 may be performed by an AP as described with reference to FIGS. 1 through 10. In some examples, an AP may execute a set of instructions to control the functional elements of the AP to perform the described functions. Additionally, or alternatively, the AP may perform aspects of the described functions using special-purpose hardware.

At 1605, the method may include transmitting an indication of at least a portion of a beacon interval timeline for communications between the second MLD and one or more first MLDs on a first radio frequency link in accordance with a multi-link operation for a WLAN, where the beacon interval timeline includes at least one of a beacon transmit interval, and one or more service periods, channel access between the one or more first MLDs and the second MLD over a second radio frequency link being via the one or more service periods, where a service period is scheduled for communications on the second radio frequency link with at least one first MLD of the one or more first MLDs. The operations of 1605 may be performed in accordance with examples as disclosed herein. In some examples, aspects of the operations of 1605 may be performed by a beacon interval timeline component 925 as described with reference to FIG. 9.

At 1610, the method may include determining that at least two of the one or more first MLDs have an overlapping dedicated service period. The operations of 1610 may be performed in accordance with examples as disclosed herein. In some examples, aspects of the operations of 1610 may be performed by a service period setup component 950 as described with reference to FIG. 9.

At 1615, the method may include transmitting a query to enable the overlapping dedicated service period based on determining that the at least two of the one or more first MLDs have the overlapping dedicated service period. The operations of 1615 may be performed in accordance with examples as disclosed herein. In some examples, aspects of the operations of 1615 may be performed by a query component 955 as described with reference to FIG. 9.

At 1620, the method may include communicating with the one or more first MLDs in accordance with at least one of the beacon transmit interval and the one or more service periods. The operations of 1620 may be performed in accordance with examples as disclosed herein. In some examples, aspects of the operations of 1620 may be performed by a multi-link operation component 930 as described with reference to FIG. 9.

Figure 17:
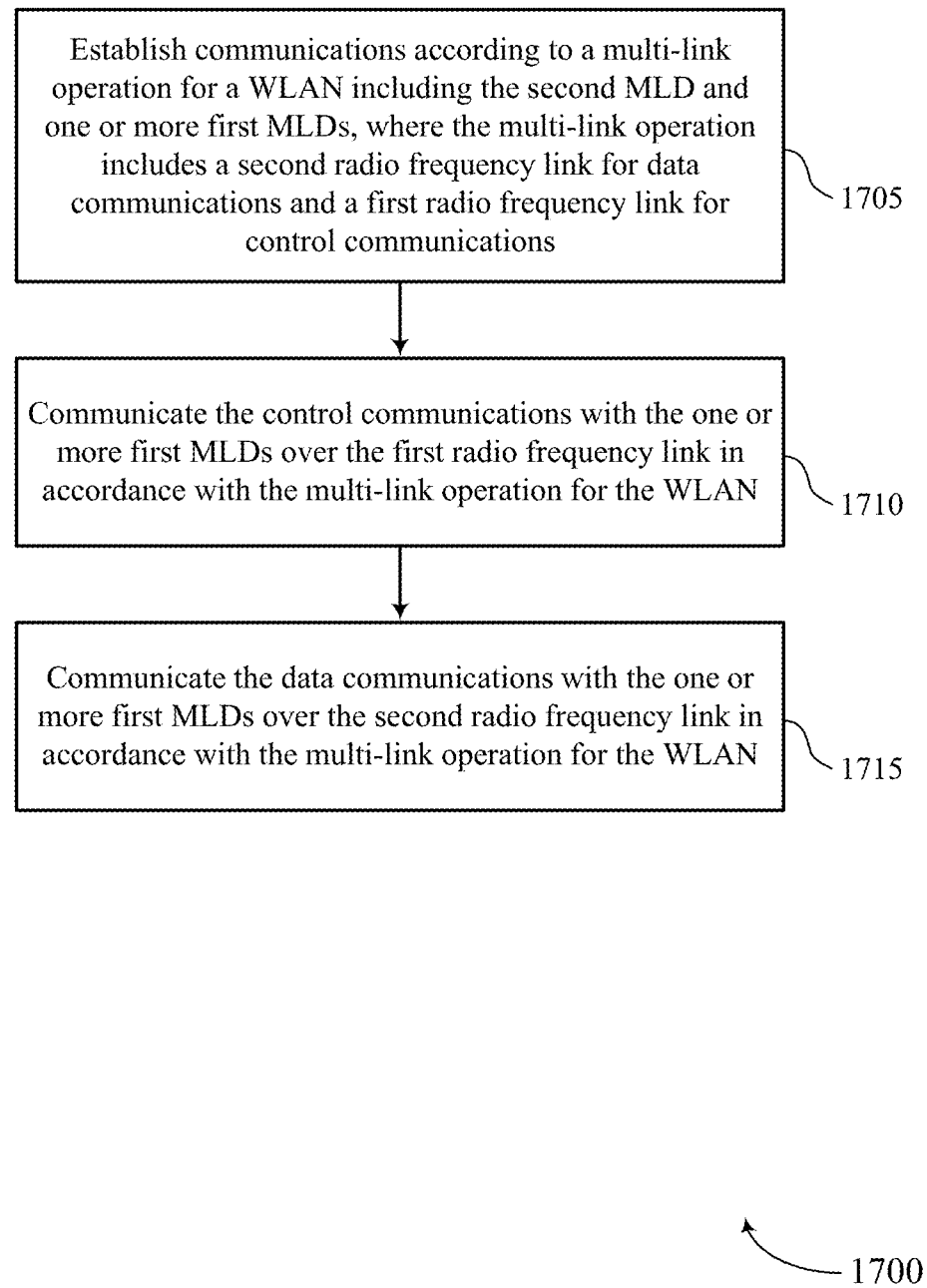

FIG. 17 shows a flowchart illustrating a method 1700 that supports techniques for channel access in wireless communications systems in accordance with one or more aspects of the present disclosure. The operations of the method 1700 may be implemented by an AP or its components as described herein. For example, the operations of the method 1700 may be performed by an AP as described with reference to FIGS. 1 through 10. In some examples, an AP may execute a set of instructions to control the functional elements of the AP to perform the described functions. Additionally, or alternatively, the AP may perform aspects of the described functions using special-purpose hardware.

At 1705, the method may include establishing communications according to a multi-link operation for a WLAN including the second MLD and one or more first MLDs, where the multi-link operation includes a second radio frequency link for data communications and a first radio frequency link for control communications. The operations of 1705 may be performed in accordance with examples as disclosed herein. In some examples, aspects of the operations of 1705 may be performed by a multi-link operation component 930 as described with reference to FIG. 9.

At 1710, the method may include communicating the control communications with the one or more first MLDs over the first radio frequency link in accordance with the multi-link operation for the WLAN. The operations of 1710 may be performed in accordance with examples as disclosed herein. In some examples, aspects of the operations of 1710 may be performed by a control information component 935 as described with reference to FIG. 9.

At 1715, the method may include communicating the data communications with the one or more first MLDs over the second radio frequency link in accordance with the multi-link operation for the WLAN. The operations of 1715 may be performed in accordance with examples as disclosed herein. In some examples, aspects of the operations of 1715 may be performed by a data component 940 as described with reference to FIG. 9.

Figure 18:
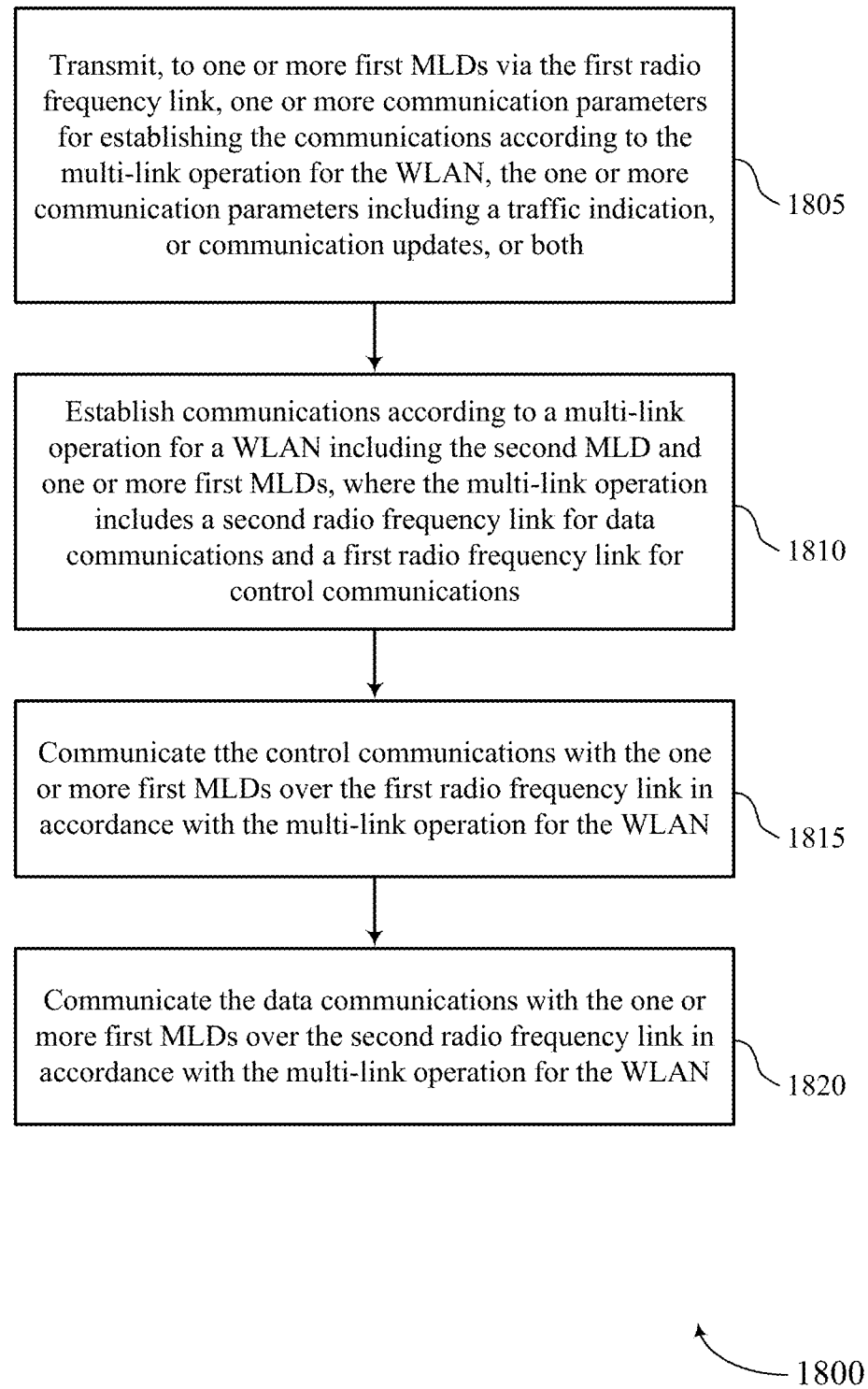

FIG. 18 shows a flowchart illustrating a method 1800 that supports techniques for channel access in wireless communications systems in accordance with one or more aspects of the present disclosure. The operations of the method 1800 may be implemented by an AP or its components as described herein. For example, the operations of the method 1800 may be performed by an AP as described with reference to FIGS. 1 through 10. In some examples, an AP may execute a set of instructions to control the functional elements of the AP to perform the described functions. Additionally, or alternatively, the AP may perform aspects of the described functions using special-purpose hardware.

At 1805, the method may include transmitting, to one or more first MLDs via the first radio frequency link, one or more communication parameters for establishing the communications according to the multi-link operation for the WLAN, the one or more communication parameters including a traffic indication, or communication updates, or both. The operations of 1805 may be performed in accordance with examples as disclosed herein. In some examples, aspects of the operations of 1805 may be performed by a communication parameter component 980 as described with reference to FIG. 9.

At 1810, the method may include establishing communications according to a multi-link operation for a WLAN including the second MLD and one or more first MLDs, where the multi-link operation includes a second radio frequency link for data communications and a first radio frequency link for control communications. The operations of 1810 may be performed in accordance with examples as disclosed herein. In some examples, aspects of the operations of 1810 may be performed by a multi-link operation component 930 as described with reference to FIG. 9.

At 1815, the method may include communicating the control communications with the one or more first MLDs over the first radio frequency link in accordance with the multi-link operation for the WLAN. The operations of 1815 may be performed in accordance with examples as disclosed herein. In some examples, aspects of the operations of 1815 may be performed by a control information component 935 as described with reference to FIG. 9.

At 1820, the method may include communicating the data communications with the one or more first MLDs over the second radio frequency link in accordance with the multi-link operation for the WLAN. The operations of 1820 may be performed in accordance with examples as disclosed herein. In some examples, aspects of the operations of 1820 may be performed by a data component 940 as described with reference to FIG. 9.

Figure 19:
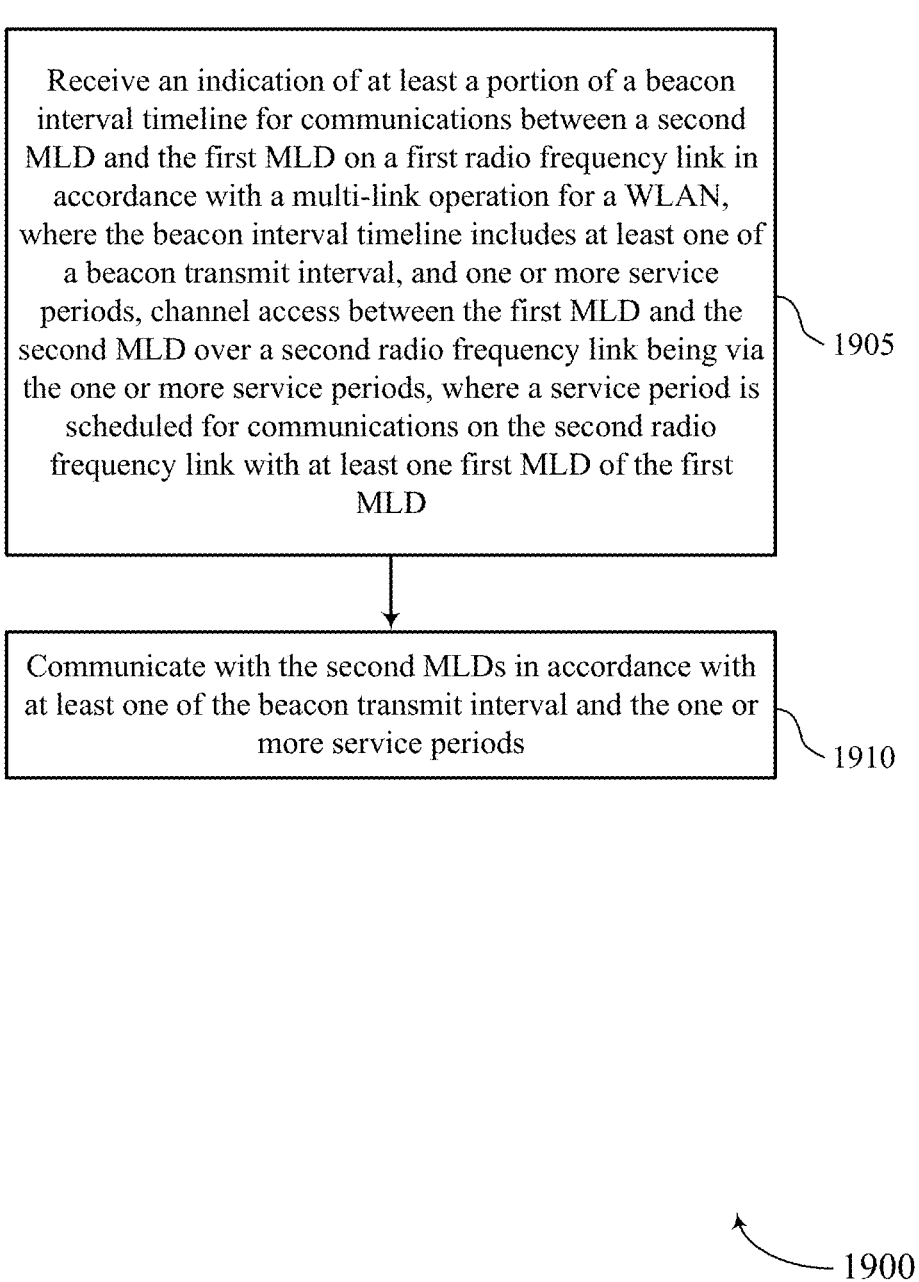

FIG. 19 shows a flowchart illustrating a method 1900 that supports techniques for channel access in wireless communications systems in accordance with one or more aspects of the present disclosure. The operations of the method 1900 may be implemented by an STA or its components as described herein. For example, the operations of the method 1900 may be performed by an STA as described with reference to FIGS. 1 through 6 and 11 through 14. In some examples, an STA may execute a set of instructions to control the functional elements of the STA to perform the described functions. Additionally, or alternatively, the STA may perform aspects of the described functions using special-purpose hardware.

At 1905, the method may include receiving an indication of at least a portion of a beacon interval timeline for communications between a second MLD and the first MLD on a first radio frequency link in accordance with a multi-link operation for a WLAN, where the beacon interval timeline includes at least one of a beacon transmit interval, and one or more service periods, channel access between the first MLD and the second MLD over a second radio frequency link being via the one or more service periods, where a service period is scheduled for communications on the second radio frequency link with at least one first MLD of the first MLD. The operations of 1905 may be performed in accordance with examples as disclosed herein. In some examples, aspects of the operations of 1905 may be performed by a beacon interval timeline component 1325 as described with reference to FIG. 13.

At 1910, the method may include communicating with the second MLDs in accordance with at least one of the beacon transmit interval and the one or more service periods. The operations of 1910 may be performed in accordance with examples as disclosed herein. In some examples, aspects of the operations of 1910 may be performed by a multi-link operation component 1330 as described with reference to FIG. 13.

Figure 20:
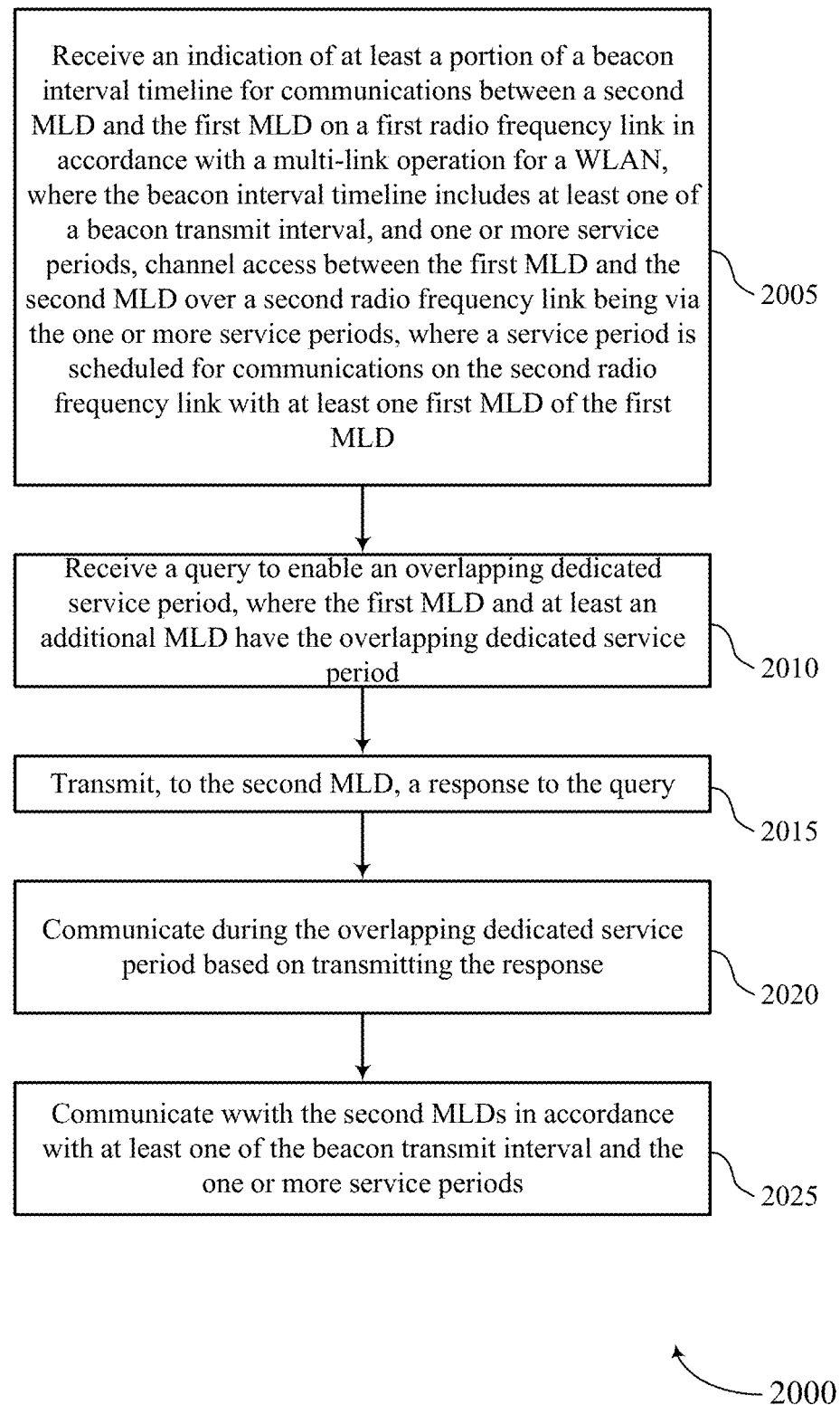

FIG. 20 shows a flowchart illustrating a method 2000 that supports techniques for channel access in wireless communications systems in accordance with one or more aspects of the present disclosure. The operations of the method 2000 may be implemented by an STA or its components as described herein. For example, the operations of the method 2000 may be performed by an STA as described with reference to FIGS. 1 through 6 and 11 through 14. In some examples, an STA may execute a set of instructions to control the functional elements of the STA to perform the described functions. Additionally, or alternatively, the STA may perform aspects of the described functions using special-purpose hardware.

At 2005, the method may include receiving an indication of at least a portion of a beacon interval timeline for communications between a second MLD and the first MLD on a first radio frequency link in accordance with a multi-link operation for a WLAN, where the beacon interval timeline includes at least one of a beacon transmit interval, and one or more service periods, channel access between the first MLD and the second MLD over a second radio frequency link being via the one or more service periods, where a service period is scheduled for communications on the second radio frequency link with at least one first MLD of the first MLD. The operations of 2005 may be performed in accordance with examples as disclosed herein. In some examples, aspects of the operations of 2005 may be performed by a beacon interval timeline component 1325 as described with reference to FIG. 13.

At 2010, the method may include receiving a query to enable an overlapping dedicated service period, where the first MLD and at least an additional MLD have the overlapping dedicated service period. The operations of 2010 may be performed in accordance with examples as disclosed herein. In some examples, aspects of the operations of 2010 may be performed by a request component 1355 as described with reference to FIG. 13.

At 2015, the method may include transmitting, to the second MLD, a response to the query. The operations of 2015 may be performed in accordance with examples as disclosed herein. In some examples, aspects of the operations of 2015 may be performed by a response component 1375 as described with reference to FIG. 13.

At 2020, the method may include communicating during the overlapping dedicated service period based on transmitting the response. The operations of 2020 may be performed in accordance with examples as disclosed herein. In some examples, aspects of the operations of 2020 may be performed by a multi-link operation component 1330 as described with reference to FIG. 13.

At 2025, the method may include communicating with the second MLDs in accordance with at least one of the beacon transmit interval and the one or more service periods. The operations of 2025 may be performed in accordance with examples as disclosed herein. In some examples, aspects of the operations of 2025 may be performed by a multi-link operation component 1330 as described with reference to FIG. 13.

Figure 21:
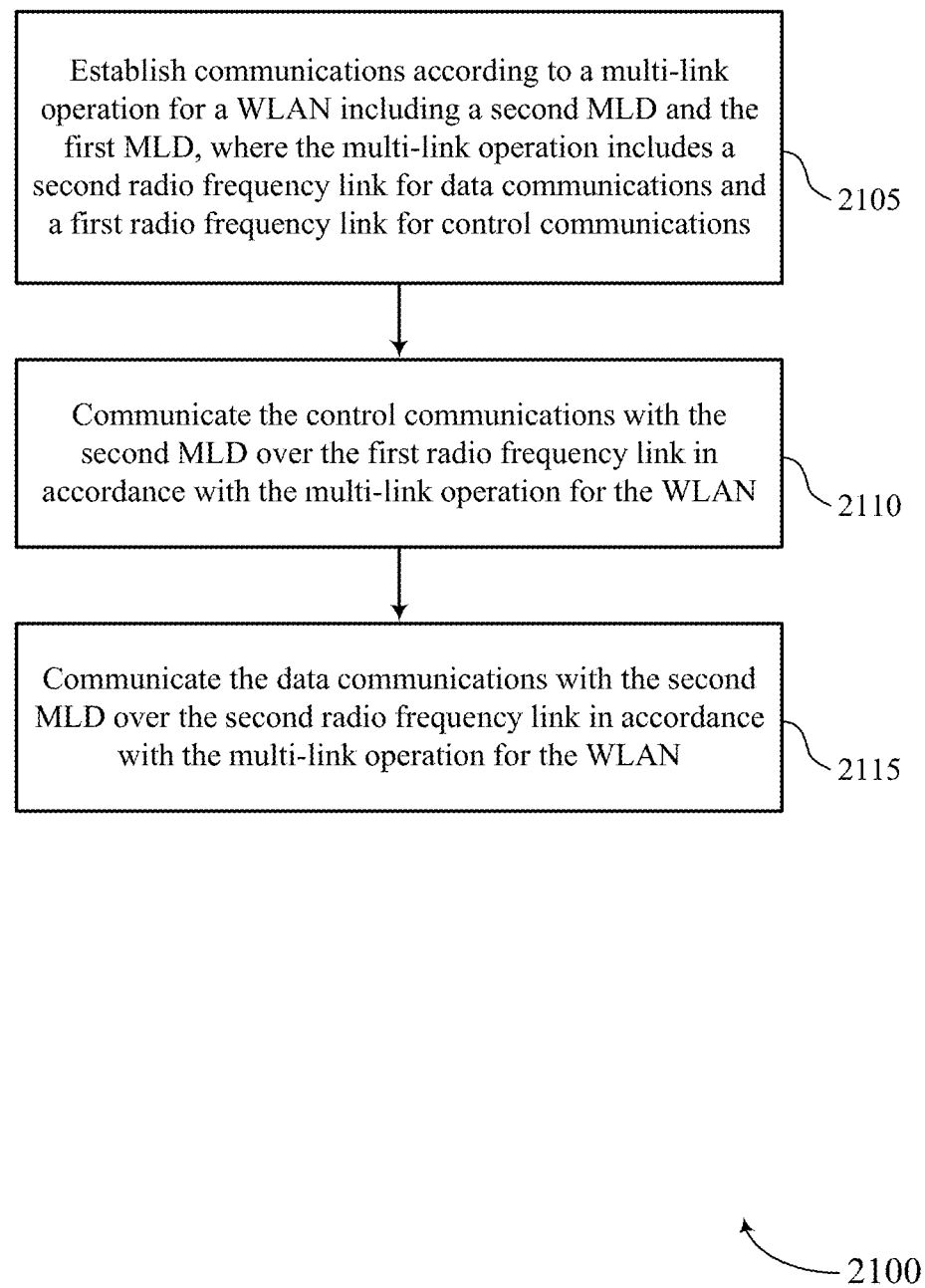

FIG. 21 shows a flowchart illustrating a method 2100 that supports techniques for channel access in wireless communications systems in accordance with one or more aspects of the present disclosure. The operations of the method 2100 may be implemented by an STA or its components as described herein. For example, the operations of the method 2100 may be performed by an STA as described with reference to FIGS. 1 through 6 and 11 through 14. In some examples, an STA may execute a set of instructions to control the functional elements of the STA to perform the described functions. Additionally, or alternatively, the STA may perform aspects of the described functions using special-purpose hardware.

At 2105, the method may include establishing communications according to a multi-link operation for a WLAN including a second MLD and the first MLD, where the multi-link operation includes a second radio frequency link for data communications and a first radio frequency link for control communications. The operations of 2105 may be performed in accordance with examples as disclosed herein. In some examples, aspects of the operations of 2105 may be performed by a multi-link operation component 1330 as described with reference to FIG. 13.

At 2110, the method may include communicating the control communications with the second MLD over the first radio frequency link in accordance with the multi-link operation for the WLAN. The operations of 2110 may be performed in accordance with examples as disclosed herein. In some examples, aspects of the operations of 2110 may be performed by a control component 1335 as described with reference to FIG. 13.

At 2115, the method may include communicating the data communications with the second MLD over the second radio frequency link in accordance with the multi-link operation for the WLAN. The operations of 2115 may be performed in accordance with examples as disclosed herein. In some examples, aspects of the operations of 2115 may be performed by a data component 1340 as described with reference to FIG. 13.

Figure 22:
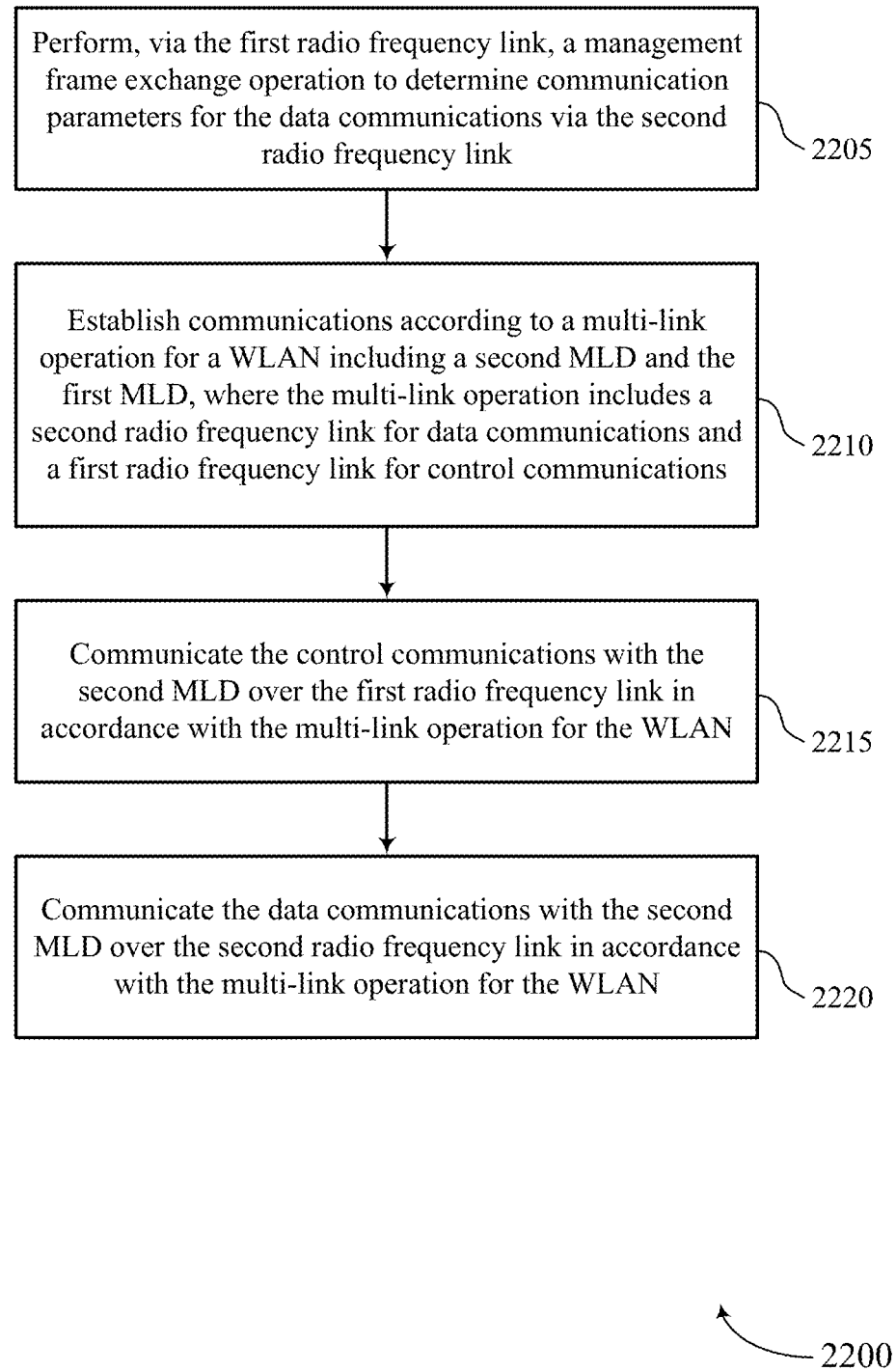

FIG. 22 shows a flowchart illustrating a method 2200 that supports techniques for channel access in wireless communications systems in accordance with one or more aspects of the present disclosure. The operations of the method 2200 may be implemented by an STA or its components as described herein. For example, the operations of the method 2200 may be performed by an STA as described with reference to FIGS. 1 through 6 and 11 through 14. In some examples, an STA may execute a set of instructions to control the functional elements of the STA to perform the described functions. Additionally, or alternatively, the STA may perform aspects of the described functions using special-purpose hardware.

At 2205, the method may include performing, via the first radio frequency link, a management frame exchange operation to determine communication parameters for the data communications via the second radio frequency link. The operations of 2205 may be performed in accordance with examples as disclosed herein. In some examples, aspects of the operations of 2205 may be performed by a communication parameter component 1380 as described with reference to FIG. 13.

At 2210, the method may include establishing communications according to a multi-link operation for a WLAN including a second MLD and the first MLD, where the multi-link operation includes a second radio frequency link for data communications and a first radio frequency link for control communications. The operations of 2210 may be performed in accordance with examples as disclosed herein. In some examples, aspects of the operations of 2210 may be performed by a multi-link operation component 1330 as described with reference to FIG. 13.

At 2215, the method may include communicating the control communications with the second MLD over the first radio frequency link in accordance with the multi-link operation for the WLAN. The operations of 2215 may be performed in accordance with examples as disclosed herein. In some examples, aspects of the operations of 2215 may be performed by a control component 1335 as described with reference to FIG. 13.

At 2220, the method may include communicating the data communications with the second MLD over the second radio frequency link in accordance with the multi-link operation for the WLAN. The operations of 2220 may be performed in accordance with examples as disclosed herein. In some examples, aspects of the operations of 2220 may be performed by a data component 1340 as described with reference to FIG. 13.

The following provides an overview of aspects of the present disclosure:

Aspect 1: A method for wireless communication at a second multi-link device (MLD), comprising: transmitting an indication of at least a portion of a beacon interval timeline for communications between the second MLD and one or more first MLDs on a first radio frequency link in accordance with a multi-link operation for a wireless local area network, wherein the beacon interval timeline includes at least one of a beacon transmit interval, and one or more service periods, channel access between the one or more first MLDs and the second MLD over a second radio frequency link being via the one or more service periods, wherein a service period is scheduled for communications on the second radio frequency link with at least one first MLD of the one or more first MLDs; and communicating with the one or more first MLDs in accordance with at least one of the beacon transmit interval and the one or more service periods.

Aspect 2: The method of aspect 1, further comprising: performing, during the beacon transmit interval, a sector sweep of a set of beacon frames, wherein the second MLD communicates with the one or more first MLDs based at least in part on performing the sector sweep.

Aspect 3: The method of aspect 2, wherein the set of beacon frames comprises at least one of a basic service set identifier identifying the second MLD, a sector identifier associated with beam training, a timing synchronization function, a duration of a beacon interval, a traffic indication map, or a combination thereof.

Aspect 4: The method of any of aspects 1 through 3, further comprising: transmitting, via the first radio frequency link, at least one of a number of sectors, dwell time per sector of the number of sectors, a number of beacon intervals during which the beacon transmit interval is skipped, or a combination thereof, wherein communication during the one or more service periods is via the second radio frequency link.

Aspect 5: The method of any of aspects 1 through 4, further comprising: performing a service period setup operation to schedule the one or more service periods on the first radio frequency link for communications with the at least one of the one or more first MLDs.

Aspect 6: The method of aspect 5, wherein the service period setup operation is via the first radio frequency link or the second radio frequency link.

Aspect 7: The method of any of aspects 5 through 6, further comprising: allocating, to at least one of the one or more first MLDs and during the service period setup operation, two or more dedicated service periods, wherein the two or more dedicated service periods are included in the one or more service periods in the beacon interval.

Aspect 8: The method of aspect 7, wherein the allocating is based at least in part on a traffic profile associated with the at least one of the one or more first MLDs.

Aspect 9: The method of any of aspects 5 through 8, further comprising: receiving, from at least one of the one or more first MLDs and during the service period setup operation, a request for a dedicated service period for a peer-to-peer communication.

Aspect 10: The method of any of aspects 1 through 9, further comprising: determining that at least two of the one or more first MLDs have an overlapping dedicated service period; and transmitting a query to enable the overlapping dedicated service period based at least in part on determining that the at least two of the one or more first MLDs have the overlapping dedicated service period.

Aspect 11: The method of aspect 10, wherein the query is included in a trigger frame or a power save poll or a quality of service null frame.

Aspect 12: The method of any of aspects 10 through 11, further comprising: receiving, from one of the at least two of the first MLDs, a response to the query; and communicating during the overlapping dedicated service period based at least in part on receiving the response.

Aspect 13: The method of aspect 12, wherein the response to the query comprises a trigger-based physical layer protocol data unit or an acknowledgement.

Aspect 14: The method of any of aspects 10 through 13, further comprising: receiving, from one of the at least two of the first MLDs, a response to the query, the response comprising information associated with beam training.

Aspect 15: The method of any of aspects 1 through 14, wherein a third MLD and a fourth MLD communicate over a common overlapping dedicated service period, a first beamformed link associated with the third MLD is orthogonal to a second beamformed link associated with the fourth MLD.

Aspect 16: The method of any of aspects 1 through 15, further comprising: communicating with at least one of the one or more first MLDs during a dedicated service period; determining that additional downlink buffer units are remaining after conclusion of the dedicated service period; and transmitting, based at least in part on determining the additional downlink buffer units and after conclusion of the dedicated service period, the indication of at least the portion of the timeline, wherein the indication is of at least one opportunistic service period for communications with the at least one of the one or more first MLDs.

Aspect 17: The method of aspect 16, further comprising: receiving, from at least one of the one or more first MLDs, a response confirming availability for using the at least one opportunistic service period.

Aspect 18: The method of aspect 17, further comprising: communicating with the at least one of the one or more first MLDs during the at least one opportunistic service period based at least in part on receiving the response.

Aspect 19: The method of any of aspects 1 through 18, further comprising: communicating with at least one of the one or more first MLDs during a dedicated service period; receiving information indicative of pending uplink buffer units remaining at the at least one of the one or more first MLDs after conclusion of the dedicated service period; and transmitting, based at least in part on receiving the information indicative of the pending uplink buffer units and after conclusion of the dedicated service period, the indication of at least the portion of the timeline, wherein the indication is of at least one opportunistic service period available for communications with the at least one of the one or more first MLDs.

Aspect 20: The method of aspect 19, further comprising: receiving, from at least one of the one or more first MLDs, a response confirming availability for using the at least one opportunistic service period.

Aspect 21: The method of aspect 20, further comprising: communicating with the at least one of the one or more first MLDs during the at least one opportunistic service period based at least in part on receiving the response.

Aspect 22: The method of any of aspects 1 through 21, further comprising: transmitting, via the first radio frequency link, the indication of at least the portion of the timeline, wherein the indication is of one or more opportunistic service periods available for communications with the one or more first MLDs, wherein communications during the one or more service periods is via the second radio frequency link.

Aspect 23: The method of aspect 22, wherein transmitting the indication comprises: broadcasting, to the one or more first MLDs, the indication of one or more opportunistic service periods available for communications with the one or more first MLDs.

Aspect 24: The method of any of aspects 22 through 23, wherein transmitting the indication comprises: transmitting, to at least one of the one or more first MLDs, the indication of the one or more opportunistic service periods available for communications with the at least one of the one or more first MLDs.

Aspect 25: The method of any of aspects 1 through 24, further comprising: receiving, during a dedicated service period of the one or more service periods, a status report from at least one of the one or more first MLDs; and transmitting, to the at least one of the one or more first MLDs and based at least in part on receiving the status report, the indication of at least the portion of the timeline, wherein the indication is of at least one opportunistic service period.

Aspect 26: The method of aspect 25, wherein the status report comprises at least one of a buffer status report, a data frame, an acknowledgement frame, or a combination thereof.

Aspect 27: The method of any of aspects 1 through 26, further comprising: transmitting, to the one or more first MLDs, the indication of at least the portion of the timeline, wherein the indication is of at least one opportunistic service period; receiving, from at least one of the one or more first MLDs, a response to the indication of the at least one opportunistic service period; and communicating with the at least one of the one or more first MLDs during the at least one opportunistic service period based at least in part on receiving the response.

Aspect 28: The method of any of aspects 1 through 27, wherein the one or more service periods comprises a set of target wake time service periods, and the one or more service periods are allocated to the one or more first MLDs using frame exchanges via the first radio frequency link for communicating via the second radio frequency link.

Aspect 29: The method of any of aspects 1 through 28, wherein the beacon interval comprises at least one of the beacon transmit interval, one or more dedicated service periods and one or more opportunistic service periods.

Aspect 30: The method of aspect 29, wherein the beacon interval is divided into a plurality of equal sized time blocks, and a bit in a bitmap is associated with a corresponding time block of the plurality of equal sized time blocks.

Aspect 31: The method of aspect 30, further comprising: transmitting, to the one or more first MLDs and via the first radio frequency link, a management frame comprising an indicating of the bitmap, wherein the communicating comprises communicating with the one or more first MLDs via the second radio frequency link.

Aspect 32: The method of aspect 31, wherein the management frame comprises a beacon frame or a probe response frame.

Aspect 33: The method of any of aspects 30 through 32, further comprising: receiving, from at least one of the one or more first MLDs, a request for additional time blocks based at least in part on a position of the bit in the bitmap; and transmitting a response based at least in part on receiving the request for the additional time blocks.

Aspect 34: The method of aspect 33, wherein the response comprises an acceptance of the request for the additional time blocks or a denial of the request for the additional time blocks or information indicative of an alternative number of additional time blocks.

Aspect 35: The method of any of aspects 1 through 34, wherein the one or more service periods comprises one or more opportunistic service periods and one or more dedicated service periods, and an opportunistic service period is located in a time gap between the one or more dedicated service periods.

Aspect 36: The method of any of aspects 1 through 35, wherein the one or more service periods comprises one or more opportunistic service periods and one or more dedicated service periods, and the one or more dedicated service periods are associated with a first periodicity and of the one or more opportunistic service periods are associated with a second periodicity.

Aspect 37: The method of any of aspects 1 through 36, wherein the second MLD comprises an AP MLD and the one or more first MLDs comprises one or more non-AP MLD.

Aspect 38: The method of any of aspects 1 through 37, wherein the first radio frequency link is lower than the second radio frequency link.

Aspect 39: A method for wireless communication at a second multi-link device (MLD), comprising: establishing communications according to a multi-link operation for a wireless local area network comprising the second MLD and one or more first MLDs, wherein the multi-link operation comprises a second radio frequency link for data communications and a first radio frequency link for control communications; communicating the control communications with the one or more first MLDs over the first radio frequency link in accordance with the multi-link operation for the wireless local area network; and communicating the data communications with the one or more first MLDs over the second radio frequency link in accordance with the multi-link operation for the wireless local area network.

Aspect 40: The method of aspect 39, further comprising: transmitting, to the one or more first MLDs via the first radio frequency link, one or more communication parameters for establishing the communications according to the multi-link operation for the wireless local area network, the one or more communication parameters comprising a traffic indication, or communication updates, or both.

Aspect 41: The method of any of aspects 39 through 40, further comprising: transmitting, to the one or more first MLDs via the first radio frequency link, timing information for communicating via the second radio frequency link, wherein the timing information comprises a timing offset with respect to a timing value in the first radio frequency link.

Aspect 42: The method of any of aspects 39 through 41, further comprising: performing, via the first radio frequency link, a management frame exchange operation to determine communication parameters for the data communications via the second radio frequency link.

Aspect 43: The method of aspect 42, wherein the management frame exchange operation comprises transmitting a plurality of management frames, and each management frame of the plurality of management frames is addressed to at least one of the one or more first MLDs.

Aspect 44: The method of any of aspects 39 through 43, further comprising: transmitting, via the first radio frequency link, at least one of a number of sectors, dwell time per sector of the number of sectors, a number of beacon intervals, or a combination thereof, wherein communicating with the one or more first MLDs is based at least in part on the transmitting.

Aspect 45: The method of any of aspects 39 through 44, further comprising: performing, via the first radio frequency link, a service period setup operation to schedule one or more dedicated service periods for communications with the one or more first MLDs.

Aspect 46: The method of any of aspects 39 through 45, further comprising: receiving, from at least one of the one or more first MLDs and via the first radio frequency link, a request to schedule a plurality of service periods for data communications via the second radio frequency link.

Aspect 47: The method of any of aspects 39 through 46, further comprising: transmitting, via the first radio frequency link, an indication of one or more opportunistic service periods available for communications with the one or more first MLDs in addition to one or more dedicated service periods allocated to the one or more first MLDs.

Aspect 48: The method of any of aspects 39 through 47, wherein the second MLD and the one or more first MLDs comprise at least one of a single link single radio device, a multi-link single radio device, a multi-link multi-radio device, or a combination thereof.

Aspect 49: The method of any of aspects 39 through 48, wherein the first radio frequency link is lower than the second radio frequency link.

Aspect 50: The method of any of aspects 39 through 49, wherein the second MLD comprises an AP MLD and the one or more first MLDs comprises one or more non-AP MLD.

Aspect 51: A method for wireless communication at a first multi-link device (MLD), comprising: receiving an indication of at least a portion of a beacon interval timeline for communications between a second MLD and the first MLD on a first radio frequency link in accordance with a multi-link operation for a wireless local area network, wherein the beacon interval timeline includes at least one of a beacon transmit interval, and one or more service periods, channel access between the first MLD and the second MLD over a second radio frequency link being via the one or more service periods, wherein a service period is scheduled for communications on the second radio frequency link with at least one first MLD of the first MLD; and communicating with the second MLDs in accordance with at least one of the beacon transmit interval and the one or more service periods.

Aspect 52: The method of aspect 51, further comprising: performing, during the beacon transmit interval, a sector sweep of a set of beacon frames, wherein the second MLD communicates with the first MLD based at least in part on performing the sector sweep.

Aspect 53: The method of aspect 52, wherein the set of beacon frames comprises at least one of a basic service set identifier identifying the second MLD, a sector identifier associated with beam training, a timing synchronization function, a duration of a beacon interval, a traffic indication map, or a combination thereof.

Aspect 54: The method of any of aspects 51 through 53, further comprising: receiving, via the first radio frequency link, at least one of a number of sectors, dwell time per sector of the number of sectors, a number of beacon intervals during which the beacon transmit interval is skipped, or a combination thereof, wherein communication during the one or more service periods is via the second radio frequency link.

Aspect 55: The method of any of aspects 51 through 54, further comprising: performing a service period setup operation to schedule the one or more service periods on the first radio frequency link for communications with the second MLD.

Aspect 56: The method of aspect 55, wherein the service period setup operation is via the first radio frequency link or the second radio frequency link.

Aspect 57: The method of any of aspects 55 through 56, further comprising: receiving, during the service period setup operation, an indication of allocation of two or more dedicated service periods, wherein the two or more dedicated service periods are included in the one or more service periods in the beacon interval.

Aspect 58: The method of aspect 57, wherein the allocation is based at least in part on a traffic profile associated with the first MLD.

Aspect 59: The method of any of aspects 55 through 58, further comprising: transmitting, to the second MLD and during the service period setup operation, a request for a dedicated service period for a peer-to-peer communication.

Aspect 60: The method of any of aspects 51 through 59, further comprising: receiving a query to enable an overlapping dedicated service period, wherein the first MLD and at least an additional MLD have the overlapping dedicated service period.

Aspect 61: The method of aspect 60, wherein the query is included in a trigger frame or a power save poll or a quality of service null frame.

Aspect 62: The method of any of aspects 60 through 61, further comprising: transmitting, to the second MLD, a response to the query; and communicating during the overlapping dedicated service period based at least in part on transmitting the response.

Aspect 63: The method of aspect 62, wherein the response to the query comprises a trigger-based physical layer protocol data unit or an acknowledgement.

Aspect 64: The method of any of aspects 60 through 63, further comprising: transmitting, to the second MLD, a response to the query, the response comprising information requesting beam training for the first MLD.

Aspect 65: The method of any of aspects 51 through 64, wherein a third MLD and a fourth MLD communicate over a common overlapping dedicated service period, a first beamformed link associated with the third MLD is orthogonal to a second beamformed link associated with the fourth MLD.

Aspect 66: The method of any of aspects 51 through 65, further comprising: communicating with the second MLD during a dedicated service period; and receiving, after conclusion of the dedicated service period and based at least in part on additional downlink buffer units remaining after conclusion of the dedicated service period, the indication of at least the portion of the timeline, wherein the indication is of at least one opportunistic service period for communications with the second MLD.

Aspect 67: The method of aspect 66, further comprising: transmitting, to the second MLD, a response confirming availability of the first MLD for using the at least one opportunistic service period.

Aspect 68: The method of aspect 67, further comprising: communicating with the second MLD during the at least one opportunistic service period based at least in part on transmitting the response.

Aspect 69: The method of any of aspects 51 through 68, further comprising: communicating with the second MLD during a dedicated service period; transmitting information indicative of pending uplink buffer units remaining at the first MLD after conclusion of the dedicated service period; and receiving, based at least in part on transmitting the information indicative of the pending uplink buffer units and after conclusion of the dedicated service period, the indication of at least the portion of the timeline, wherein the indication is of at least one opportunistic service period available for communications with the second MLD.

Aspect 70: The method of aspect 69, further comprising: transmitting, to the second MLD, a response confirming availability of the first MLD for using the at least one opportunistic service period.

Aspect 71: The method of aspect 70, further comprising: communicating with the second MLD during the at least one opportunistic service period based at least in part on transmitting the response.

Aspect 72: The method of any of aspects 51 through 71, further comprising: receiving, via the first radio frequency link, the indication of at least the portion of the timeline, wherein the indication is of one or more opportunistic service periods available for communications with the first MLD, wherein communications during the one or more service periods is via the second radio frequency link.

Aspect 73: The method of aspect 72, wherein receiving the indication comprises: receiving, from the second MLD, a broadcast of the indication of one or more opportunistic service periods available for communications with the first MLD.

Aspect 74: The method of aspect 73, wherein receiving the indication comprises: receiving, from the second MLD, the indication of the one or more opportunistic service periods available for communications with the second MLD.

Aspect 75: The method of any of aspects 51 through 74, further comprising: transmitting, during a dedicated service period of the one or more service periods, a status report; and receiving, from the second MLD and based at least in part on transmitting the status report, the indication of at least the portion of the timeline, wherein the indication is of at least one opportunistic service period.

Aspect 76: The method of aspect 75, wherein the status report comprises at least one of a buffer status report, a data frame, an acknowledgement frame, or a combination thereof.

Aspect 77: The method of any of aspects 51 through 76, further comprising: receiving, from the second MLD, the indication of at least the portion of the timeline, wherein the indication is of at least one opportunistic service period; transmitting, to the second MLD, a response to the indication of the at least one opportunistic service period; and communicating with the second MLD during the at least one opportunistic service period based at least in part on transmitting the response.

Aspect 78: The method of any of aspects 51 through 77, wherein the one or more service periods comprises a set of target wake time service periods, and the one or more service periods are allocated to the first MLD using frame exchanges via the first radio frequency link for communicating via the second radio frequency link.

Aspect 79: The method of any of aspects 51 through 78, wherein the beacon interval comprises at least one of the beacon transmit interval, one or more dedicated service periods and one or more opportunistic service periods.

Aspect 80: The method of aspect 79, wherein the beacon interval is divided into a plurality of equal sized time blocks, and a bit in a bitmap is associated with a corresponding time block of the plurality of equal sized time blocks.

Aspect 81: The method of aspect 80, further comprising: receiving, from the second MLD and via the first radio frequency link, a management frame comprising an indicating of the bitmap, wherein the communicating comprises communicating with the second MLD via the second radio frequency link.

Aspect 82: The method of aspect 81, wherein the management frame comprises a beacon frame or a probe response frame.

Aspect 83: The method of any of aspects 80 through 82, further comprising: transmitting, to the second MLD, a request for additional time blocks based at least in part on a position of the bit in the bitmap; and receiving a response based at least in part on transmitting the request for the additional time blocks.

Aspect 84: The method of aspect 83, wherein the response comprises an acceptance of the request for the additional time blocks or a denial of the request for the additional time blocks or information indicative of an alternative number of additional time blocks.

Aspect 85: The method of any of aspects 51 through 84, wherein the one or more service periods comprises one or more opportunistic service periods and one or more dedicated service periods, and an opportunistic service period is located in a time gap between the one or more dedicated service periods.

Aspect 86: The method of any of aspects 51 through 85, wherein the one or more service periods comprises one or more opportunistic service periods and one or more dedicated service periods, and the one or more dedicated service periods are associated with a first periodicity and of the one or more opportunistic service periods are associated with a second periodicity.

Aspect 87: The method of any of aspects 51 through 86, wherein the second MLD comprises an AP MLD and the first MLD comprises a non-AP MLD.

Aspect 88: The method of any of aspects 51 through 87, wherein the first radio frequency link is lower than the second radio frequency link.

Aspect 89: A method for wireless communication at a first multi-link device (MLD), comprising: establishing communications according to a multi-link operation for a wireless local area network comprising a second MLD and the first MLD, wherein the multi-link operation comprises a second radio frequency link for data communications and a first radio frequency link for control communications; communicating the control communications with the second MLD over the first radio frequency link in accordance with the multi-link operation for the wireless local area network; and communicating the data communications with the second MLD over the second radio frequency link in accordance with the multi-link operation for the wireless local area network.

Aspect 90: The method of aspect 89, further comprising: receiving, from the second MLD via the first radio frequency link, one or more communication parameters for establishing the communications according to the multi-link operation for the wireless local area network, the one or more communication parameters comprising a traffic indication, or communication updates, or both.

Aspect 91: The method of any of aspects 89 through 90, further comprising: receiving, from the second MLD via the first radio frequency link, timing information for communicating via the second radio frequency link, wherein the timing information comprises a timing offset with respect to a timing value in the first radio frequency link.

Aspect 92: The method of any of aspects 89 through 91, further comprising: performing, via the first radio frequency link, a management frame exchange operation to determine communication parameters for the data communications via the second radio frequency link.

Aspect 93: The method of aspect 92, wherein the management frame exchange operation comprises transmitting a plurality of management frames, and each management frame of the plurality of management frames is addressed to the first MLD.

Aspect 94: The method of any of aspects 89 through 93, further comprising: receiving, via the first radio frequency link, at least one of a number of sectors, dwell time per sector of the number of sectors, a number of beacon intervals, or a combination thereof, wherein communicating with the second MLD is based at least in part on the receiving.

Aspect 95: The method of any of aspects 89 through 94, further comprising: performing, via the first radio frequency link, a service period setup operation to schedule one or more dedicated service periods for communications with the second MLD.

Aspect 96: The method of any of aspects 89 through 95, further comprising: transmitting, to the second MLD and via the first radio frequency link, a request to schedule a plurality of service periods for data communications via the second radio frequency link.

Aspect 97: The method of any of aspects 89 through 96, further comprising: receiving, via the first radio frequency link, an indication of one or more opportunistic service periods available for communications with the second MLD in addition to one or more dedicated service periods allocated to the first MLD.

Aspect 98: The method of any of aspects 89 through 97, wherein the second MLD and the first MLD comprise at least one of a single link single radio device, a multi-link single radio device, a multi-link multi-radio device, or a combination thereof.

Aspect 99: The method of any of aspects 89 through 98, wherein the first radio frequency link is lower than the second radio frequency link.

Aspect 100: The method of any of aspects 89 through 99, wherein the second MLD comprises an AP MLD and the first MLD comprises a non-AP MLD.

Aspect 101: An apparatus for wireless communication at a second multi-link device (MLD), comprising a processor; memory coupled with the processor; and instructions stored in the memory and executable by the processor to cause the apparatus to perform a method of any of aspects 1 through 38.

Aspect 102: An apparatus for wireless communication at a second multi-link device (MLD), comprising at least one means for performing a method of any of aspects 1 through 38.

Aspect 103: A non-transitory computer-readable medium storing code for wireless communication at a second multi-link device (MLD), the code comprising instructions executable by a processor to perform a method of any of aspects 1 through 38.

Aspect 104: An apparatus for wireless communication at a second multi-link device (MLD), comprising a processor; memory coupled with the processor; and instructions stored in the memory and executable by the processor to cause the apparatus to perform a method of any of aspects 39 through 50.

Aspect 105: An apparatus for wireless communication at a second multi-link device (MLD), comprising at least one means for performing a method of any of aspects 39 through 50.

Aspect 106: A non-transitory computer-readable medium storing code for wireless communication at a second multilink device (MLD), the code comprising instructions executable by a processor to perform a method of any of aspects 39 through 50.

Aspect 107: An apparatus for wireless communication at a first multi-link device (MLD), comprising a processor; memory coupled with the processor; and instructions stored in the memory and executable by the processor to cause the apparatus to perform a method of any of aspects 51 through 88.

Aspect 108: An apparatus for wireless communication at a first multi-link device (MLD), comprising at least one means for performing a method of any of aspects 51 through 88.

Aspect 109: A non-transitory computer-readable medium storing code for wireless communication at a first multi-link device (MLD), the code comprising instructions executable by a processor to perform a method of any of aspects 51 through 88.

Aspect 110: An apparatus for wireless communication at a first multi-link device (MLD), comprising a processor; memory coupled with the processor; and instructions stored in the memory and executable by the processor to cause the apparatus to perform a method of any of aspects 89 through 100.

Aspect 111: An apparatus for wireless communication at a first multi-link device (MLD), comprising at least one means for performing a method of any of aspects 89 through 100.

Aspect 112: A non-transitory computer-readable medium storing code for wireless communication at a first multi-link device (MLD), the code comprising instructions executable by a processor to perform a method of any of aspects 89 through 100.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a second multi-link device (MLD), comprising:
    transmitting, on a first radio frequency link in accordance with a multi-link operation for a wireless local area network, an indication of at least a portion of a beacon interval timeline for communications between the second MLD and one or more first MLDs, wherein the beacon interval timeline includes at least one of a beacon transmit interval, and one or more service periods, channel access between the one or more first MLDs and the second MLD over a second radio frequency link being via the one or more service periods, wherein a service period of the one or more service periods is scheduled for communications on the second radio frequency link with at least one first MLD of the one or more first MLDs;
    communicating with the one or more first MLDs in accordance with at least one of the beacon transmit interval and the one or more service periods; and
    transmitting, via the first radio frequency link, at least one of a number of sectors, dwell time per sector of the number of sectors, a number of beacon intervals during which the beacon transmit interval is skipped, a duration associated with the beacon transmit interval, a location of the beacon transmit interval within the beacon interval timeline, or a combination thereof, wherein communication during the one or more service periods is via the second radio frequency link.

2. The method of claim 1, further comprising:
    performing, during the beacon transmit interval, a sector sweep of a set of beacon frames, wherein the second MLD communicates with the one or more first MLDs based at least in part on performing the sector sweep.

3. The method of claim 2, wherein the set of beacon frames comprises at least one of a portion of a basic service set identifier identifying the second MLD, a sector identifier associated with beam training, a portion of a timing synchronization function, a duration of a beacon interval, a traffic indication map, or a combination thereof.

4. The method of claim 1, further comprising:
    determining that at least two of the one or more first MLDs have an overlapping first service period; and
    transmitting a query to enable the overlapping first service period based at least in part on determining that the at least two of the one or more first MLDs have the overlapping first service period.

5. The method of claim 4, wherein the query is included in a trigger frame or a power save poll or a quality of service null frame.

6. The method of claim 4, further comprising:
    receiving, from one of the at least two of the first MLDs, a response to the query; and
    communicating during the overlapping first service period based at least in part on receiving the response.

7. The method of claim 6, wherein the response to the query comprises a trigger-based physical layer protocol data unit or an acknowledgement.

8. The method of claim 4, further comprising:
    receiving, from one of the at least two of the first MLDs, a response to the query, the response comprising information associated with beam training.

9. The method of claim 1, wherein:
    a third MLD and a fourth MLD communicate over a common overlapping first service period, and
    a first beamformed link associated with the third MLD is orthogonal to a second beamformed link associated with the fourth MLD.

10. The method of claim 1, further comprising:
    communicating with at least one of the one or more first MLDs during a first service period;
    determining that additional downlink buffer units are remaining after conclusion of the first service period; and
    transmitting, based at least in part on determining the additional downlink buffer units and after conclusion of the first service period, the indication of at least the portion of the beacon interval timeline, wherein the indication is of at least one second service period for communications with the at least one of the one or more first MLDs.

11. The method of claim 10, further comprising:
receiving, from at least one of the one or more first MLDs, a response confirming availability for using the at least one second service period.

12. The method of claim 11, further comprising:
communicating with the at least one of the one or more first MLDs during the at least one second service period based at least in part on receiving the response.

13. The method of claim 1, further comprising:
communicating with at least one of the one or more first MLDs during a first service period;
receiving information indicative of pending uplink buffer units remaining at the at least one of the one or more first MLDs after conclusion of the first service period; and
transmitting, based at least in part on receiving the information indicative of the pending uplink buffer units and after conclusion of the first service period, the indication of at least the portion of the beacon interval timeline, wherein the indication is of at least one second service period available for communications with the at least one of the one or more first MLDs.

14. The method of claim 13, further comprising:
receiving, from at least one of the one or more first MLDs, a response confirming availability for using the at least one second service period.

15. The method of claim 14, further comprising:
communicating with the at least one of the one or more first MLDs during the at least one second service period based at least in part on receiving the response.

16. The method of claim 1, further comprising:
transmitting, via the first radio frequency link, the indication of at least the portion of the beacon interval timeline, wherein the indication is of one or more second service periods available for communications with the one or more first MLDs, wherein communications during the one or more service periods is via the second radio frequency link.

17. The method of claim 16, wherein transmitting the indication comprises:
broadcasting, to the one or more first MLDs, the indication of the one or more second service periods available for communications with the one or more first MLDs.

18. The method of claim 16, wherein transmitting the indication comprises:
transmitting, to at least one of the one or more first MLDs, the indication of the one or more second service periods available for communications with the at least one of the one or more first MLDs.

19. The method of claim 1, further comprising:
receiving, during a first service period of the one or more service periods, a status report from at least one of the one or more first MLDs; and
transmitting, to the at least one of the one or more first MLDs and based at least in part on receiving the status report, the indication of at least the portion of the beacon interval timeline, wherein the indication is of at least one second service period.

20. The method of claim 19, wherein the status report comprises at least one of a buffer status report, a data frame, an acknowledgement frame, or a combination thereof.

21. The method of claim 1, wherein:
the beacon interval timeline is divided into a plurality of equal sized time blocks, and a bit in a bitmap is associated with a corresponding time block of the plurality of equal sized time blocks.

22. The method of claim 21, further comprising:
transmitting, to the one or more first MLDs and via the first radio frequency link, a management frame comprising an indicating of the bitmap, wherein the communicating comprises communicating with the one or more first MLDs via the second radio frequency link.

23. The method of claim 22, wherein the management frame comprises a beacon frame or a probe response frame.

24. The method of claim 21, further comprising:
receiving, from at least one of the one or more first MLDs, a request for additional time blocks based at least in part on a position of the bit in the bitmap; and
transmitting a response based at least in part on receiving the request for the additional time blocks.

25. The method of claim 24, wherein the response comprises an acceptance of the request for the additional time blocks or a denial of the request for the additional time blocks or information indicative of an alternative number of additional time blocks.

26. The method of claim 1, wherein:
the one or more service periods comprises one or more second service periods and one or more first service periods, and
an second service period is located in a time gap between the one or more first service periods.

27. The method of claim 1, wherein:
the one or more service periods comprises one or more second service periods and one or more first service periods, and
the one or more first service periods are associated with a first periodicity and of the one or more second service periods are associated with a second periodicity.

28. The method of claim 1, wherein:
the first service period comprises a dedicated service period and the second service period comprises an opportunistic service period.

29. A method for wireless communication at a second multi-link device (MLD), comprising:
transmitting, on a first radio frequency link in accordance with a multi-link operation for a wireless local area network, an indication of at least a portion of a beacon interval timeline for communications between the second MLD and one or more first MLDs, wherein the beacon interval timeline includes at least one of a beacon transmit interval, and one or more service periods, channel access between the one or more first MLDs and the second MLD over a second radio frequency link being via the one or more service periods, wherein a service period of the one or more service periods is scheduled for communications on the second radio frequency link with at least one first MLD of the one or more first MLDs;
communicating with the one or more first MLDs in accordance with at least one of the beacon transmit interval and the one or more service periods;
performing a service period setup operation to schedule the one or more service periods for communications with the at least one of the one or more first MLDs via the second radio frequency link; and
allocating, to at least one of the one or more first MLDs and during the service period setup operation, two or more first service periods, wherein the two or more first service periods are included in the one or more service periods in the beacon interval timeline.

30. The method of claim 29, wherein the allocating is based at least in part on a traffic profile associated with the at least one of the one or more first MLDs.

31. The method of claim 29, further comprising:
receiving, from at least one of the one or more first MLDs and during the service period setup operation, a request for a first service period for a peer-to-peer communication.

32. A method for wireless communication at a second multi-link device (MLD), comprising:
transmitting, on a first radio frequency link in accordance with a multi-link operation for a wireless local area network, an indication of at least a portion of a beacon interval timeline for communications between the second MLD and one or more first MLDs, wherein the beacon interval timeline includes at least one of a beacon transmit interval, and one or more service periods, channel access between the one or more first MLDs and the second MLD over a second radio frequency link being via the one or more service periods, wherein a service period of the one or more service periods is scheduled for communications on the second radio frequency link with at least one first MLD of the one or more first MLDs;
communicating with the one or more first MLDs in accordance with at least one of the beacon transmit interval and the one or more service periods;
transmitting, to the one or more first MLDs, the indication of at least the portion of the beacon interval timeline, wherein the indication is of at least one second service period;
receiving, from at least one of the one or more first MLDs, a response message to the indication of the at least one second service period; and
communicating with the at least one of the one or more first MLDs during the at least one second service period based at least in part on receiving the response message.

33. A method for wireless communication at a second multi-link device (MLD), comprising:
transmitting, on a first radio frequency link in accordance with a multi-link operation for a wireless local area network, an indication of at least a portion of a beacon interval timeline for communications between the second MLD and one or more first MLDs, wherein the beacon interval timeline includes at least one of a beacon transmit interval, and one or more service periods, channel access between the one or more first MLDs and the second MLD over a second radio frequency link being via the one or more service periods, wherein a service period of the one or more service periods is scheduled for communications on the second radio frequency link with at least one first MLD of the one or more first MLDs; and
communicating with the one or more first MLDs in accordance with at least one of the beacon transmit interval and the one or more service periods; wherein:
the one or more service periods comprises a set of target wake time service periods, and
the one or more service periods are allocated to the one or more first MLDs using frame exchanges via the first radio frequency link for communicating via the second radio frequency link.

* * * * *